US012635829B2

(12) United States Patent (10) Patent No.: US 12,635,829 B2
Sears et al. (45) Date of Patent: May 26, 2026

(54) ARTIFICIAL GRAVITY HEATING DEVICE

(71) Applicant: SATED Space LLC, Boulder,, CO (US)

(72) Inventors: James T. Sears, Boulder, CO (US); Stephen Andrew Hibbs, Boulder, CO (US)

(73) Assignee: SATED Space LLC, Boulder, CO (US)

( * ) Notice: Subject to any disclaimer, the term of this patent is extended or adjusted under 35 U.S.C. 154(b) by 0 days.

(21) Appl. No.: 18/972,090

(22) Filed: Dec. 6, 2024

(65) Prior Publication Data

US 2025/0098895 A1 Mar. 27, 2025

Related U.S. Application Data

(60) Continuation of application No. 18/423,561, filed on Jan. 26, 2024, now Pat. No. 12,171,367, which is a
(Continued)

(51) Int. Cl.
*A47J 36/32* (2006.01)
*A23L 5/10* (2016.01)
(Continued)

(52) U.S. Cl.
CPC ................. *A47J 36/32* (2013.01); *A23L 5/15* (2016.08); *A47J 27/004* (2013.01); *A47J 36/16* (2013.01); *A47J 36/36* (2013.01)

(58) Field of Classification Search
CPC .......... A47J 36/32; A47J 27/004; A47J 36/16; A47J 36/36; A23L 5/15
(Continued)

(56) References Cited

U.S. PATENT DOCUMENTS 4,352,846 A 10/1982 Passler et al.
4,649,810 A 3/1987 Wong
(Continued)

FOREIGN PATENT DOCUMENTS

BR 0316156 A 9/2005
CA 2397124 A1 1/2004
(Continued)

OTHER PUBLICATIONS

WO2015093835 (Year: 2024).*
PCT Patent Application PCT/US2022/020241 International Search Report and Written Opinion issued Jun. 9, 2022.

*Primary Examiner* — Justin C Dodson
(74) *Attorney, Agent, or Firm* — Cozen O'Connor

(57) ABSTRACT

An artificial gravity heating system includes a cylindrical compartment formed of a hollow cylinder having a bottom base and an open top end. An electric motor rotates the cylindrical compartment to provide centripetal motion of materials inside the cylindrical compartment. While rotating, the materials move towards an inner wall of the cylindrical compartment. A heating element is conductively coupled along an outer wall of the cylindrical compartment for heating the materials against the inner wall via conduction. A temperature sensor is operatively coupled to the cylindrical compartment for monitoring a temperature of the cylindrical compartment. A controller is configured to control operation of the heating element based on the temperature monitored via the temperature sensor. An artificial gravity heating method is used to process materials including heating ingredients to cook food. The artificial gravity heating system may also be configured as a vapor generator, dehydrator or a gasification generator.

20 Claims, 47 Drawing Sheets

Related U.S. Application Data division of application No. 17/694,490, filed on Mar. 14, 2022, now Pat. No. 11,918,142.

(60) Provisional application No. 63/261,370, filed on Sep. 20, 2021, provisional application No. 63/169,989, filed on Apr. 2, 2021.

(51) Int. Cl.

| | |
|---|---|
| *A47J 27/00* | (2006.01) |
| *A47J 36/16* | (2006.01) |
| *A47J 36/36* | (2006.01) |

(58) Field of Classification Search

USPC .......................................... 426/523

See application file for complete search history.

(56) References Cited

U.S. PATENT DOCUMENTS

| | | | |
|---|---|---|---|
| 5,707,279 A | 1/1998 | Mitchell et al. | |
| 5,761,988 A * | 6/1998 | Lee .......................... | A47J 27/14 |
| | | | 99/468 |
| 6,862,979 B1 | 3/2005 | Silvestrini | |
| 9,609,975 B2 * | 4/2017 | Wolfe ................... | A47J 27/002 |
| 10,531,767 B2 | 1/2020 | Freas | |
| 11,610,276 B1 * | 3/2023 | Cohen ............. | G06Q 10/06316 |
| 12,171,367 B2 * | 12/2024 | Sears ...................... | A47J 36/16 |
| 2002/0027175 A1 | 3/2002 | Capp | |
| 2003/0192435 A1 | 10/2003 | McNair | |
| 2005/0011370 A1 * | 1/2005 | Xu ......................... | A47J 36/165 |
| | | | 99/409 |
| 2007/0015448 A1 | 1/2007 | Swisher et al. | |
| 2008/0257168 A1 | 10/2008 | Wolfe | |
| 2010/0150514 A1 | 6/2010 | Mohrmann et al. | |
| 2010/0258109 A1 | 10/2010 | Foster et al. | |
| 2014/0044851 A1 * | 2/2014 | Kennedy ............... | A47J 36/321 |
| | | | 99/332 |
| 2015/0190015 A1 | 7/2015 | Woning | |
| 2015/0201808 A1 * | 7/2015 | Katsuki .................... | A23N 1/02 |
| | | | 241/199.12 |
| 2015/0230664 A1 * | 8/2015 | Freas, II ................. | A47J 43/04 |
| | | | 366/144 |
| 2016/0037822 A1 * | 2/2016 | Thomas ................... | A23N 1/02 |
| | | | 99/513 |
| 2016/0045841 A1 | 2/2016 | Kaplan et al. | |
| 2016/0338488 A1 | 11/2016 | Garcia et al. | |
| 2017/0349469 A1 | 12/2017 | Mccutchen | |
| 2017/0354297 A1 | 12/2017 | Pereira | |
| 2018/0035698 A1 | 2/2018 | McNerney et al. | |
| 2018/0125282 A1 * | 5/2018 | Metz ....................... | F24C 7/085 |
| 2018/0127192 A1 | 5/2018 | Cohen | |
| 2018/0242784 A1 | 8/2018 | Hoyer et al. | |
| 2020/0062428 A1 * | 2/2020 | Freas, II ................. | B64G 1/50 |
| 2020/0110047 A1 * | 4/2020 | Hume ................... | F25D 31/005 |
| 2020/0313013 A1 * | 10/2020 | Rehder ................. | H01L 31/048 |
| 2020/0397185 A1 | 12/2020 | Glucksman et al. | |
| 2021/0022557 A1 | 1/2021 | Atinaja | |
| 2021/0259468 A1 | 8/2021 | Backus | |

FOREIGN PATENT DOCUMENTS

| | | | | | |
|---|---|---|---|---|---|
| CH | 628091 A5 | 2/1982 | | | |
| CN | 1050980 C | 4/2000 | | | |
| CN | 102100661 A | 6/2011 | | | |
| CN | 104640487 A | 5/2015 | | | |
| CN | 105979828 A | 9/2016 | | | |
| CN | 206444209 U | 8/2017 | | | |
| CN | 206730683 U | 12/2017 | | | |
| CN | 108576881 A | 9/2018 | | | |
| CN | 208223082 U | 12/2018 | | | |
| CN | 109259539 A | 1/2019 | | | |
| CN | 208455123 U | 2/2019 | | | |
| CN | 109549470 A | 4/2019 | | | |
| CN | 109562307 A | 4/2019 | | | |
| CN | 109588958 A | 4/2019 | | | |
| CN | 208909883 U | 5/2019 | | | |
| CN | 109996476 A | 7/2019 | | | |
| CN | 110141111 A | 8/2019 | | | |
| CN | 110359104 A | 10/2019 | | | |
| CN | 111315268 A | 6/2020 | | | |
| CN | 210784002 U | 6/2020 | | | |
| CN | 111358269 A | 7/2020 | | | |
| CN | 111358275 A | * | 7/2020 | ............ | A47J 27/004 |
| CN | 111799672 A | 10/2020 | | | |
| CN | 110681216 B | 6/2021 | | | |
| CN | 113509065 A | 10/2021 | | | |
| CN | 111358275 B | 11/2021 | | | |
| CN | 113854809 A | 12/2021 | | | |
| CN | 113974424 A | 1/2022 | | | |
| CN | 111743378 B | 4/2022 | | | |
| CN | 216602537 U | 5/2022 | | | |
| DE | 102017200734 A1 | 7/2018 | | | |
| EP | 3430914 A1 | 1/2019 | | | |
| EP | 3834674 A1 | 6/2021 | | | |
| ES | 2306270 T3 | 11/2008 | | | |
| ES | 2367401 T3 | 11/2011 | | | |
| JP | H10170149 A | 6/1998 | | | |
| KR | 100924219 B1 | 11/2009 | | | |
| KR | 20100025201 A | * | 3/2010 | .......... | A47J 37/1257 |
| KR | 102258190 B1 | 5/2021 | | | |
| SU | 1130405 A1 | 12/1984 | | | |
| WO | 9529614 A2 | 11/1995 | | | |
| WO | 2012077487 A1 | 6/2012 | | | |
| WO | 2012081598 A1 | 6/2012 | | | |
| WO | 2012147525 A1 | 11/2012 | | | |
| WO | 2013126734 A1 | 8/2013 | | | |
| WO | 2015093835 A1 | 6/2015 | | | |
| WO | WO2015093835 | * | 6/2015 | | |
| WO | 2016096445 A1 | 6/2016 | | | |

* cited by examiner

700

800

Fig. 33a
Fig. 33b
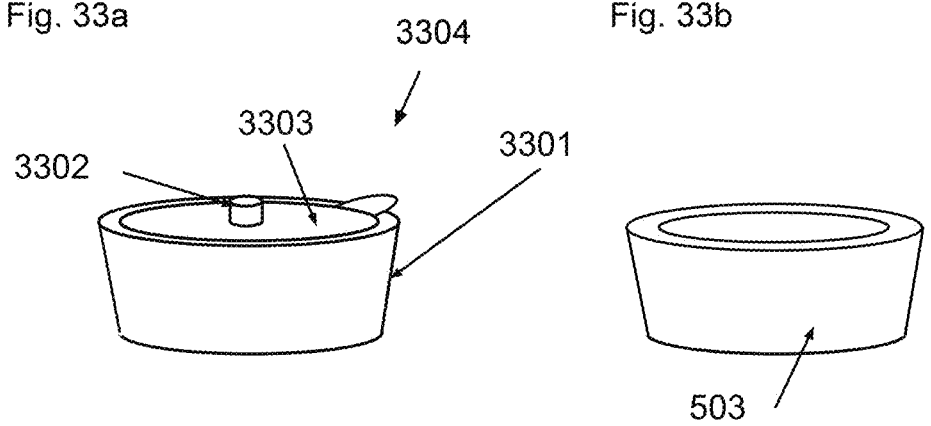
Fig. 34a
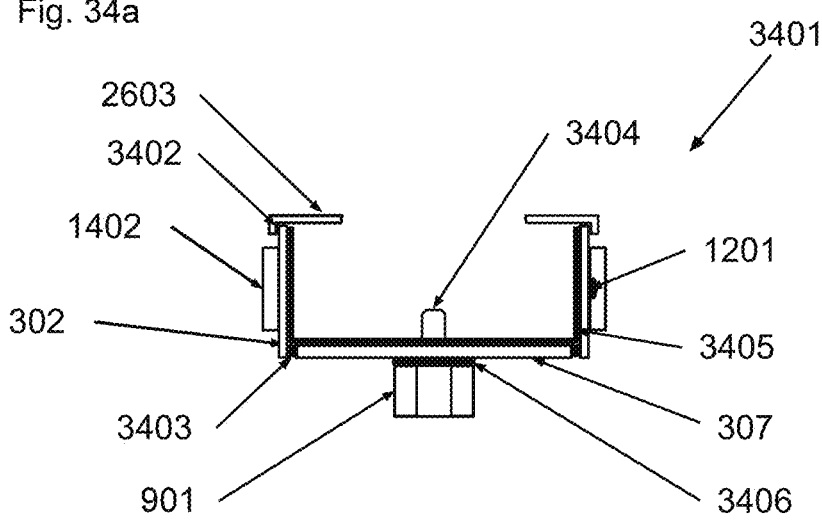

Fig. 52a
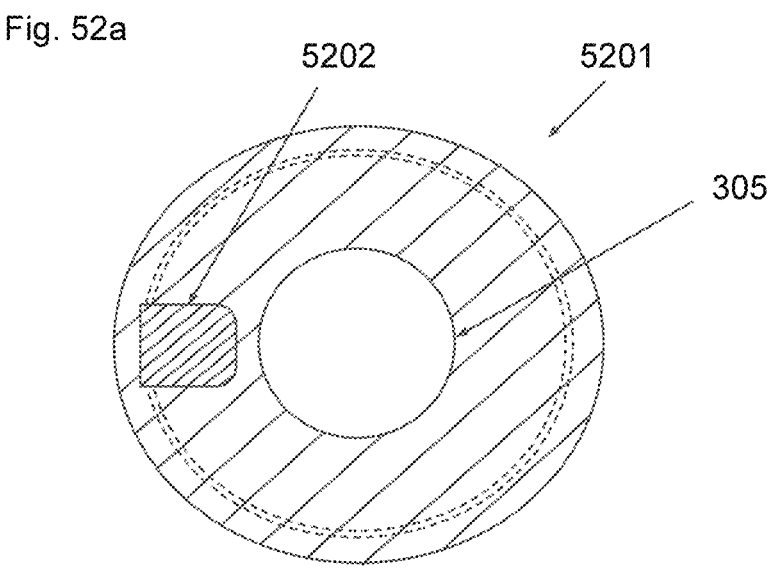
Fig. 52b
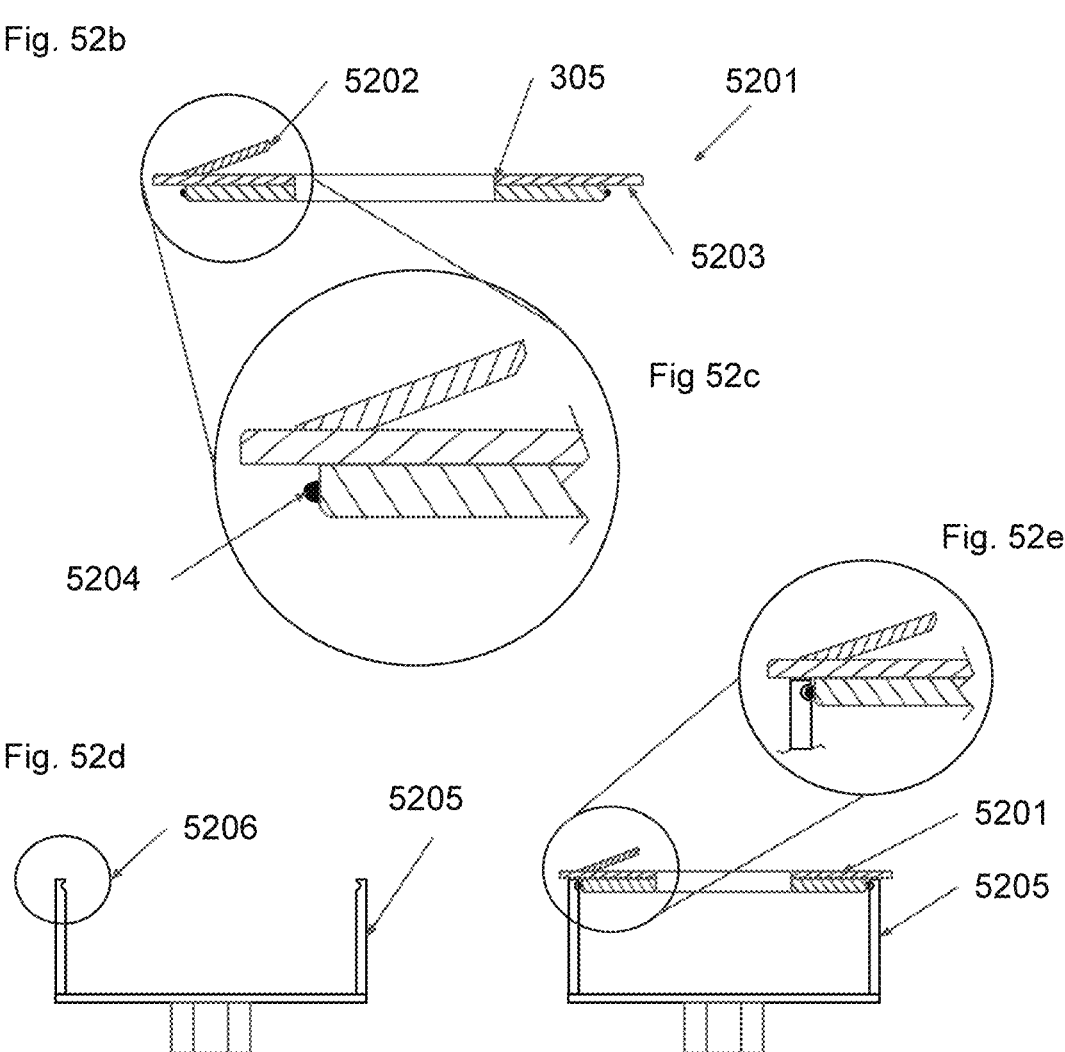
Fig 52c
Fig. 52e
Fig. 52d

Fig. 53a
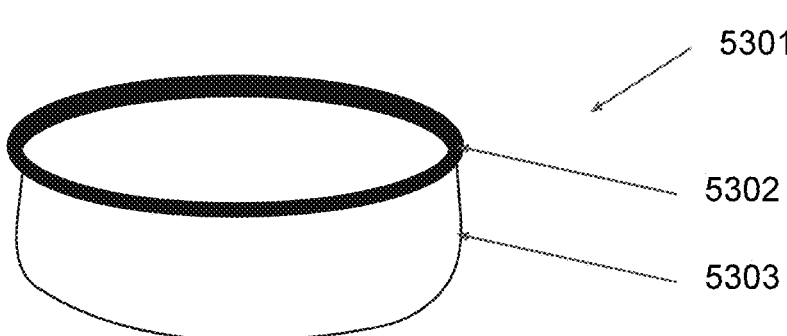
5301
5302
5303
Fig. 53b
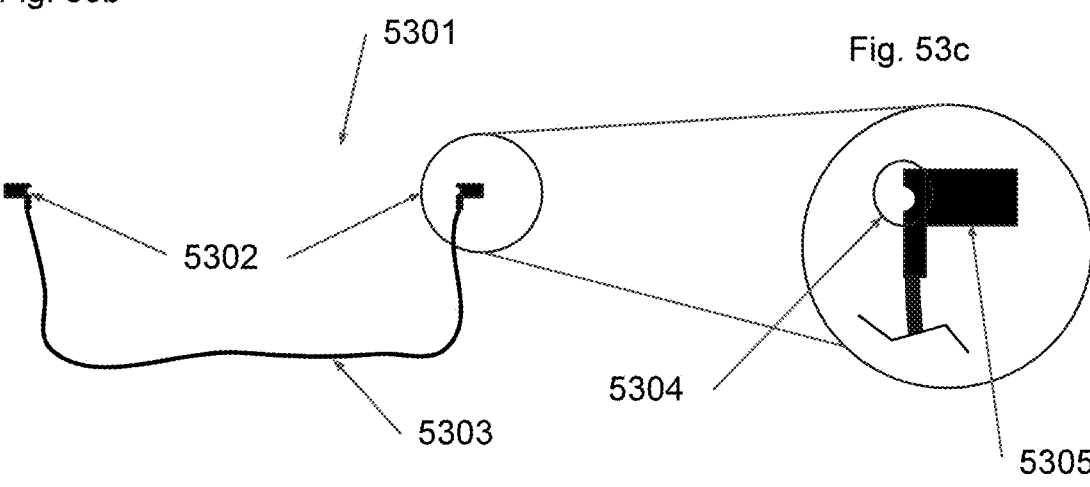
5301
Fig. 53c
5302
5303
5304
5305
Fig. 53d
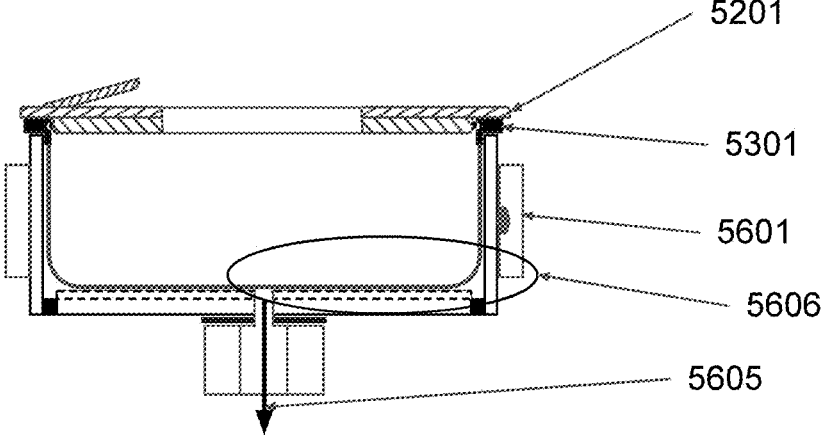
5201
5301
5601
5606
5605

Fig. 54a
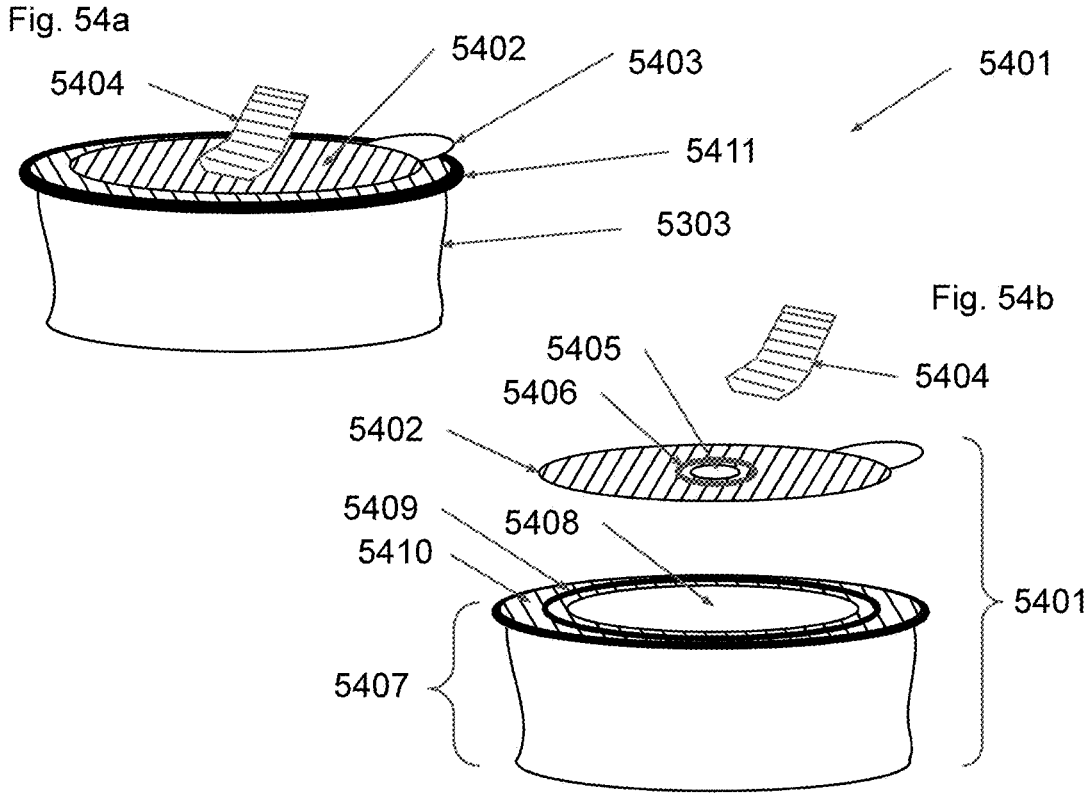
Fig. 54b
Fig. 55a
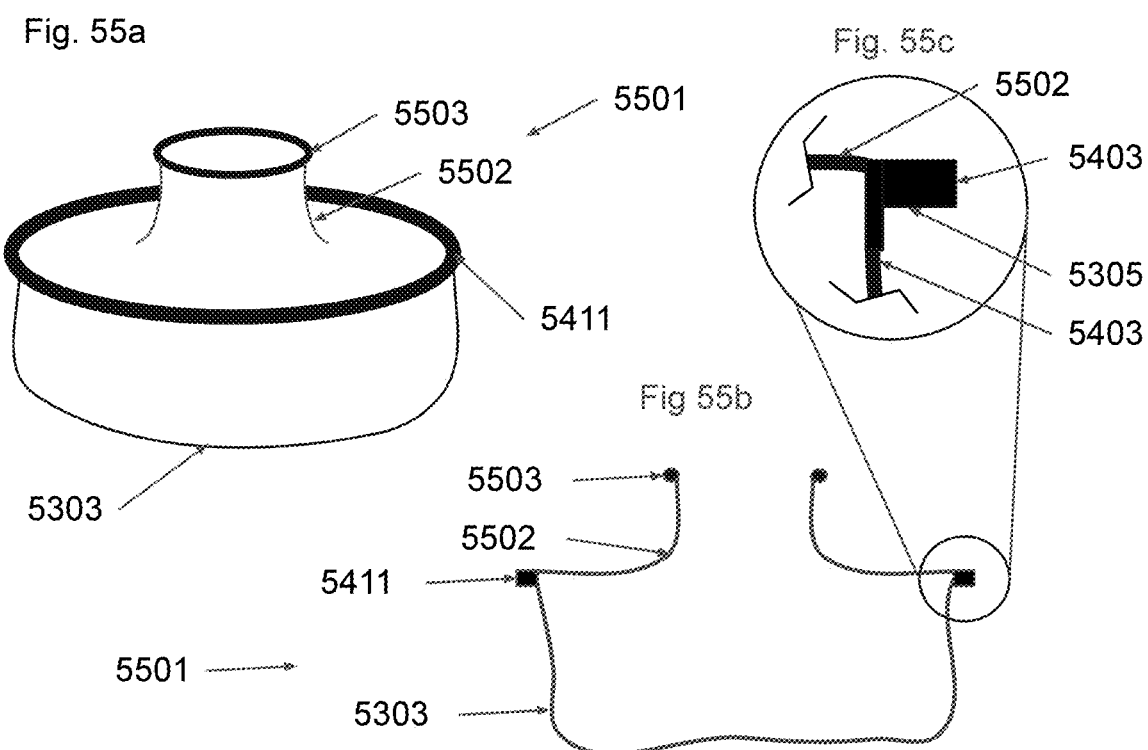
Fig. 55c
Fig 55b

Fig. 56a
Fig. 56b
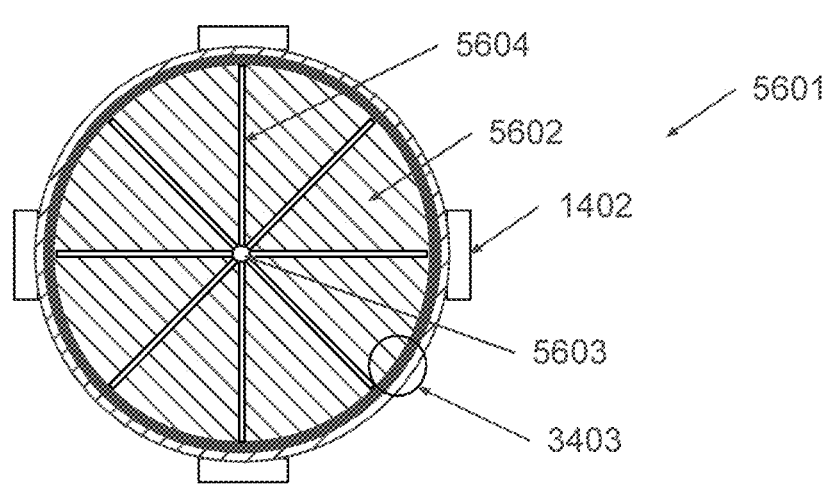
Fig. 56c
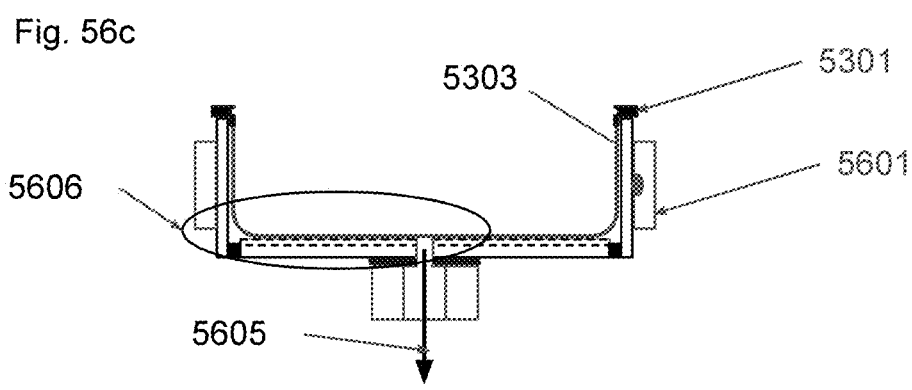

Fig 57  Vacuum seal advanced rotor system
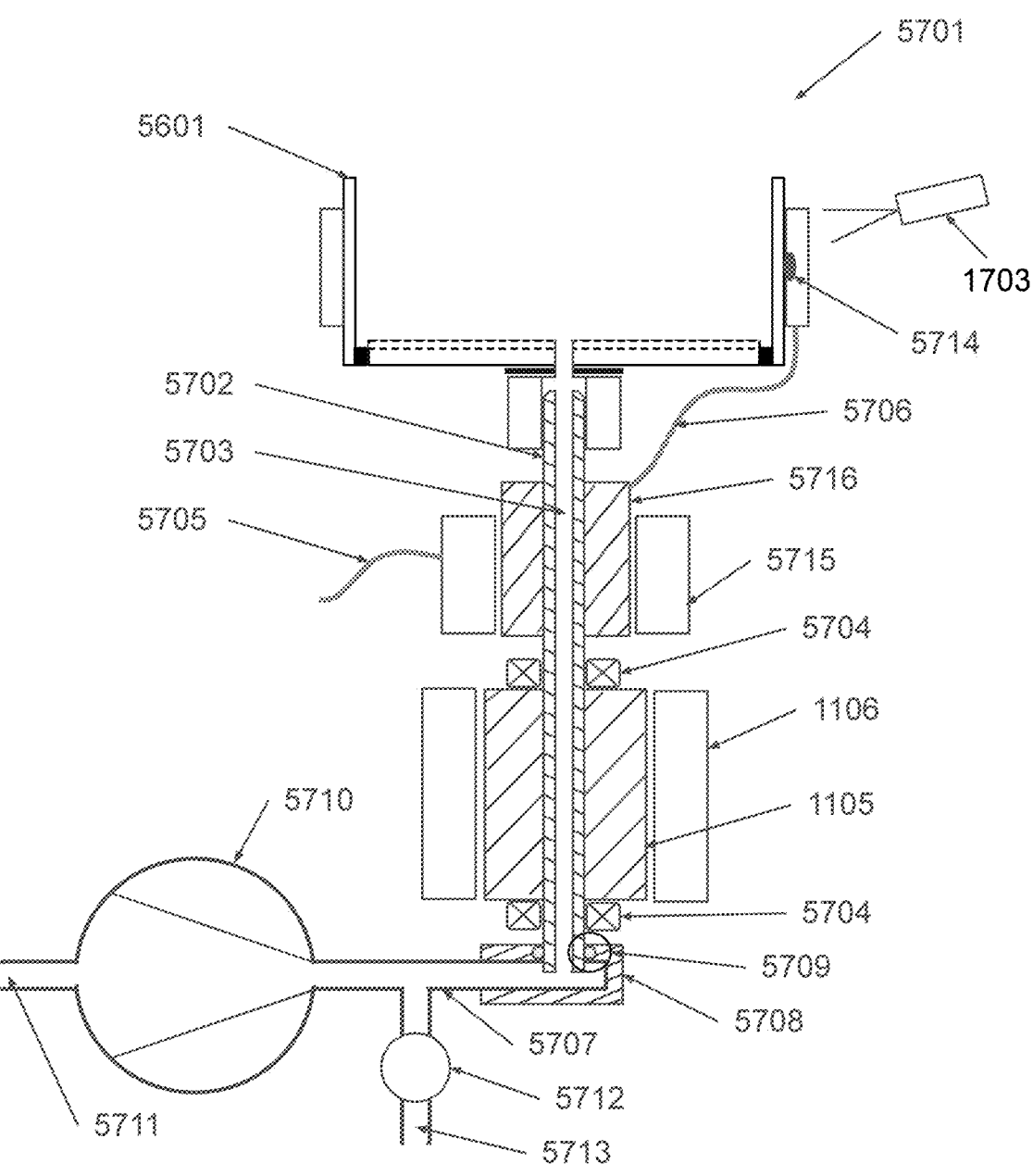

ARTIFICIAL GRAVITY HEATING DEVICE

CROSS-REFERENCE TO RELATED APPLICATIONS

This application is a continuation of U.S. patent application Ser. No. 18/423,561 filed on Jan. 26, 2024, which is a divisional application of U.S. patent application Ser. No. 17/694,490 filed on Mar. 14, 2022, now U.S. Pat. No. 11,918,142, which claims the benefit of U.S. Provisional Patent Application No. 63/169,989 entitled "Artificial Gravity Cooking Appliance" filed on Apr. 2, 2021, and U.S. Provisional Patent Application No. 63/261,370 entitled "Artificial Gravity Cooking Appliance" filed on Sep. 20, 2021. All of the above applications are herein incorporated by reference in their entirety.

BACKGROUND

Cooking appliances that include a rotating container are known. For example, U.S. Patent Application Publication No. 2008/0257168 to Wolfe discloses a device for stirring and cooking food that includes a rotating vessel with heating elements. U.S. Pat. No. 10,531,767 to Freas, II discloses a food preparation device that includes thermoelectric devices to control temperature. U.S. Pat. No. 4,649,810 to Wong discloses a cooking vessel that rests on a heating unit and a compartmentalized rotating carousel that temporally dispenses ingredients into the cooking vessel.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosed embodiments will be apparent from the following detailed description of the embodiments and the accompanying drawing figures.

In some aspects, the techniques described herein relate to an artificial gravity heating system, including: a cylindrical compartment including a hollow cylinder having a bottom base and an open top end; an electric motor operatively coupled with the cylindrical compartment for rotating the cylindrical compartment to provide centripetal motion of materials introduced into the cylindrical compartment via the open top end, such that the materials move towards an inner wall of the cylindrical compartment; a heating element conductively coupled along an outer wall of the cylindrical compartment for heating the materials against the inner wall via conduction; a temperature sensor operatively coupled to the cylindrical compartment for monitoring a temperature of the cylindrical compartment; and a controller configured to control operation of the heating element based on the temperature monitored via the temperature sensor.

In some aspects, the techniques described herein relate to an artificial gravity heating method, including: spinning a rotor with an electric motor, wherein the rotor includes a hollow cylindrical compartment having a cylinder wall, a bottom base, and an open top end; injecting a material to be processed into the rotor through the open top end while the rotor is spinning; heating the cylinder wall to a set temperature for a desired duration to process the material; stopping rotation of the rotor; and removing a processed material from the rotor.

In some aspects, the techniques described herein relate to an artificial gravity vapor generator dehydrator system, including: a cylindrical compartment including a hollow cylinder having a bottom base and a top cover; an electric motor operatively coupled with the cylindrical compartment via a rotary coupling, wherein the rotary coupling includes an entry path for providing liquids and slurries to the cylindrical compartment, and rotating the cylindrical compartment via the electric motor provides centripetal motion to move the liquids and slurries toward an inner wall of the cylindrical compartment; a heating element conductively coupled along an outer wall of the cylindrical compartment for heating the liquids and slurries against the inner wall via conduction; a temperature sensor operatively coupled to the cylindrical compartment for monitoring a temperature of the cylindrical compartment; a controller configured to control operation of the heating element based on the temperature monitored via the temperature sensor; and an escape coupling including an exit path out of the cylindrical compartment to receive vapors produced by heating the liquids and slurries.

In some aspects, the techniques described herein relate to an artificial gravity thermal gas generator system, including: a hollow cylindrical compartment having a cylinder wall, a bottom base, and an open top end; a cap for covering the open top end; an electric motor operatively coupled with the hollow cylindrical compartment for rotating the hollow cylindrical compartment to provide centripetal motion to an input material introduced into the hollow cylindrical compartment via the open top end, such that the input material moves toward an inner wall of the hollow cylindrical compartment while rotating; a heating element conductively coupled along an outer wall of the hollow cylindrical compartment for heating the input material against the inner wall via conduction to gasify the input material; a temperature sensor operatively coupled to the hollow cylindrical compartment for monitoring a temperature of the hollow cylindrical compartment; a controller configured to control operation of the heating element based on the temperature monitored via the temperature sensor; and a sealable port disposed in the cap, wherein the sealable port provides a path for gasification vapors to be released from the cylindrical compartment.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 3a shows a top perspective view of a rotor of an artificial gravity heating device, in an embodiment;

FIG. 3b shows a bottom perspective view of the rotor of FIG. 3a;

FIG. 3c shows a rotor dam for use with the rotor of FIGS. 3a and 3b;

FIG. 30a shows a removable prefilled rotor liner cooking shell, in an embodiment;

FIG. 30b is a cross-sectional view of the removable prefilled rotor liner cooking shell of FIG. 30a;

FIG. 30c shows a spin cake removed from the cooking shell of FIGS. 30a and 30b;

FIG. 31a shows a removable prefilled rotor liner cooking shell, in an embodiment;

FIG. 31b is a cross-sectional view of the removable prefilled rotor liner cooking shell of FIG. 31a;

FIG. 31c shows a spin cake removed from the cooking shell of FIGS. 31a and 31b;

FIG. 32a shows a removable prefilled rotor liner cooking shell, in an embodiment;

FIG. 32b is a cross-sectional view of the removable prefilled rotor liner cooking shell of FIG. 32a;

FIG. 32c shows a spin cake removed from the cooking shell of FIGS. 32a and 32b;

FIG. 33a shows a tapered rotor, in an embodiment;

FIG. 33b shows a prefilled cooking shell for use in the tapered rotor of FIG. 33a;

FIG. 34a is a cross-sectional side view of another embodiment of a heating rotor;

FIG. 34b is a top perspective view of the heating rotor of FIG. 34a;

FIG. 34c is a side perspective view of the heating rotor of FIG. 34a;

FIG. 35b is a top perspective view showing the rotor shroud of FIG. 35a;

FIG. 35c is a bottom perspective view showing the rotor shroud of FIG. 35a;

FIG. 40b is a bottom perspective view of the hot air cap of FIG. 40a;

FIG. 40d is a side perspective view of the hot air cap of FIG. 40a;

FIG. 49 is a perspective view of an artificial gravity heating device with user controls, in an embodiment;

FIG. 52*a* shows a top-down view an improved rotor dam, in an embodiment;

FIG. 52*b* shows a side view of the rotor dam of FIG. 52*a;*

FIG. 52*c* is a close-up view of one end of the rotor dam of FIG. 52*a;*

FIG. 52*d* is a cross-sectional side view of a rotor with a groove, in an embodiment;

FIG. 52*e* shows a sealing rotor dam installed into rotor, in an embodiment;

FIG. 53*a* shows a perspective view of a vacuum conformal cooking pouch, in an embodiment;

FIG. 53*b* is a cross-sectional side view of the vacuum conformal cooking pouch, in an embodiment;

FIG. 53*c* is a close-up view of the two-surface sealing ring, in an embodiment;

FIG. 53*d* shows a vacuum conformal pouch pulled down into a vacuum rotor, in an embodiment;

FIG. 54*a* shows a vacuum conformal pre-filled cooking pouch, in an embodiment;

FIG. 54*b* shows a vacuum conformal pre-filled cooking pouch with peel-off vent seal removed, in an embodiment;

FIG. 55*a* is a perspective view showing a conformal liquid cooking pouch, in an embodiment;

FIG. 55*b* is a cross-sectional side view of the conformal liquid cooking pouch of FIG. 55*a;*

FIG. 55*c* is a close-up view of a one-surface sealing ring, in an embodiment;

FIG. 56*a* is a cross-sectional side view of a vacuum seal rotor, in an embodiment;

FIG. 56*b* is a top-down view of vacuum rotor of FIG. 56*a;*

FIG. 56*c* is a cross-sectional side view of the vacuum-seal rotor with a conformal pouch, in an embodiment;

FIG. 57 is a cross-sectional side view of a vacuum seal rotor system, in an embodiment;

FIG. 58*c* the vacuum conformal liquid cooking pouch of FIG. 58*b* in operation, in an embodiment;

FIG. 58*d* shows removal of the vacuum conformal liquid cooking pouch of FIG. 58*b*, in an embodiment;

DETAILED DESCRIPTION

Figure 1:
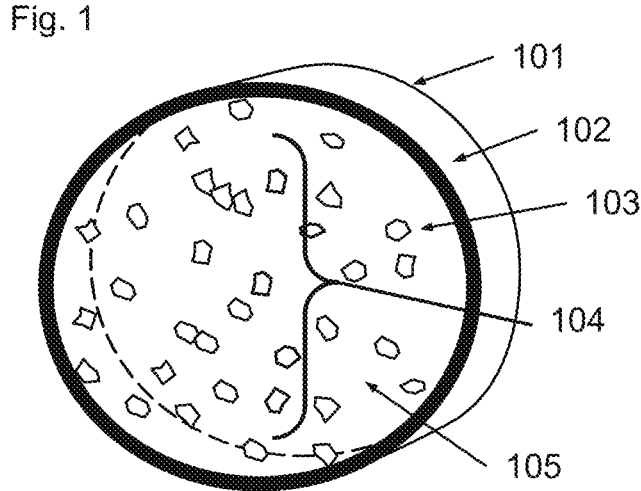
FIG. 1 shows a non-rotating hollow cylinder containing materials in a microgravity environment.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology may include a variety of combinations and/or integrations of the embodiments described herein.

Embodiments disclosed herein comprise a device configured to provide rotating a compartment and heating and/or cooling the compartment. Rotating of the compartment is configured to provide a centripetal acceleration sufficient to move material within the compartment to outer walls of the compartment. The outer walls are heated or cooled thereby heating or cooling the material primarily via conduction. Embodiments disclosed herein may be configured for heating or cooling any materials that may be inserted into the compartment and rotated with it.

Certain embodiments are configured for use onboard a spacecraft or celestial body where the gravitational force is less than that of Earth's gravitational force. As used herein, the Earth's gravitation force may be referred to as "1-G", and environments in which the apparent gravitational force is less than 1-G may be referred to as "low gravity", "microgravity", or "Zero-G" environments. Rotating of the compartment is configured to produce a centripetal acceleration greater than 1-G, which may be referred to herein as "artificial gravity", for moving material to the outer walls of the compartment where the material may be efficiently heated or cooled. Exemplary uses of the device include a cooking appliance, a steam generator, and a thermal gas generator, all configured for use in a low gravity environment.

The generalized problem to be solved is overcoming the difficulty of thermally processing and layering liquid, granular and paste materials while in microgravity or low gravity environments. Embodiments disclosed herein provide an intrinsically fire and smoke safe heating device while operating in microgravity and low gravity environments like those found onboard the International Space Station, during long space flights and on planetary outposts.

Some embodiments are configured to provide an artificial gravity cooking appliance that may be used to bake, fry, toast and simmer foods in low gravity environments. On Earth, we are accustomed to gravity resting food snugly against the bottom of a pan, and the pan sitting firmly on the stove. Thermal conduction easily moves heat from the flame or heating element to the pan and then from the pan to the food. This enables stovetop practices we often take for granted like reheating, simmering, browning and frying. Additionally, convective air currents in our ovens heat our food from gas burners or heating elements mounted in the bottom of the compartment. However, in low gravity and microgravity environments, conductive and convective heating mechanisms are drastically reduced or simply absent. Blobs of water float away, food does not stay put in a pot, heater elements heat but nothing will rest on them. Without effective cooking practices, astronauts have been unable to make their own food and instead rely on pre-packaged ready-to-eat foods.

For example, current food options on the International Space Station are largely restricted to plastic packets of processed food bars, candy, juices, freeze-dried meals and shelf stabilized meats. The bland and repetitive nature of today's everyday pre-processed packets of food portions strongly diminishes the quality of life on the Space Station and may be a nagging discouragement to future participants on long-term missions, space tourists or crew members of space manufacturing initiatives. All astronauts are currently missing out on the basic human pleasures of cooking their own meals, creating new food options and serving them to others.

Embodiments disclosed herein harness artificial gravity generated inside a rotating cylinder to position and conductively cook injected food ingredient layers using low temperature heating technologies. Enhanced thermal conduction, enabled by artificial gravity enhanced surface contact pressures, may heat, brown, bake, fry and simmer food ingredients. The results are delicious structured, layered and granulated creations that adopt a cylindrical band or ring-shaped form. The inner surface of these resultant food cakes may be further layered with additional ingredients that are conductively or independently hot air cooked as part of a final food product.

Embodiments disclosed herein provide many advantages, some of which are listed below.

Low Heating Element Temperatures

Centrifugally pressing food ingredients against the inside wall of a cylinder enables the surface of the food ingredients to rapidly assimilate to the temperature of the cylinder wall. If the cylinder wall is heated through a low thermal resistance connection to a heating element, then the contacting surface of the food correspondingly quickly assimilates to nearly the temperature of the heating element itself. Certain embodiments enable the assimilation of the food surface to nearly the temperature of the heating element, which means that even low heating element temperatures of 100-degrees to 195-degrees Celsius may perform traditional cooking, including flavor and texture enhancing processes such as boiling, frying, inducing the Maillard browning reaction and caramelization. Maillard browning is a flavor distinguishing chemical reaction that occurs between sugars and amino acids in food surfaces above the temperatures of 140 to 165-degrees C. Caramelization is a pyrolytic browning reaction of various sugars above temperatures from 150 to 195-degrees C. These reactions along with drying, expanding and melting of food ingredients are responsible for the distinctive mouth feel and complex flavor profiles of freshly cooked foods.

No Possibility of Smoke or Fire

When maximum possible cooking temperatures are approximately 200-degrees C., the risk of food being burned or causing smoke or fire is substantially reduced. This makes the disclosed technology especially suitable for cooking aboard a spacecraft or within a closed planetary habitat. For example, the smoke points of all refined cooking oils and most food ingredients are above 200-degrees C. There are few substances inside a spacecraft or habitat that could cause smoke or fire by contacting the heated rotor disclosed herein even if the device were incorrectly operated or a malfunction occurred.

Inherently Safe Heater Elements

Heating elements constructed from positive temperature coefficient (PTC) materials are configured to self-regulate their maximum temperature based on innate compositional characteristics of the heating module's ceramic core. When a PTC ceramic heater element is utilized in a thermostatically controlled system, intermediate heating temperatures between ambient and the PTC's own self-regulation temperature may be achieved by switching the PTC heater elements on and off in response to temperature sensor readings. Using a PTC heater as the heating element guarantees that even if a defective thermostatic switching mechanism became stuck in the on-state, the innate design temperature of the PTC module cannot be exceeded. If the design temperature is sufficiently low, no fire or smoke hazard may result.

Non-metallic Construction Materials Allowed

By employing PTC ceramic heating elements with a maximum temperature of less than 220-degrees Celsius, materials that would otherwise melt in a hotter heating device may be used, including but not limited to high temperature silicone and epoxy adhesives, polyamide, phenolic, polyester, silicone and Teflon™ plastic components. Use of these plastics may make the resulting device more efficient, lighter and less expensive to produce than conventional heating devices (e.g., common kitchen cooking appliances) that use higher temperature heating elements.

Non-Stick Cooking Surfaces

Silicone and Teflon™ may be used to coat the heating devices internal surfaces, preventing sticking of materials (e.g., highly caramelized foods).

Fast and Even Cooking

Coating the cylinder's inner wall's heating surface with a thin layer of silicone rubber allows even bumpy, granulated or aggregate food ingredients to embed slightly into the heated surface in response to the rotating cylinder's centrifugal force. This embedding creates a larger thermal contact area between the cylinder surface and the food, and the food may acquire a granular or crinkled surface as it is cooked.

Easy to Clean Auxiliary Surfaces

Controlling the maximum temperature in a PTC ceramic based cooking appliance means that even metallic and plastic surfaces that are not inherently non-stick are also easier to clean after the cooking process as lower temperature food particle toasting does not embed food ingredients into mechanical pores or hasten chemical bonding to the surface. Typically, light scrubbing with a damp cloth is sufficient to remove toasted food debris, making cleanup easy.

Elimination of Frying and Boiling Splatter

Food particles sputtering up from the rotating cooking surface inherently move with a tangential velocity component in addition to a radial velocity component that results in the food particles impacting into the cooking surface as they rotate inside the cylinder, rather than escaping into the airspace or leaving the cooking cylinder. Consequently, when cylinder contents are agitated, splatter or boil, nothing escapes the disclosed rotor. This attribute helps maintain clean air and surfaces inside a spacecraft even when food is fried in the appliance.

Ability to Operate From Low Gravity to Hyper-Gravity

Artificial gravity levels provided may be between about 0G (not spinning) and about 10G. For cooking, artificial gravity levels may be between about 5G and 10G and more preferably between about 8G and 10G. These higher gravity levels are much larger than 1G on Earth, meaning that spin cooking may be performed with the disclosed embodiments using different gravity environments including low gravity and higher gravity levels (e.g., resulting from spacecraft accelerations).

Ability to Constrain Materials Against a Surface in Low Gravity Environments

In a weightless environment, positioning the surface of a mass relative to a heating source is difficult. However, during operation of the disclosed embodiments, materials are constrained by centrifugal force to press against the inner wall of the heating cylinder where the materials remain stably located.

Incorporation of a Hot Air Cooking Mechanism

In embodiments, a hot air heat source is disposed along a central axis of the rotating cylinder for heating an inner surface of material constrained by centrifugal force against the inner wall of the rotating cylinder. For example, when food ingredients are constrained by centrifugal force to press against the inner walls of the cooking cylinder, a hot air heat source located in the center may be used for toasting an inner surface of the food. Since the food ingredients are stably located at a fixed distance from the centrally disposed hot air heat source, even toasting may be achieved.

Ability to Mix, Layer and Independently Heat in Layers

Materials may be injected into the rotating cylinder and then mixed (e.g., by inserting a stationary tool into the surface of the rotating material). After an initial layer of material is heated, additional radial layers of materials may be added and heated from the outside via conduction from the cylinder wall, or from the inside by using a radiative or hot air heater core, or both. In embodiments, food ingredients may be injected into the rotating cylinder and then mixed by inserting a stationary cooking tool such as a spatula into the surface of the rotating food ingredients. After an initial layer of food is cooked, additional radial layers of ingredients may be added and cooked from the outside via conduction from the cylinder wall, or from the inside by using a radiative or hot air heater core, or both. For example, a pizza crust may be fully cooked in the cylinder as the first layer, then a layer of sauce and toppings may be added and cooked independently. Similarly, an omelet with fillings may be made by first cooking an egg layer, then layering and cooking a second fillings layer such as cheese and vegetables using the inner core heater, followed by layering and cooking a third layer of egg using the inner core heater.

Uses for Low Gravity Environments

In embodiments, food cooking processes may be performed (e.g., baking, browning, frying, simmering, broiling and layering).

In embodiments, industrial and life support process that involve melting, boiling, drying or vaporizing may be performed.

In embodiments, manufacturing processes may be performed such as thermo processing fluids, pastes, powders and aggregates.

Principle of Spin Heating

When materials inserted into the rotating cylinder touch the inner wall, the materials accelerate to the speed and direction of their contacting position on the rotating inner wall. Similarly, material injected into the empty air space of the spinning cylinder is influenced by cylindrical co-rotating air currents to drift toward and ultimately touch the rotating inner wall. Material touching the cylinder wall or its contents experiences centripetal acceleration resulting in an artificial gravity force that presses the material against the inner wall of the cylinder. The resulting compressive force provides a low thermal resistance between the surface of the materials being spun and the material comprising the rotating cylinder. Consequently, by heating or cooling the cylinder wall directly, the surface of the material against the inner wall is conductively heated or cooled. Heat then transfers through the material based on the material's thermal conductivity and thermal mass.

Embodiments disclosed herein enable foods to be prepared from individual and mixed ingredients. Food that touches the cylindrical wall may be browned at its outer surface. Food facing the center of the cylinder may be cooked or browned by using a hot air insert, in some embodiments. Browning and its diverse induced flavor and texture profiles arise from a combination of pyrolyzing sugar caramelization reactions and the Maillard reaction in which amino acids and simple sugars in the foods are exposed to time and temperature profiles over 140 degrees Celsius.

Embodiments disclosed herein may be used to perform the following non-limiting functions: sliding momentum mixing processes useful for chemical conversion, centrifugal separation, vaporizing, gasification, boiling, artificial gravity compression. These functions may be used with spaceflight life support, mining, manufacturing, heating and other uses. The word "cake" as used herein may refer to any cylindrical ring shaped final or intermediate product.

Gravity and Artificial Gravity Introduction

Gravity is the natural attractive interaction of two masses that is roughly proportional to their respective masses and moderated by the inverse square of their separation difference. This attractive force is commonly expressed in terms of acceleration. On Earth, gravitational force is approximately 9.8 meters/second-squared. On Mars, with its smaller mass, the acceleration force is only 3.7 meters/second-squared and on Earth's moon, this acceleration force is only 1.62 meters/second-squared. Accordingly, the perceived gravity on Mars is about ⅓ of that on Earth and on the Moon is only about ⅙th of the strength on Earth.

In orbiting bodies such as the International Space Station (ISS) the centripetal acceleration caused by rotating the Earth exactly matches the acceleration of gravity caused by mass attraction. Because these two accelerations are in opposite directions, the net gravitation is effectively zero resulting in perceived weightlessness. In this application the terms "microgravity", "zero gravity" and "weightlessness" are equivalent; all meaning environments where the perception and effects of gravity are insignificant.

Another place zero gravity is found is during the non-accelerating coasting phase of journeys between planets, such as during the approximately nine months expected for spacecraft travel from Earth to Mars. During that time there is a near absence of natural or artificial gravity when the spacecraft is coasting. This is because gravity falls off with the square of the distance between the masses of the spacecraft and the solar system's planets and sun. Despite the absence or presence of mass based attractive force (i.e., gravity), artificial gravity may be generated for materials constrained to travel in a circular path and thereby experience centripetal acceleration. For example, materials may be constrained from moving outwards by resting on the inner surface of a rotating cylinder.

Centripetal acceleration $a_c$, generated for creating artificial gravity is calculated as:

$a_c = (\pi\, n_{rpm}/30)^2\, r$ where $a_c$=centripetal acceleration (m/s$^2$)

r=circular radius in meters $n_{rpm}$=revolutions per min

For example, if the heating cylindrical rotor is 0.08 meter in diameter. A cylindrical cake such as that pictured in FIG. 5 would be produced by spinning the rotor cylinder at 440 rotations-per-minute (rpm) resulting in 8.8Gs of equivalent acceleration on the inside surface of the cooking cylinder. Since 8.8Gs of artificial gravity would be the dominating gravitational force either on Earth, the moon or in a weightlessness environment, a cooking method used for any one of these environments would create approximately the same result.

FIG. 1 shows a non-rotating hollow cylinder 101 in a microgravity environment having a temperature-controlled cylinder wall 102. Temperature-controlled cylinder wall 102 may be thermally controlled by one of several different heating and cooling embodiments described below. The cylinder contains material 103 to be processed. In a low gravity environment lacking artificial gravity or having negligible attractive gravity, referred to herein as microgravity or zero-G, the floating materials 104 naturally distribute themselves and coalesce according to characteristics such as stickiness of material 103, surface tension, Brownian motion, diffusion, and how the materials were initially introduced into the cylinder. In zero-G, the floating materials 104 are not physically pressed against any surface and are therefore thermally insulated from each other and the temperature-controlled cylinder wall 102 by low-conductivity air filled spaces 105 separating them. Consequently, a non-rotating hollow cylinder in zero-G would have little direct thermal contact with the floating materials 104 contained therein.

Figure 2:
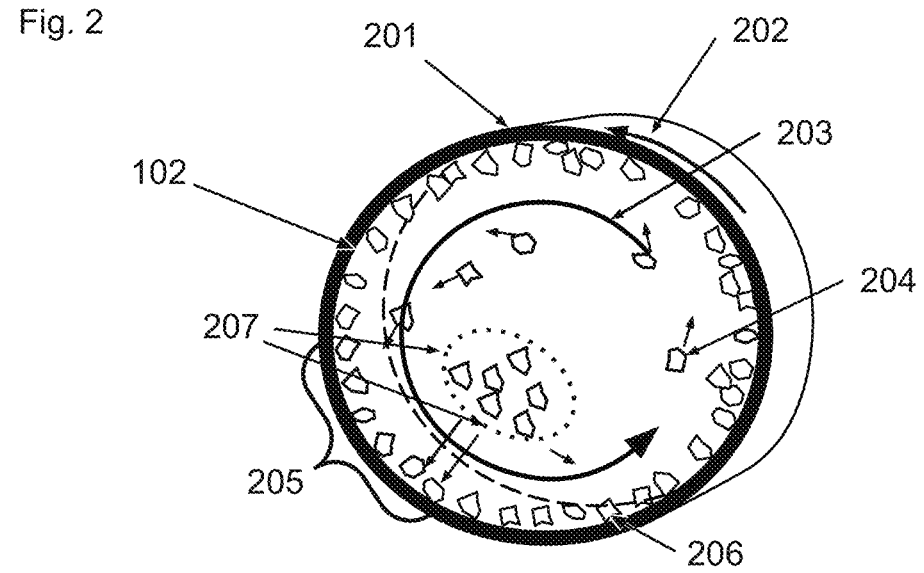
FIG. 2 illustrates two basic mechanisms that lead to trapping of materials against a rotating cylinder wall.

FIG. 2 illustrates the two basic mechanisms that lead to trapping materials 204 against a temperature-controlled cylinder wall 102. Hollow rotating cylinder 201 rotating in direction 202 causes co-rotating internal air currents 203 to be generated. Floating materials 204 that are placed inside the confines of cylinder 201 are influenced by internal air currents 203 to follow a similar circular path. However, as described by the principles of centripetal motion, materials 204 follow not a continuous circular path, but rather a path that intercepts them with the temperature-controlled cylinder wall 102. Once floating materials 204 touch the temperature-controlled cylinder wall 102, friction with the wall 102 causes rotating materials 205 to travel in the same circular motion as wall 102. Again due to the principles of centripetal motion, rotating materials 205 are constantly accelerated by the wall 102 and are pressed against it with a force, often called centrifugal force, proportional to their mass and the square of the rotation rate of hollow cylinder 201. This centripetal acceleration based centrifugal force of artificial gravity presses the rotating materials 205 into direct thermal contact with the temperature-controlled cylinder wall 102, as indicated in FIG. 2 as artificial gravity constrained materials 206.

Similarly, if directional materials 207 are injected into the hollow cylinder 201 with a velocity and direction toward the thermally controlled cylinder wall 102 such that they touch its inner surface, then via frictional forces, directional materials 207 are accelerated by hollow cylinder 201 into a circular motion against the inside of temperature-controlled cylinder wall 102. The directional materials 207 may be provided with a velocity toward the temperature-controlled cylinder wall 102 by any mechanism such as being manually thrown by hand or machine, or extruded from a pouch toward wall 102, from a location inside or outside the confines of cylinder 201.

When material 103 to be processed is pressed against temperature-controlled cylinder wall 102 due to its rotational rate, then the temperature of the material may be adjusted via conduction by adjusting the temperature of the cylinder wall 102.

Figures 3A, 3B, 3C:
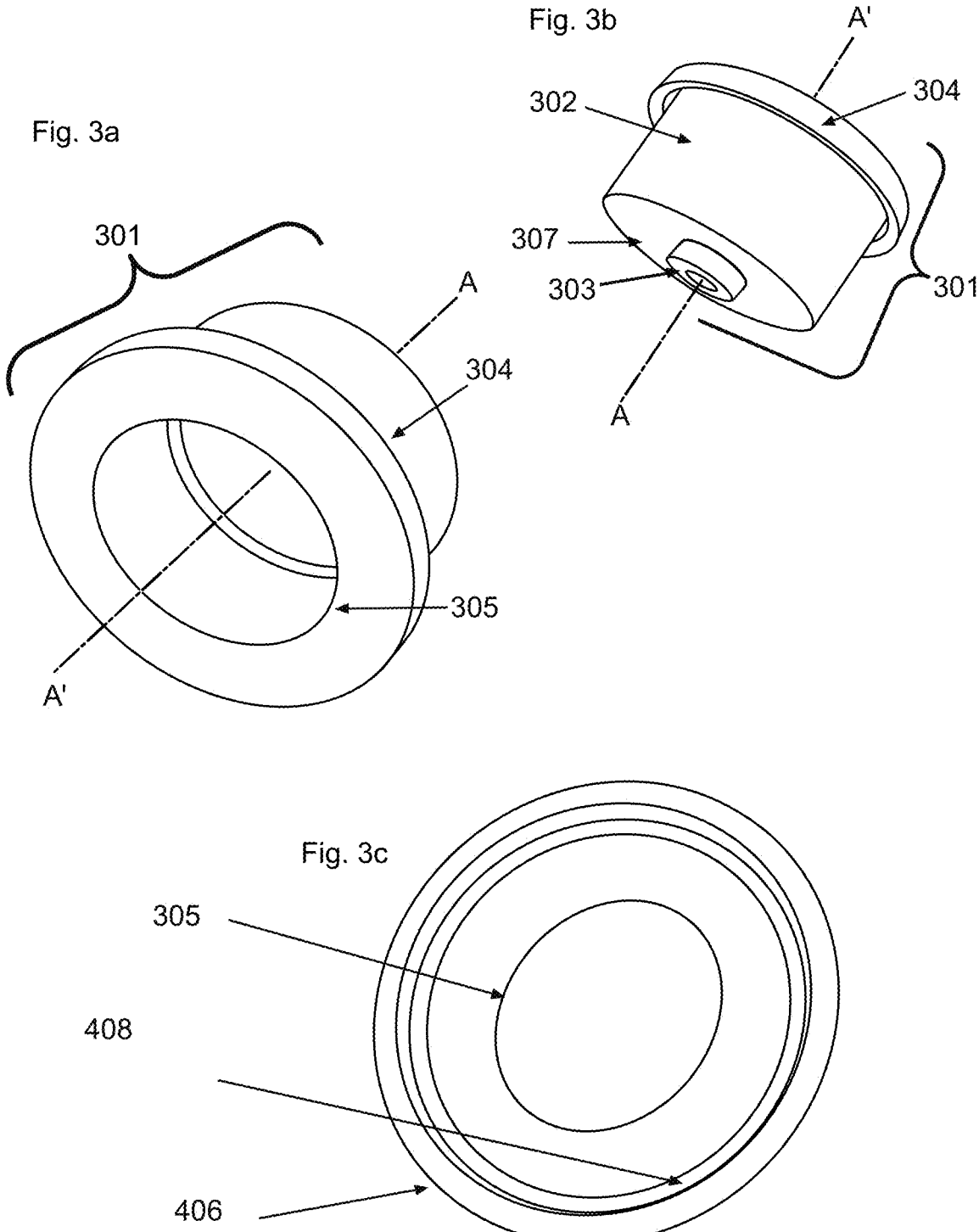

FIG. 3a shows a top perspective view of a rotor 301 and FIG. 3b shows a bottom perspective view of rotor 301, in an embodiment. Rotor 301 comprises a coupling 303, a rotor base 307, and a temperature-controlled rotor wall 302. In embodiments, rotor comprises a hollow cylinder with a bottom base and an open top end that forms a cylindrical compartment.

In operation, rotor 301 rotates along an axis A-A'. In embodiments, the rotor 301 may be configured for induction heating and be constructed from an 8-cm diameter stainless steel cup made from 0.4-mm thick, type SS-304 stainless steel. Temperature-controlled rotor wall 302 may be thermally controlled by one of several different heating and cooling embodiments described below. Temperature-controlled rotor wall 302 is an example of temperature-controlled cylinder wall 102 described above in connection with FIGS. 1 and 2. A rotor dam 304 is optionally used to prevent artificial gravity constrained materials 206 from spilling out the otherwise open end of rotor 301. In embodiments, the rotor dam 304 is molded from silicone rubber enabling it to withstand the elevated temperatures of cooking and to be easily disposed around the perimeter of rotor 301 to prevent liquid leakage from rotor 301. Rotor dam 304 is also configured to be easily removable. A rotor base 307 prevents rotating materials 205 from spilling out the shaft end of rotor 301. An opening 305 in rotor dam 304 enables materials to be inserted into rotor 301 while it is spinning thereby capturing floating materials 204 in a weightless environment. Opening 305 also enables materials to be stirred or distributed by using a spatula or other tool inserted into the rotor 301 during rotation.

In operation, rotor 301, in embodiments, has a diameter of about 8-cm and a height of about 4.5-cm. An exemplary rotation rate is about 400-rpm. Combining this rotation rate with rotor 301 of this size provides an artificial gravity force of about 10-G's between rotating materials 205 and the inside of temperature-controlled rotor wall 302. The diameter and height of rotor 301 may be larger or smaller to accommodate different quantities of materials being processed, without departing from the scope hereof. Likewise, the rotational speed may be larger or smaller to provide different levels of artificial gravity tailored for varying diameters of rotor 301 and the performance of varying thermal processing functions.

When the artificial gravity levels are elevated above Earth's gravity (e.g., 1-G), the artificial gravity heating device functions similarly on Earth and in low gravity environments. However, the ease or technique of inserting materials (e.g., solids and liquids) may differ between 1-G and low gravity environments. For example, in 1-G, materials may be dropped into the rotor dam opening 305 while the rotor is spinning, whereas in microgravity or Zero-G environments, materials may be inserted, extruded into, or thrown into the rotor dam opening 305.

An exemplary use of the artificial gravity heating device is as a cooking appliance. For example, spin-simmered rice is an exemplary product in which rice and water are added to the artificial gravity heating device and the rice is cooked. Rotor 301 is operatively coupled to a motor and rotated at a predetermined rate. Rice and water may be added through rotor dam opening 305. For example, one part rice and two parts water may be added in any order. While spinning, the water-rice mixture is centripetally accelerated to press up against the inside of the temperature-controlled rotor wall 302. An annular ring of the water-rice mixture is formed with a hollow center. Operation in 1-G versus low gravity or zero-G may vary the evenness of the ring thickness but only to an insignificant degree when rotor acceleration is in the range of 10-G's. In embodiments, the rotor dam opening 305 is smaller than what is shown in FIG. 3a and FIG. 3c. A smaller opening assists with full expansion of the rice without spilling, and a smaller opening is sufficiently large enough to accept rice and water, and no stirring is required.

Figure 4A:
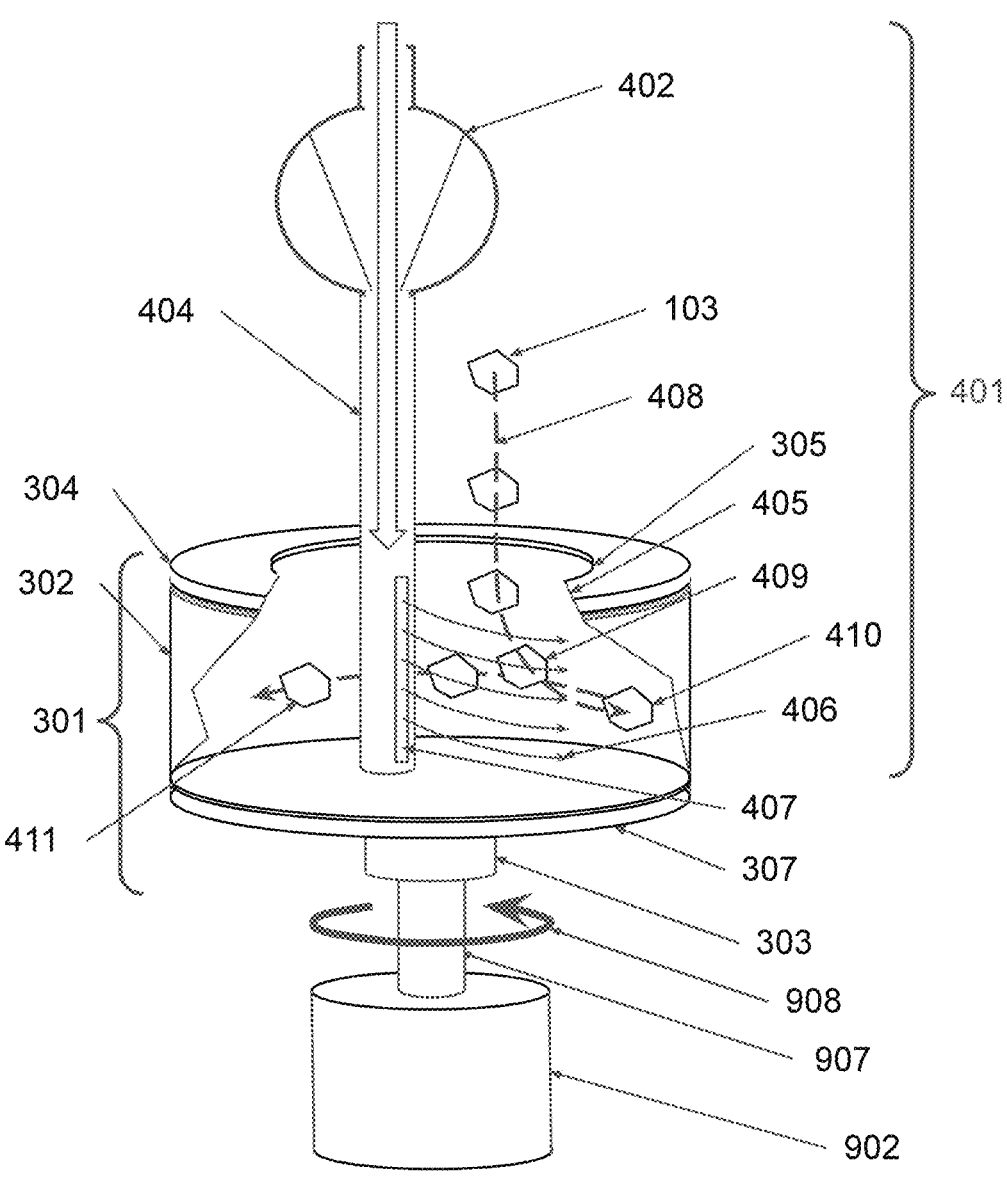
FIG. 4a illustrates a materials injection mechanism for introducing materials to be processed into a spinning rotor of an artificial gravity heating device, in an embodiment.

FIG. 4a illustrates an exemplary materials injection mechanism 401 for introducing materials to be processed into a spinning rotor of an artificial gravity heating device, in an embodiment. Material 103 enters rotor 301 through rotor dam opening 305. An air compressor 402 draws in air at an inlet and forces the air down an injector tube 404, as depicted with an arrow in FIG. 4a. The air then escapes through an air injector slot 407 forming a flat sheet or blade of air 406 that is directed toward the rotor wall 302. It should be known that this method of using an air blade 406 to move injected material 103 will work with any rotor design including rotor 6301 used for the vaporization of waste, mining and manufacturing materials in a weightless environment.

In embodiments, a compressor 402 (e.g., model VCHL-102) drives air through an 8-mm diameter injector tube 404 where it escapes through the air injector slot 407, which has an opening 0.6-mm wide and 40-mm long. The air blade escape velocity near the tube was estimated to be 10 meters per second. In embodiments, rotor 301 is 80-mm in diameter and 45-mm tall and may be rotated at about 400 revolutions-per-minute creating an artificial gravity centrifugal force of about 10-G's directed radially outward at inner surface of rotor wall 302. Material 103, for example a dried cranberry, is gently projected along the beginnings of weightless floating material trajectory 408 to where it intersects with the active area of air blade 406. Immediately, through the Bernoulli effect, material 103 is drawn into the stream of air blade 406 and its path is accelerated in a direction toward the inside of temperature-controlled rotor wall 302, as shown in FIG. 4a as an accelerated path 409. There it contacts the spinning wall at point 410 and is immediately accelerated by tangential surface friction with rotor wall 302 such that subsequently through continuous centripetal acceleration, caused by the rotation, becomes centrifugally pressed and trapped against the wall as rotating material 411. Through this mechanism 401, material 103 may be gently introduced through the spinning rotor dam opening 305 in a microgravity, zero-G, or normal gravity environment to be instantly pressed against the inside of temperature-controlled rotor wall 302 such that they are in thermal conductive contact with the wall 302 and may be thermally processed by adjusting the temperature of the wall. In this example, wall 302 is rotated in a direction 908 by rotor base 307 that is connected to motor 902 by shaft 907 and rotation coupling 303. Rotor cut-out view 405 allows viewing internal portions of rotor 301 in the illustration. In some embodiments, air injector slot 407 is generally directed radially across rotor 301. In certain embodiments, air injector slot 407 is directed tangentially with respect to rotor 301 and in the same direction 908 as the rotation of rotor 301. Other directions of air injector slot 407 may be employed without departing from the scope hereof.

Figures 4B, 4C:
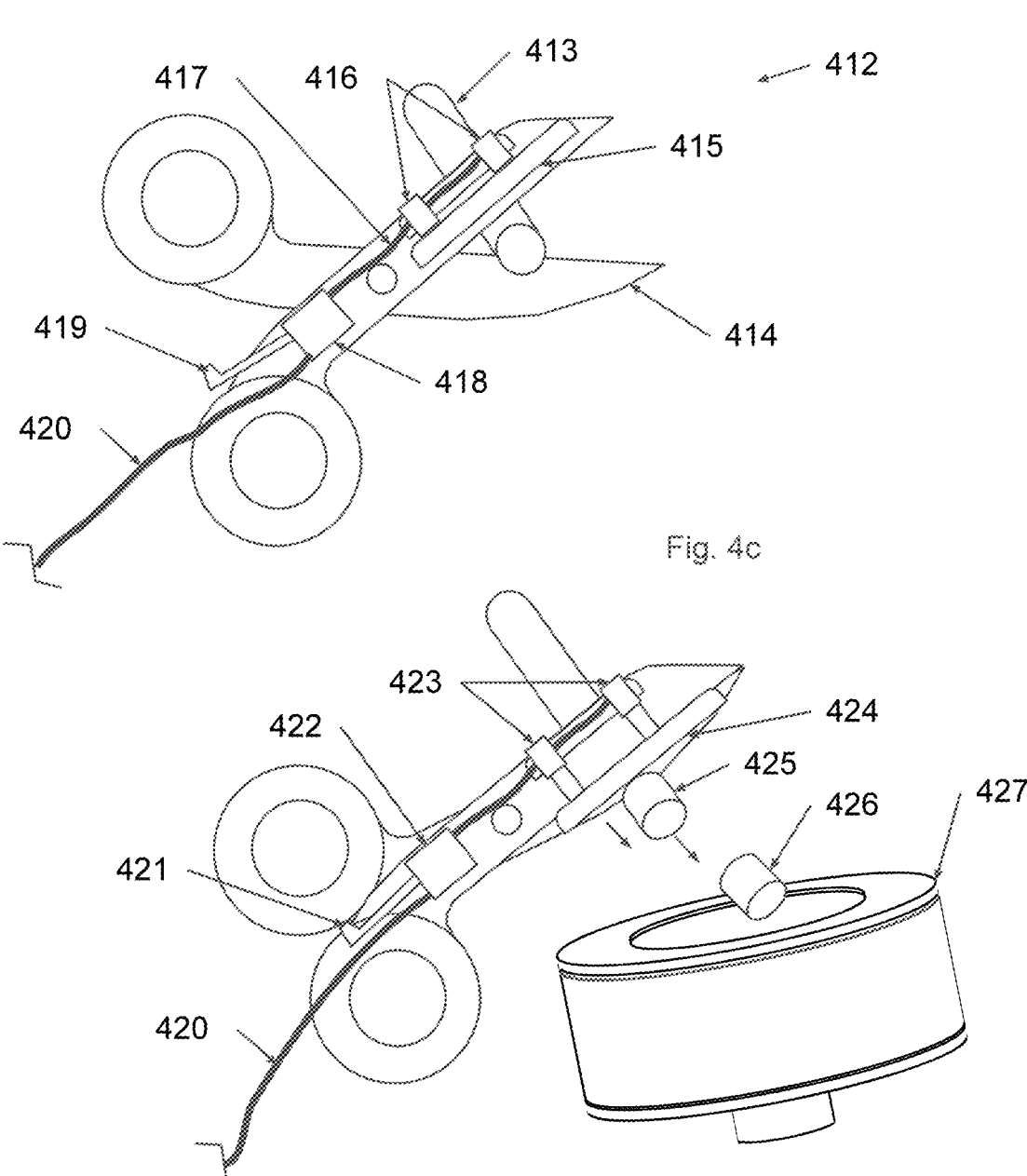
FIG. 4b shows a pair of material ejecting scissors to be used with an artificial gravity heating device, in an embodiment.
FIG. 4c shows the pair of material ejecting scissors in a closed configuration.

FIG. 4b shows an exemplary pair of material ejecting scissors 412 that may be used to subdivide sliceable materials 413 and project portions 426 into the rotor dam opening of a spinning rotor 427 while in microgravity. Materials to be subdivided and injected 413 might include strips of dried meat, cheese, vegetables, or dried fruit like apricots. All of which are examples of long shelf-life food ingredients compatible with storage in a space galley larder. Starting with a rather standard pair of kitchen scissors, an ejection bar 415 is fitted onto the ends of a pair of auto-retracting pneumatic linear actuators 416. The actuators 416 are connected with a miniature pneumatic hose 417 to a pneumatic valve 418 actuated by a trigger lever 419 and fed from a remorse compressed gas source through miniature pneumatic hose 420.

FIG. 4c shows that when scissors 412 are manually closed, not only is a slice of material 413 cut off, but lever 419 is pressed to a pressed configuration 421 and pneumatic valve 418 is switched into its open state 422 allowing pressurized gas to travel through pneumatic hose 420 and instantly extend pneumatic actuators 416 into position 423. Consequently, the ejection bar 415 rapidly sweeps down as shown into a lower position 424 scraping across the cutting surfaces 414 and ejecting a cut portion 425 from the ejecting scissors 412 in a predictable direction. The ejecting scissors action allows the space chef to quickly subdivide and add food ingredients to a spinning cooking rotor 427 without needing to deal with food floating off in random directions or sticking to the scissors, like what may happen with a soft cheese, for example. It is to be understood by one skilled in the art that ejection bar 415 could also be powered by electrical solenoids, an electric motor or through a mechanical cocking and release method powered directly by the manual operation of the scissors 412, without departing from the scope hereof.

Another problem that the ejecting scissors 412 solves is the problem of injection stream wrapping of ropy substances. While liquids and sauces may be easily shot into a spinning rotor dam opening 305 where they hit and effortlessly spread across the cooking rotor's inner surface, the same is not true for ropy liquids. For example, ejecting a stream of softened cheese through the spinning rotor dam opening likely results in wrapping of the stream upon itself into a ball of wrapped cheese strands bouncing around the inside of the rotor. The problem is that ropy substances, defined here as substances with a fibrous self-adhesion characteristic, like proteins in cheese and gluten in bread dough, set up a competition between adhesion of the injected substance with the spinning wall and adhesion with itself along a rope like strand connected to the injection spout. One solution is to inject food ingredients in discrete pieces as is done with the ejecting scissors. Another solution, as follows in FIG. 4d, is to eject ropy substances through a long nozzle that ensures they contact the spinning rotor wall directly in a way that enhances breaking off into individual pieces and provides initial wall adhesion contact pressure.

Figure 4D:
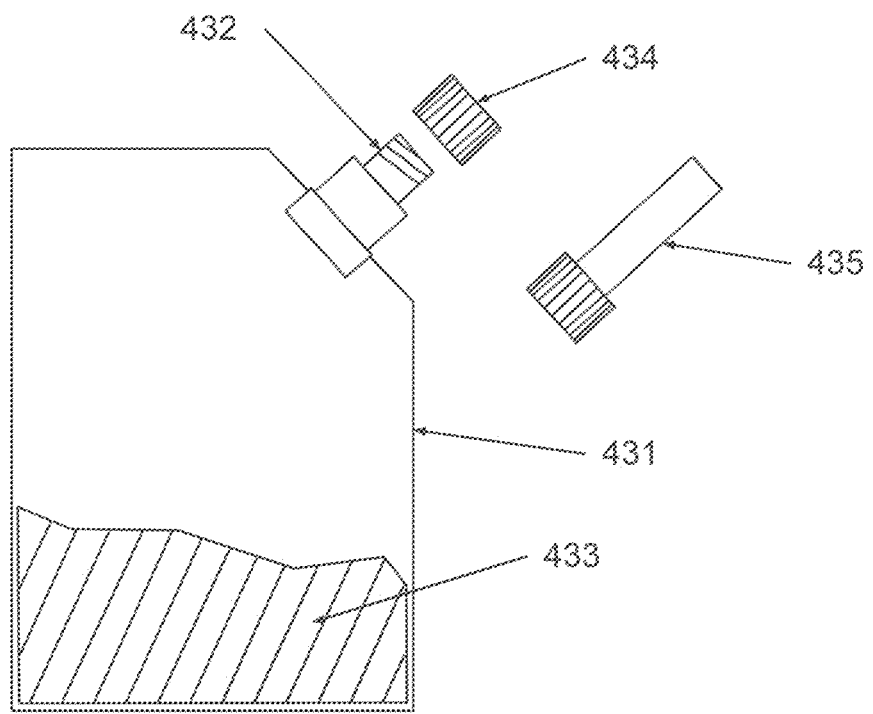
FIG. 4d shows a flexible food-grade plastic pouch, in an embodiment.
Figure 4E:
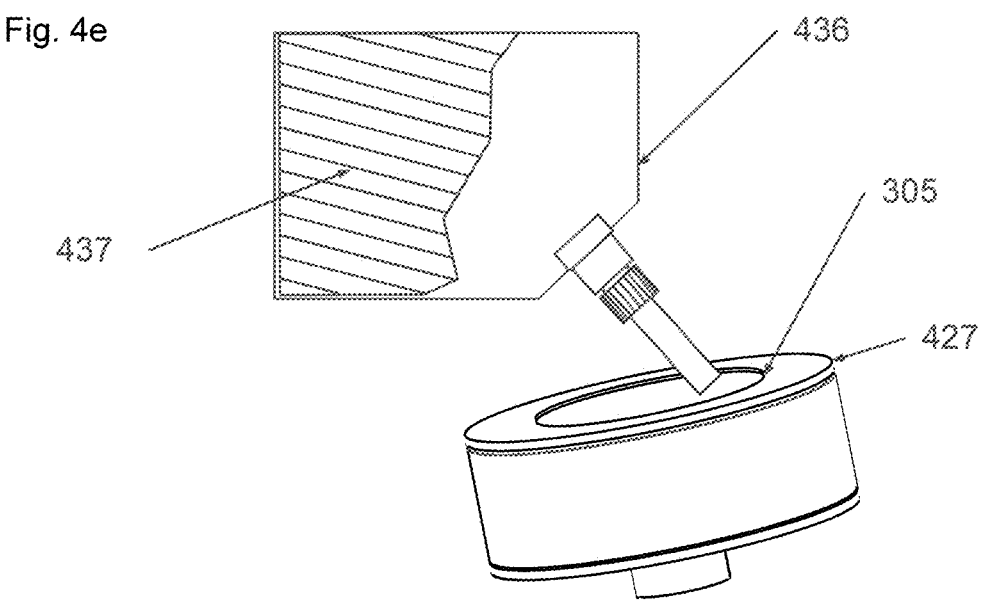
FIG. 4e shows injection of mixed food from the flexible food-grade plastic pouch into a rotor, in an embodiment.

FIG. 4d shows a standard flexible food-grade plastic pouch 431 having a threaded opening 432 and closure cap 434. These are readily available in 8-oz size which is convenient for mixing ¼ cup measures of standard baking mixes that may be used in rotor 301. In operation, the pouch 431 is pre-filled with a dry baking mix 433 and then sealed with cap 434 for long-term storage. Later, as similarly shown in FIG. 47a, water is injected into the pouch 431, the cap 434 is replaced, and the pouch is shaken, resulting in mixed dough 437 which may be injected into the spinning rotor dam opening 305 using a long spout 435, as depicted in FIG. 4e. While bread doughs are ropy substances, using the long spout 435 and squeezing a hydrated pouch 436 manually may extrude the dough directly onto the inner rotor wall of spinning rotor 427. This method of direct application facilitates the stream of dough breaking into chunks that quickly accelerate, stick to, spread over and self-level across the inner surface of spinning rotor 427.

Figure 5:
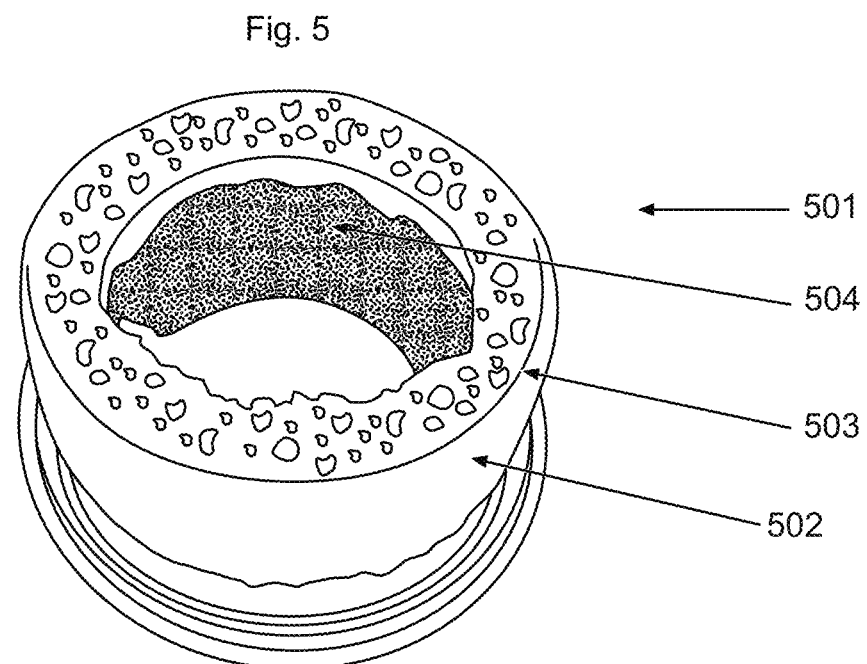
FIG. 5 shows a spin cake made using an artificial gravity heating device, in an embodiment.

FIG. 5 shows a spin cake 501 made from cooked and browned pancake batter using a rotor 301 inductively heated induction coils 403 (see FIGS. 20-23). In embodiments, pancake batter is mixed then poured into rotor 301 where rotor dam 304 has been used to cap rotor 301. Rotor 301 is then rotated at 400-rpm to accelerate the pancake batter against the inside of heated rotor wall 302 where the batter self-levels under approximately 10-G's of centripetal acceleration. When the outer surface temperature of cake 502 reaches 175-degrees Celsius, Maillard browning occurs, a reaction in which amino acids and sugars in the food ingredients are converted into a harder crust characterized by the complex flavor profiles associated with browned pancake batter. An inside crust 504 of the cake is browned by a processing core 1004 (see FIG. 11) that imparts temperatures of approximately 175° C. on the inside of the cake using forced convection.

Figure 6:
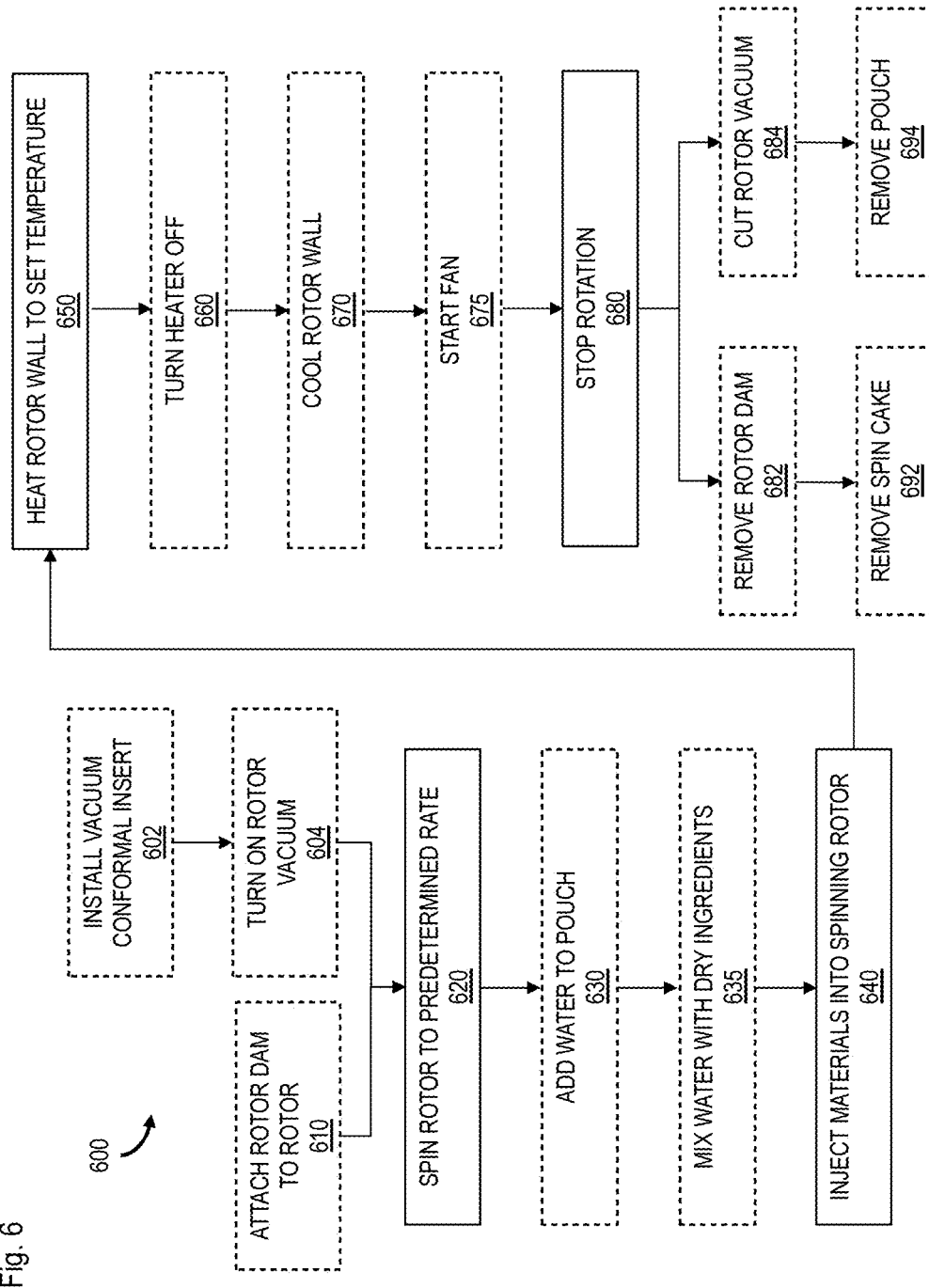
FIG. 6 is a block diagram showing steps of a method for heating materials using an artificial gravity heating device, in an embodiment.

FIG. 6 is a block diagram showing steps of an exemplary method 600 for heating materials using an artificial gravity heating device as described herein. The following steps may be performed in the order shown in FIG. 6 or in different orders without departing from the scope hereof. A spin cake of food cooked using method 600 may create similar results either on Earth or low gravity environments when the spin rotor rate is substantially higher than 1-G. Therefore, method 600 is the same whether performed on Earth, in space or eventually on the Moon or Mars.

In an optional step 602, a vacuum conformal insert is installed. In an example of step 602, a conformal pouch 5301 is inserted into a vacuum rotor 5601, as described below in connection with FIG. 53d.

In an optional step 604, a rotor vacuum is turned on to provide negative pressure to the bottom of the rotor. In an example of step 604, a vacuum is applied to vacuum rotor 5601, thereby pulling conformal pouch 5301 to conform to the inside profile 5606 of rotor 5601, as further described below in connection with FIG. 53d.

In an optional step 610, a rotor dam is attached to a rotor. In an example of step 610, rotor dam 304 is placed around the open end of rotor 301.

In a step 620, the rotor is spun to a predetermined rate. In an example of step 620, rotor 301 is spun to 400-rpm.

In an optional step 630, water is added to a pouch. In an example of step 630, water is added to pouch 431.

In an optional step 635, water is mixed with dry ingredients. In an example of step 635, dry baking mix 433 is mixed with water to provide hydrated pouch 436.

In a step 640, materials are injected into a spinning rotor. In an example of step 640, material 103 is injected in spinning rotor 427.

In a step 650, the rotor wall is heated to a set temperature. In an example of step 650, temperature-controlled cylinder wall 102 is heated to 175° C.

Figures 14, 15, 16, 17, 18, 19:
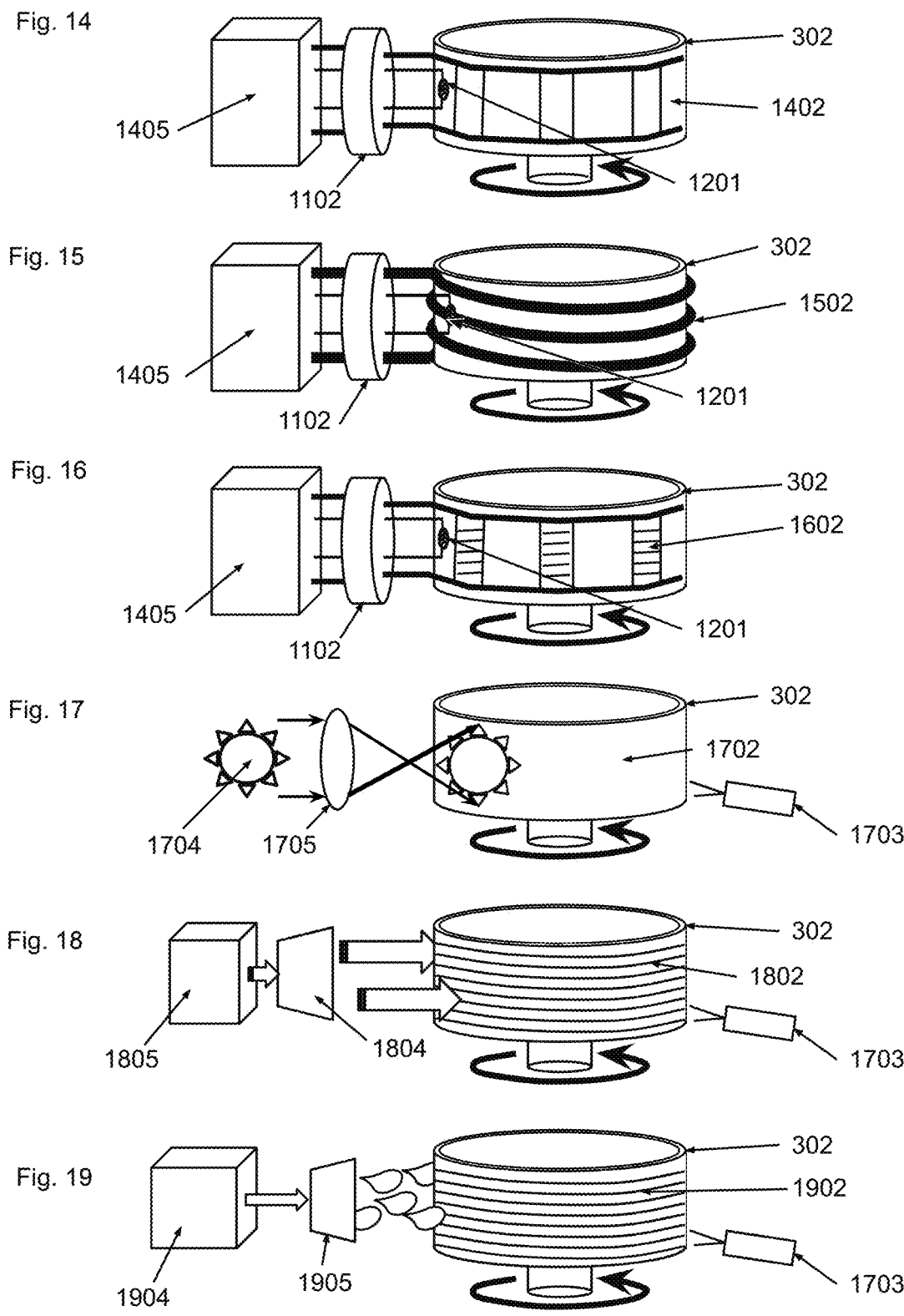
FIG. 14 shows a temperature-controlled rotor wall with heater modules, in an embodiment.
FIG. 15 shows rotor wall heated by resistors, in an embodiment.
FIG. 16 shows a rotor wall heated and cooled thermostatically using finned Peltier heat pump modules, in an embodiment.
FIG. 17 shows heating by focusing thermal radiation, in an embodiment.
FIG. 18 shows a fan configuration for heating or cooling a rotor wall, in an embodiment.
FIG. 19 shows liquid heating and cooling of rotor wall, in an embodiment.

In an optional step 660, the heater is turned off. In an example of step 660, a PTC heater module 1402, described below in connection with FIG. 14, is turned off via a wall heat switch 4913 (see FIG. 49).

In an optional step 670, the rotor wall is actively cooled. In an example of step 670, a cooling element is turned on to cool rotor wall 302. The cooling element may be a Peltier cooling device, in embodiments.

In an optional step 675, a fan is started. In an example of step 675, an exhaust fan 2704 is turned on to pull air in through a top of a shroud suction port 2706 between a shroud shell 2701 and the rotor wall 302, as described below in connection with FIG. 27. In another example of step 675, a shroud push/pull fan 3504 is turned on with switch 4915 for pushing air in or pulling air out of the shroud, as described below in connection with FIG. 49.

In a step 680, rotor rotation is stopped. In an example of step 680, a rotation on/off switch 4920 is used to turn off the motor powering rotor 301.

Following step 680, method 600 may either proceed to step 682 to remove the rotor dam and step 692 to remove the spin cake, or if a vacuum pouch is used, method 600 instead proceeds with step 684 to cut the rotor vacuum and step 694 to remove the pouch, as described below.

In an optional step 682, a rotor dam is removed. In an example of step 682, rotor dam 304 is pried off of rotor 301.

In an optional step 692, a spin cake is removed. In an example of step 692, a pepperoni pizza food cake 4803 is removed from rotor 301 using spatula 4802, as described below in connection with FIGS. 48a and 48b.

In an optional step 684, the rotor vacuum is turned off. In an example of step 684, the vacuum suction provided to the bottom of conformal pouch 5301 in vacuum rotor 5601 is turned off, as described below in connection with FIG. 53d.

In an optional step 694, the vacuum conformal insert is removed. In an example of step 694, conformal pouch 5301 is removed (e.g., by hand).

Figure 7:
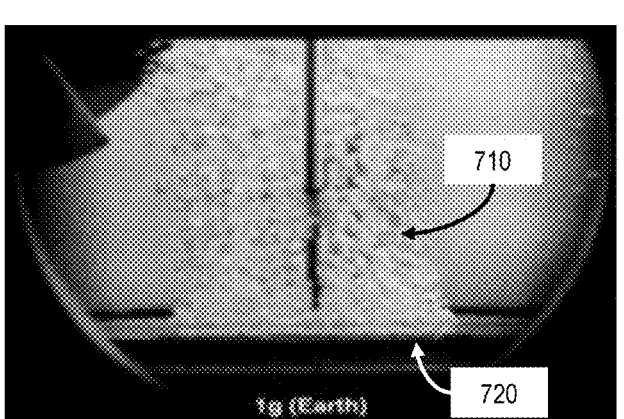
FIG. 7 shows an example of water being boiled in normal Earth gravity.

FIG. 7 shows water being boiled over a heated plate 720 in normal Earth gravity 700, in which steam bubbles 710 breakaway and rise vertically above the heated plate 720 and grow until their gravity induced buoyancy dislodges them from their nucleation points on the heating plate 720. Convective rising of hotter water and rising of steam bubbles 710 transfer heat throughout the water.

Figure 8:
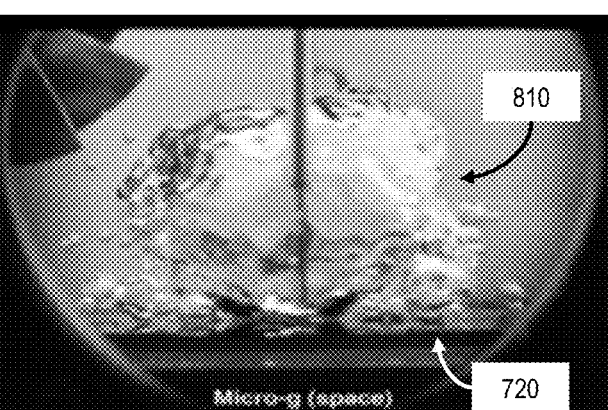
FIG. 8 shows an example of water being boiled in microgravity.

FIG. 8 shows water being boiled in microgravity 800 onboard a spacecraft, in which water is vaporized into steam bubbles by heated plate 720, but without gravity induced convection and buoyancy effects, individual nucleated bubbles of steam form on the surface of the heated plate 720 and simply coalesce into a stationary larger steam bubble 810 rather than rise. The resulting stagnant bubble 810 produces undesirable hot spots on the heated plate 720, and heat transfer is limited to diffusion which is orders of magnitude slower convective flow and buoyant bubbles. Additionally, if the water contains dissolved organic compounds of value, these compounds could be damaged or scalded by the recurring hot spots. Thus, a process as simple as boiling water may be very difficult in microgravity. The artificial gravity heating device described herein may therefore be advantageously used with boiling processes, such as industrial boiling processes like those illustrated in FIG. 61 used to support in situ resource utilization and life support functions in low gravity and Zero-G environments.

When boiling water with the artificial gravity heating device, the inner surface of rotor wall 302 is devoid of large bubbles as they are rapidly pulled off the surface due to buoyancy generated by the artificial gravity conditions of the rotating rotor 301. In embodiments, an induction coil 807 is used to heat the inner surface of rotor wall 302 according to the principle illustrated in FIG. 20. As the water surface boils in the artificial gravity heating device, droplets cast into the air are directed back into the water by centripetal acceleration. As a result, virtually no water splatters out of the rotor dam opening 305. As the rotor speed increases the boiling surface gets increasingly smooth even though the amount of heating power provided to the rotor wall remains the same. Therefore, at increased rotor speeds, higher rates of boiling may be able to occur for the same heating surface area, suggesting the possibility of manufacturing small industrial water boilers in microgravity.

In addition, experimentally a thermocouple tip in the water suggested that the wall-water boundary superheating may be occurring that is in excess of superheating expectations due to local ambient absolute pressure enhancement due to artificial gravity. Excess superheating, if proven true with better instrumentation, would enable increased steam bubble nucleation and growth in mid radial depths between the water surface and the wall surface. Experimentally, mid-depth bubble generation was also strongly increased when the rotor was electronically braked from its operating speed to a near stop at a frequency of 0.8 Hz with a braking duty cycle of 25%. Results indicate there may be application of braking when boiling thick substances to express steam bubbles of sufficient size to surface in artificial gravity enhanced buoyancy despite the mixtures being more viscous. The enhanced buoyancy would also be expected to enhance the speed of bubble movement from any source. Boiling and thermal processing of thin and thick liquids is expected to be a core process during food generation, manufacturing, mining and life support systems for long space voyages and planetary colonization. For example, boiling and dehydrating viscous split-pea soup to a dry flake without burning the soup has been achieved with the artificial gravity heating device.

Figure 9:
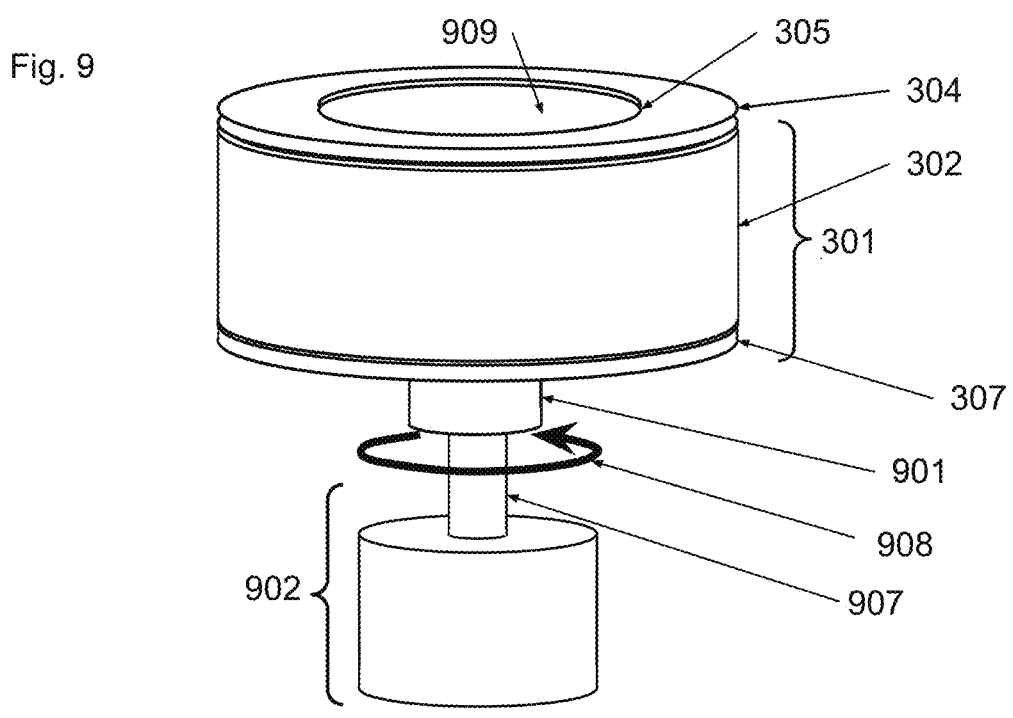
FIG. 9 shows components of a rotor of the artificial gravity heating device, in an embodiment.

FIG. 9 shows components of rotor 301 in embodiments. The rotor dam 304 may, in embodiments, be permanently attached to the rotor 301 by an adhesive or mechanical sealing method. Like the rotor dam 304, the rotor base 307 also prevents the contents of rotor 301 from spilling out while spinning. A motor shaft 907 mechanically couples the rotor 301 with a motor 902. Internal bearings of motor 902 align the motor shaft 907 and rotor 301 on the axis of rotation in a rotationally balanced configuration. The motor 902 may be operated to rotate in either direction such that the motor shaft 907 spins the rotor 301 in either a counterclockwise or clockwise direction. In embodiments, motor may be operated to alternate rotational directions or with varied rotational acceleration to provide an inertial mixing mode. The rotor base 307 also helps thermally isolate the rotor 301 from the rotation coupling 901 and motor shaft 907 and motor 902 that provides the rotational drive.

An interior surface of the rotor 301 may be covered with a non-stick coating 909 that releases from sticky food ingredients that are cooked in the rotor. Non-stick coating 909 may be made of silicone rubber, non-stick Teflon™ or other permanent non-stick materials. Alternatively, non-stick coating 909 may comprises a temporary non-stick coating through the application of release agents such as cooking oil or other non-stick spray. Non-stick coating 909 may also be utilized to retard chemical corrosion or alter the hardness of the interior surface or rotor 301. Additionally, non-stick coating 909 may be configured to reduce mechanical erosion or chemical corrosion of rotor 301 and/or other components.

Figure 10:
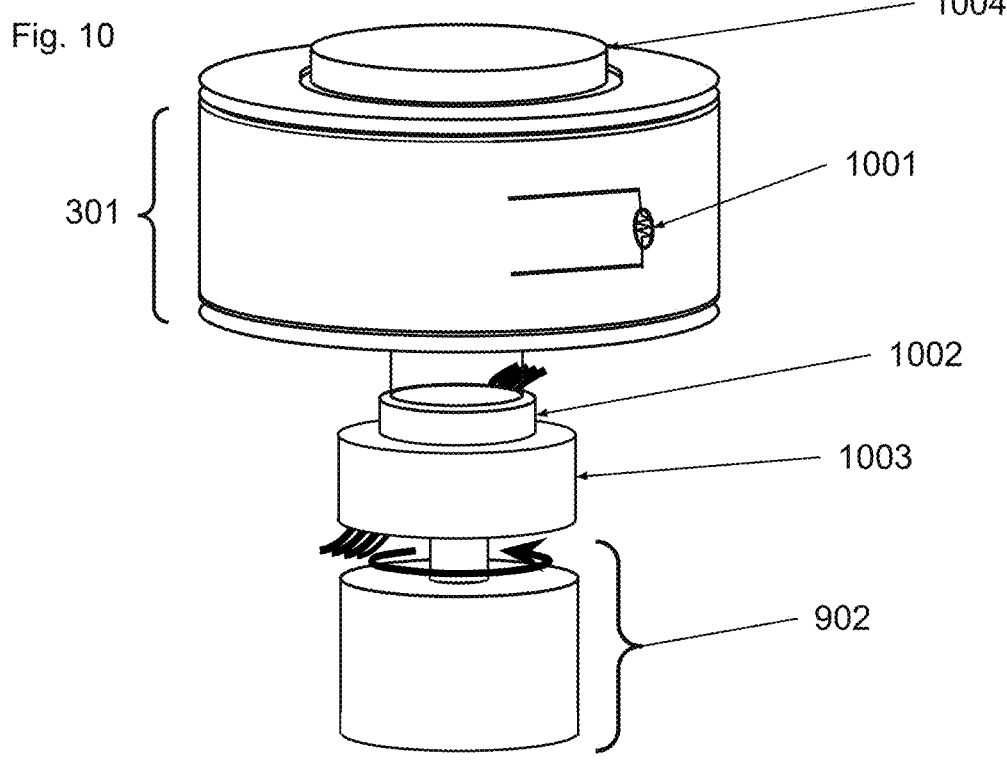
FIG. 10 shows a rotor with additional components, in an embodiment.

FIG. 10 shows rotor 301 with additional components used in embodiments. A wall temperature sensor 1001 provides a signal indicative of the temperature of the rotor wall 302. Temperature sensor 1001 is for example a thermocouple, thermistor, or resistance temperature detector (RTD). In embodiments, temperature sensor 1001 is communicatively coupled with a controller for receiving the temperature signal. A slip ring rotating part 1002 provides operating resources such as electrical circuits, fluid, and gas tube connections to non-rotating components. Slip ring non-rotating part 1003 connects non-rotating components such as electrical circuits, fluid and gas tube connections to the rotating slip-ring part 1002 and thereafter to components of the rotor 301. Processing core 1004 is able to be inserted through the rotor dam opening 305 so that the core 1004 may have access to deposit, process or harvest the contents of rotor 301. In embodiments, core 1004 is configured to be a part of rotor 301 and rotate with the rotor 301, in which case, the rotor dam opening 305 may be smaller or even omitted, and pressure relief and resources may pass through the slip ring.

Figure 11:
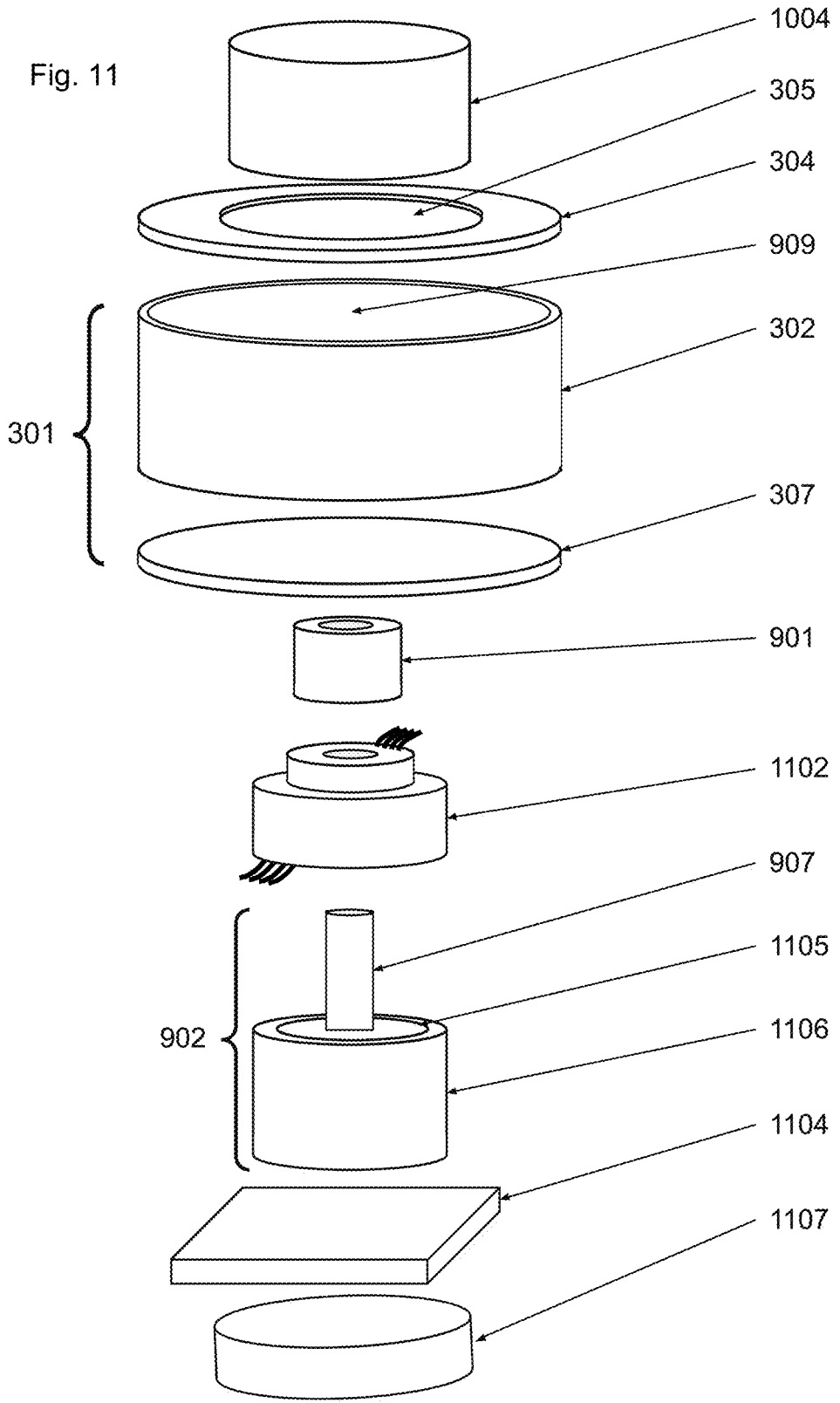
FIG. 11 is an exploded view of a rotating assembly, core, stator and reaction plate, in an embodiment.

FIG. 11 is an exploded view of a rotating assembly, core, stator and reaction plate, in embodiments. The processing core 1004, may be configured to provide one or more of the following services: inner cake radius browning, cooking rotor ventilation, process ingredient injector, rotating product extractor, rotor cavity cleaning and inner cake radius temperature sensing. The processing core 1004 may be configured as a spinning part built as a component of rotor 301 or a non-spinning component inserted through rotor dam opening 305.

The rotor dam opening 305 allows access for ingredient loading, observing, processing, venting, stirring, browning and product harvesting. If only used for venting, the opening may be small.

Rotor dam 304 functions to hold the contents in the rotor, be compatible with the temperature and expansion parameters of thermally controlled wall 302, and be non-stick. Opening 305 is used to introduce liquid, solid and powder materials into the rotor, and allow the harvesting of finished product. Rotor dam 304 may be transparent glass or plastic to enable visibility inside the rotor 301, in embodiments.

The rotor wall inner coating 909 may be used to prevent rotor corrosion, chemically isolate rotor contents, provide a non-stick surface or improve thermal conduction between thermally controlled wall 302 and material contents.

Figure 20:
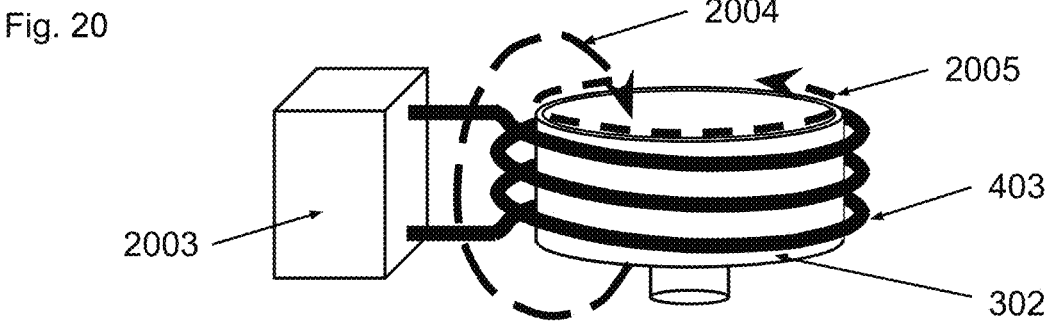
FIG. 20 shows coulomb heating of a resistive rotor wall, in an embodiment.
Figure 26:
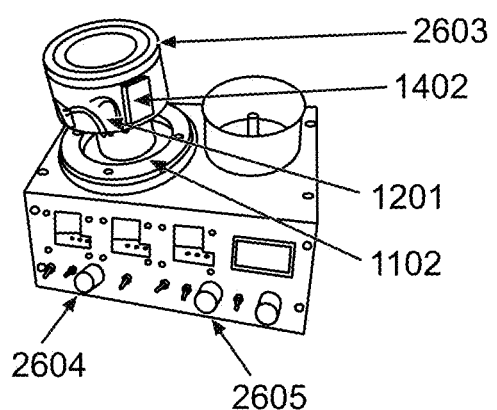
FIG. 26 shows an artificial gravity heating device of FIG. 25 with a shroud removed.

Thermally controlled rotor wall 302 may be cooled, heated and temperature sensed through a variety of technologies described in FIG. 12 and FIGS. 14 through 24. Technologies discussed in these figures enable rotors 301 and rotor walls 302 to be configured to operate at cryogenic temperatures or incandescent temperatures greater than 2000° C. or any temperature therebetween. For example, rotor walls made from machined carbon may be heated to incandescence using the inductive heating method shown in FIG. 20. Following the heating principle of FIG. 15, a rotor wall made from a spiral tungsten heating element embedded into a high temperature ceramic wall filler may surpass 2000° C. operation. Using high temperature wall technology, a variety of materials could be molten, vaporized, chemically disassociated, and undergo other process steps useful to planetary mining and manufacturing. For example, rotor 301 using the inductive heating technology of FIG. 20 is made from a 0.4-mm thick SS-304 stainless steel cup. In another example, rotor 301 made from a 2-mm thick aluminum tube was heated by Positive Temperature Coefficient (PTC) modules 1402 as shown in FIG. 14 and FIG. 26.

The rotor base 307 seals the bottom end of the rotor wall 302 and may be attached permanently by gluing or welding or temporarily by latches that assist with cleanout operations of rotor 301. Rotor base 307 is made from a heat resistant thermal insulator that is mechanically stiff to withstand rotational loads from occasional rotor 301 imbalance, in embodiments. For example, the rotor base 307 may be made from SS-304 stainless steel which is a poor heat conductor. In another example, the rotor base 307 is made from high temperature phenolic plastic which is a poor heat conductor and is epoxied to rotor wall 302. In yet another example, the rotor base 307 shown in FIG. 34 is phenolic and adhered to thermally controlled wall 302 by a silicone rubber radial seal 3403 that allows differential expansion between base 307 and wall 302. Very high temperature rotors may have rotor bases made from refractory metals and ceramics. Rotor base 307 may also be perforated to allow electrical, liquid and granulated resources to enter and leave rotor 301 through the ports of slip ring 1102.

Rotation coupling 901 detachably attaches motor shaft 907 to rotor base 307. The rotation coupling 901 is configured to withstand both accelerating and decelerating rotational torques delivered to the rotor 301 from the motor shaft 907. In embodiments, the couplings are made from threaded steel and aluminum machined parts.

Slip ring 1102 provides electrical power and sensor connections between the non-rotating parts and the rotor 301. In an embodiment, the slip ring 1102 used was a six circuit 10-amp through hole model (see FIG. 26). Other slip ring designs and rotary couplings may carry liquid, gas and granulate contents to assist processing and harvesting rotor contents. Some such slip rings and rotary coupling designs may work in concert with hollow-shaft motors that enable electrical, liquid, gas and granulate resources to pass back and forth along the axis of rotation. Still other methods of power transfer to rotor 301 may employ rotary transformers as described in FIG. 24.

Motor shaft 907 operates as a spindle making use of the motor 902 bearings to support rotation of rotor 301 while resisting bending torques from potential imbalances in rotor 301 and the rotating materials 205 it carries. In embodiments, motor shaft 907 is hollow allowing electrical fluid, gas or granulate resources to pass to and from the rotor 301 in conjunction with an electrical slip ring or rotary fluid, gas or granulate coupling at the current position of slip ring assembly 1102 or positioned at the lower end of the motor's internal shaft.

A motor rotor 1105 operates within a motor stator 1106. Drive currents fed to motor 902 cause rotational torque to be generated from the magnetic interaction between rotor 1105 and motor stator 1106. Optionally the motor stator 1106 is connected to a reaction mass 1104 or to another physical structure. The motor stator 1106 may then support the motor rotor 1105 applying rotational torque through motor shaft 907 to accelerate rotor 301 to the desired speed to create the corresponding desired level of artificial gravity.

Reaction mass 1104 provides sufficient rotational inertia for motor stator 1106 to work against and prevent artificial gravity heating device from vibrating with rotor accelerations and decelerations. In operation, the motor stator 1106 is mechanically coupled to (e.g., bolted to) the reaction mass 1104 providing sufficient inertia for smooth operation. In embodiments, the reaction mass 1104 is a bulkhead or other physical structure onboard a spacecraft or a heavy base if on Earth.

In embodiments, a reaction wheel stabilizer 1107 is provided that contains a motor and flywheel that are accelerated and decelerated in a way to provide rotational stability to an object the stabilizer 1107 is bolted to. If reaction wheel stabilizer 1107 is bolted to reaction mass 1104 that is bolted to the motor stator 1106, the combined components for starting and stopping rotor 301 and reaction wheel stabilizer 1107 become what is called a reactionless mechanism. Reactionless mechanisms do not jerk or spin when inner rotating mechanisms accelerate or brake. Reactionless mechanisms are convenient for use in weightlessness as they may be loosely attached to a bulkhead without twisting on start and stop.

Figures 12, 13:
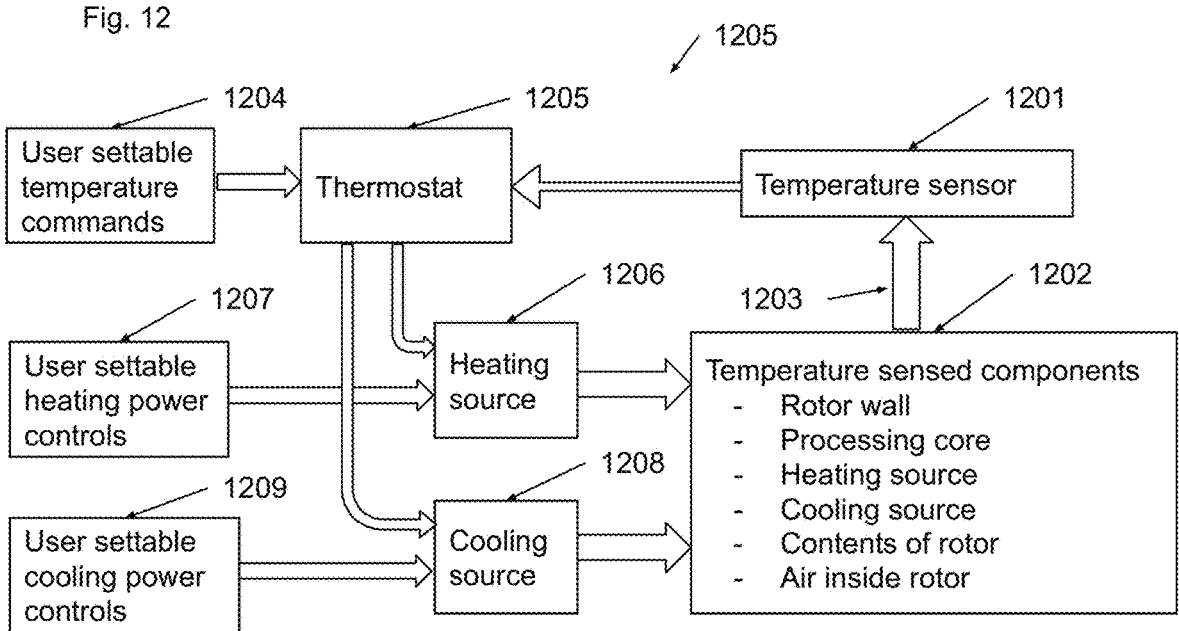
FIG. 12 shows a thermal control system for use with the artificial gravity heating device, in an embodiment.
FIG. 13 shows components of a rotational speed and braking control system, in an embodiment.

Operating the disclosed embodiments in practice might involve rapid braking, acceleration and oscillating cycles for mixing or processing material contents and cleaning of the rotor 301 inner surfaces by using a control system, such as the example shown in FIG. 12. For this reason, the reaction mass 1104 and reaction wheel stabilizer 1107 may be important for enhancing the stability of the artificial gravity heating device.

FIG. 12 shows an exemplary thermal control system 1200 for use with the artificial gravity heating device. The purpose of control system 1205 is to control the temperature of rotor 301 to induce a thermal process on contents of the rotor 301.

A temperature sensor 1201 may be a thermocouple, thermistor, RTD, or other heater-wire resistance signal indicative of the temperature of the component 1202 being sensed. A sensing mechanism 1203 may be via thermal conduction between temperature sensor 1201 and component 1202. Alternatively, an infrared thermometer (see IR thermometer module 1703 in FIGS. 17-19) may be used for measuring temperature of the component 1202 from a non-contact standoff distance. A thermostat 1205 is communicatively coupled with a temperature interface 1204 for receiving a temperature input for a set temperature of a selected component 1202. If the input received by the thermostat 1205 is lower than the sensed temperature from the temperature sensor 1201, the thermostat 1205 sends a heating command to the heating source 1206 to provide heat until the temperature of component 1202 reaches a set temperature. The thermostat 1205 then turns the heating source off until the component 1202 temperature 1201 is lower than the set temperature by a predetermined amount. In embodiments, the temperature sensor 1201 is a thermistor paired with thermostat 1205. For some embodiments, a heating power interface 1207 is a 24-volt, peak-current adjustable power supply. The heating power interface 1207 may be turned off to exit heating as a mode of temperature control. The heating source 1206 may operate from a number of different perspectives. Examples are shown in FIG. 14 through FIG. 24.

In cooling mode, a cooling source 1208 is controlled via cooling interface 1209. The cooling source 1208 is used to alter temperature of a selected component 1202 by using a cooling mechanism such as one of those described in connection with FIG. 16 through FIG. 19. In embodiments, an adjustable speed electronics fan operated in conjunction with a cooling shroud (see shroud 2507 in FIG. 26) may be used to reduce the temperature of the rotor wall 302 by forced circulation of air across the surface. When the temperature sensor 1201 indicates the selected component 1202 is above the set temperature from cooling interface 1209 by a predetermined amount, the thermostat 1205 turns the cooling source 1208 on. When the temperature of the selected component 1202 falls below the user set temperature by a predetermined amount, the cooling source 1208 is set to off.

FIG. 13 shows components of an exemplary rotational speed and braking control system 1309. In embodiments, a user may adjust a rotational drive voltage 1305 which passes through a braking circuit 1308 and powers an electric motor to provide acceleration torque to rotor 301 that is delivered by motor shaft 907. A gravity-level (G-level) readout 1304 measures motor voltage and displays to the user the G-level in rotor 301 based upon rotor 301 speed. Alternatively, G-level is computed from the drive voltage of 1305. The user then adjusts rotational drive voltage 1305 to achieve the desired G-level needed to generate thermal contact of materials enabling thermal processing of the materials. In embodiments, rotational drive voltage 1305 is provided by an adjustable voltage power supply that drives the DC electric motor 902, with the G-level being set by the user via rotational drive voltage 1305.

A braking circuit 1308 is configured to activate and brake the motor 902. Braking circuit 1308 comprises a DC relay that when energized by a high signal 2607, disconnects rotational drive voltage 1305 from the motor 902 and shorts the power leads the motor 902 together. In embodiments, motor 902 is a DC brushed motor. When DC motor 902 is spinning it generates a back electromotive force (back EMF) voltage that when shorted out by connecting the DC motor leads together, brakes the speed and momentum of the rotor 301 by dissipating its energy through shorting the motor's back EMF voltage through motor 902's internal electrical resistance. A braking pattern is user set by a braking pattern generator 1307 and may consist of a pattern of accelerating to speed for 0.75 second and braking towards a near stop for 0.25 seconds. The applications of rotor acceleration and braking patterns include thermal and physical mixing of the captured materials in rotor 301, mechanical processing of materials, such as lengthening the strands of gluten in bread dough preparation, and scouring clean the inside of rotor 301 by using the sliding effects between entrained materials and the temperature-controlled cylinder wall 102.

FIG. 14 shows how the temperature-controlled rotor wall 302 may be heated with Positive Temperature Coefficient (PTC) heater modules 1402 that are bonded to the surface of rotor wall 302. In this example, the PTC heaters are powered by a thermostatic controlled power source 1405 passing current through slip ring 1102 to power typically four or more PTC heater modules 1402. The thermostatic power source 1405 uses signals from temperature sensor 1201 to represent the temperature of rotor wall 302 and temperature control is accomplished according to the control methods described above in connection with FIG. 12.

The rotor wall heating configuration shown in FIG. 14 may be accomplished with simple power resistors or resistance wire substituted for the PTC modules 1402. However, an advantage of heating the rotor wall 302 with PTC modules 1402 is that these modules are configured to have a specific self-limiting maximum temperature beyond which they will not heat up even if power is continuously applied. In embodiments, a set of four 50-watt PTC heating modules 1402 are used that have a rated maximum internal ceramic element temperature of 220° C. In practice, the maximum achievable rotor 301 temperature may be about 200° C. and the maximum temperature required for cooking food may be about 175° C. to 185° C.

For use in manned spacecraft, the 200° C. maximum temperature of the PTC heater driven rotor 301 used in experimental development is well below the autoignition temperature of common flammable materials and food ingredients. For example paper has an autoignition temperature of about 240° C.; wood has an autoignition temperature of about 275° C.; sugar dust has an autoignition temperature of 350° C.; alcohol has an autoignition temperature of 365° C.; wheat flour has an autoignition temperature of 380° C.;

cooking oil autoignition temperatures are all above 400° C. Additionally, 200° C. is below the smoke point of all refined cooking oils and clarified butter; however, the smoke point of butter is 150° C. and coconut oil is 175° C. Therefore, the risk of starting a fire is substantially reduced by using a heating device made with 220° C. max temperature PTC heaters. The risk of producing smoke is also substantially reduced. The artificial gravity heating device may therefore be considered fire-safe and generally smoke-safe despite potential operator error and in the case that the thermostatic heater controller became stuck in the on position or some other failure occurred.

FIG. 15 shows rotor wall 302 heated by resistors or resistor wire bonded into or onto a rotor wall 1502 that are powered by thermostatic power controller 1405 through slip ring 1102 and using temperature sensor 1201 to feed rotor temperature data back to the thermostatic controller 1405 using the temperature control principles described in FIG. 12. The advantage of resistance heating of rotor 301 is that the high temperature limit is set only by the selection of materials in the rotor. For example, nichrome resistance wire may operate up to a temperature of 1175° C. Coupled with a rotor wall 302 made from high-temperature materials such as ceramic, spin rotor thermal processing of materials up to 1175° C. is possible. For example, tungsten lighting filaments may be used, which operate up to 3000° C. In embodiments, tungsten heating filaments may be used in a high temperature ceramic rotor wall able to spin process materials at temperatures well above 2500° C.

FIG. 16 shows a rotor wall 302 that may be both heated and cooled thermostatically using finned Peltier heat pump modules 1602. In the Peltier configuration of FIG. 16, each finned Peltier module 1602 has one active face thermally bonded to rotor 301 and the other active face thermally bonded to a thermal air interface "heatsink" structure that is swung through ambient air as the rotor rotates. In operation, the thermostatic power controller senses the temperature of the rotor 301 using temperature sensor 1201.

If the rotor 301 temperature is too cold, the power controller and slip ring 1102 passes current in the first direction through the Peltier module. This first direction causes heat to be passed from the finned side of the module 1602 to the rotor side of the module. With current in the first direction, the fins of the module 1602 become cold and pick up heat energy from the air as they rotate and that heat is then conducted to the rotor wall 302 to increase its temperature.

If the rotor 301 is too warm, the thermostatic power controller 1405 and slip ring 1102 pass current in the second direction through the Peltier module 1602. With this direction current, the Peltier module 1602 pumps heat from the rotor wall 302, which becomes cool, to the Peltier 1602 finned face which becomes hot and dissipates the excess heat energy in the air as it spins.

An advantage of the embodiment shown in FIG. 16 is that it may both heat and cool the material to be processed 103 using the same Peltier modules 1602 making the overall system simpler to implement and control. In practice, these modules might heat the rotor above ambient temperature more effectively than cool it below. However, for certain applications, an array of four or more Peltier modules 1602 may be used to provide sufficient heat transfer in and out of rotor 301.

FIG. 17 shows how the rotor wall could be heated by focusing the thermal radiation from an optical radiation source 1704 (such as the sun) through distribution optics 1705 onto rotor wall 302 treated with a radiation absorptive surface 1702. Distribution optics 1705 may comprise a trough style parabolic reflector aimed at the sun and focusing its energy on rotor wall 302 rotating on-axis within the trough. An advantage is that only the sun is needed as a heating source. The temperature of rotor wall 302 may be taken using an infrared (IR) thermometer module 1703 focused at the surface of rotor wall 302.

FIG. 18 shows a configuration for heating or cooling rotor wall 302 by using a fan 1804 to blow hot or cold gas from a controllable or ambient temperature gas source 1805 onto a finned or heat conductive surface 1802 of rotor wall 302. In embodiments, this configuration is used to reduce temperature of rotor wall 302 using ambient temperature air. In the case of heating, the controllable gas source 1805 may deliver steam and convey heat to the rotor by being blown onto and condensing on the rotor wall 302, and then getting slung off into a water collection apparatus. IR thermometer 1703 shows a way of determining rotor temperature without needing a slip ring 1102 to convey temperature sensor wires across the rotating interface.

FIG. 19 shows liquid heating and cooling of rotor wall 302 using a controllable temperature liquid source 1904 sprayed onto a finned or conductive rotor surface 1902 by sprayer 1905. In the case of cooling rotor wall 302, a liquid that underwent a phase change when it impacted finned surface such as freon's transition from liquid to gas would remove large amounts of heat from rotor wall 302. IR thermometer 1703 again shows how temperature may be sensed for rotor temperature control purposes without needing a slip ring 1102.

FIGS. 20-23 show induction heater-based heating systems for heating rotor walls 302. In embodiments, each of the systems may be used with temperature sensors and components such as those described above and shown in FIG. 12.

FIG. 20 shows coulomb heating of a resistive rotor wall 302. An induction coil 403 is driven by a thermostatic controlled induction driver 2003 constructed from a 1000-watt induction heater circuit board, a 30-volt power supply and a thermostatic controller. Coulomb heating of the rotor wall 302 occurs when alternating magnetic field 2004 passing through the center of rotor wall 302 induces currents to rotate circumferentially around the wall 2005 generating resistive heating throughout the rotor wall 302 material. In the FIG. 20-23 embodiments, a rotor wall of about 8-cm in diameter may be made from 0.4-mm thick SS-304 steel, for example. Induction coils 403 may be made from 6-mm diameter copper tubing coiled into three turns of big enough diameter to clear rotor wall 302, for example.

Advantages of inductive rotor heating include: a) the rotor wall 302 may be a thin stainless steel material having suitable electrical resistance to heat up from the induced current; b) no slip ring 1102 is needed to bring heating power to the rotor; c) the thin rotor is low thermal inertia so that it may heat and cool quickly; and, d) heating power is distributed equally around the rotor wall 302. However, since the heating power is distributed in a fixed relationship, temperature levels may vary around the rotor wall depending on the amount of heat energy being absorbed from the material being heated inside.

Figure 21:
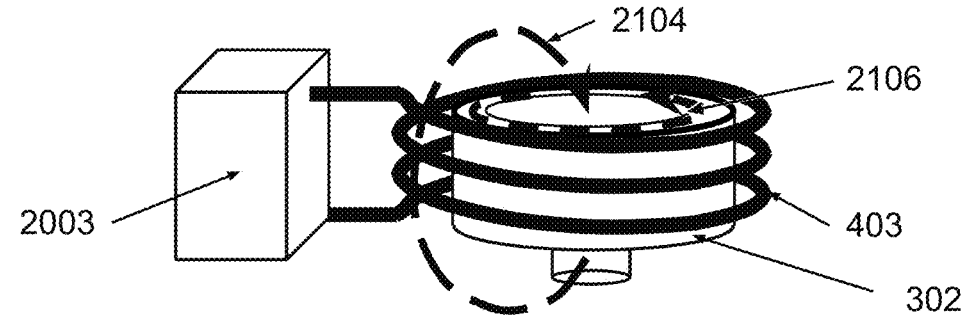
FIG. 21 shows inductive heating of rotor contents, in an embodiment.

FIG. 21 shows a second mode of inductive heating in which the contents of rotor 301, if sufficiently conductive, will conduct a heating current 2106 circularly through their mass heating it in the process. The current is induced by alternating magnetic field 2104 that passes through the rotor contents and is generated by induction coil 403 driven by induction driver 2003. A disadvantage of this system is that, for example, molten metals may be too electrically conductive causing the magnetic field to be directed around the rotor rather than through it.

Figure 22:
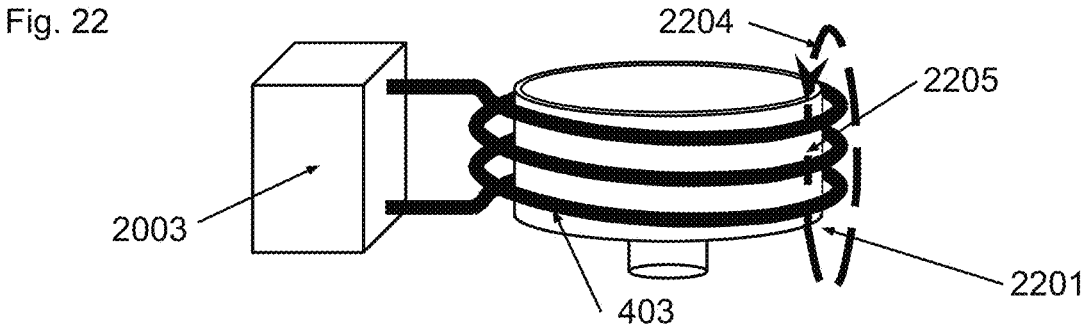
FIG. 22 shows magnetic hysteresis heating of a magnetic rotor wall, in an embodiment.

FIG. 22 shows magnetic hysteresis heating of a magnetic rotor wall 2201. In this mechanism, induction driver 2003 drives induction coil 403 causing magnetic flux from field 2204 to pass through the magnetic material of the rotor wall itself 2205. Magnetic hysteresis heating happens when the B-H curve magnetic hysteresis loop inscribes a non-zero area on the B-H curve meaning that thermal energy is deposited in the magnetic material for each rotation of the curve.

Figure 23:
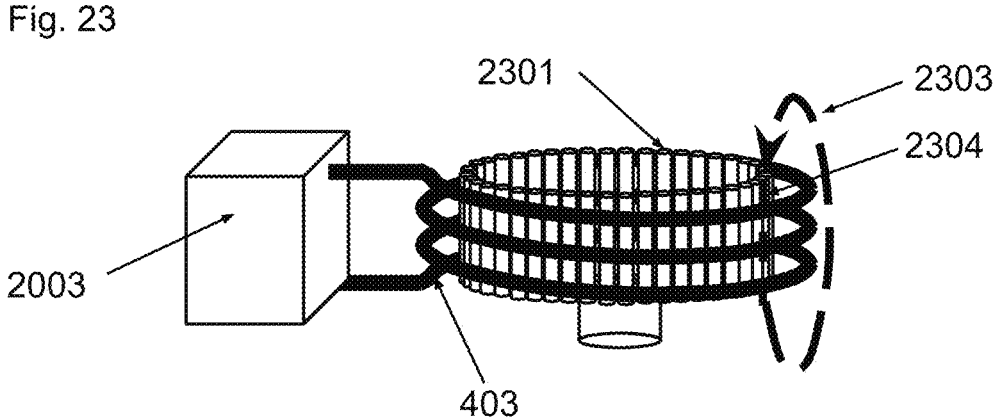
FIG. 23 shows magnetic hysteresis heating of a magnetic rotor wall, in an embodiment.

FIG. 23 shows magnetic hysteresis heating of a magnetic rotor wall 2301 made of bonded vertical pins of a magnetic material having B-H curve characteristics matched to the induction field for production of heat. In operation induction drive from driver 2003 feeds induction coil 403 which induces an alternating magnetic field 2303 that passes lengthwise 2304 through the magnetic pins making up the magnetic rotor wall 2301. The alternating magnetic field induces heat generation in the magnetic pins by rapidly changing their magnetic polarity while going around a B-H curve of non-zero area representative of the pin's magnetic material characteristics.

The epoxy bonded parallel pin configuration of magnetic rotor wall 2301 prevents circumferential heating currents from occurring so that the only heating mechanism occurring is from magnetic hysteresis losses in the pin material. In embodiments, magnetic rotor wall 2301 forms a self-temperature regulating rotor wall by making the magnetic pins out of a material whose magnetic Curie point trips at the desired temperature of regulation. In other words, when the magnetic heating effects raise the temperature of the pin above its Curie point, then the pin loses its magnetic properties and cannot generate any more heat until it cools below its Curie point. Alloys of iron, nickel, aluminum, and rare earth metals demonstrate Curie points from around 100° C. to 500° C. Rotor walls made from one of these materials would be expected to heat to the same temperature at all points.

Figure 24:
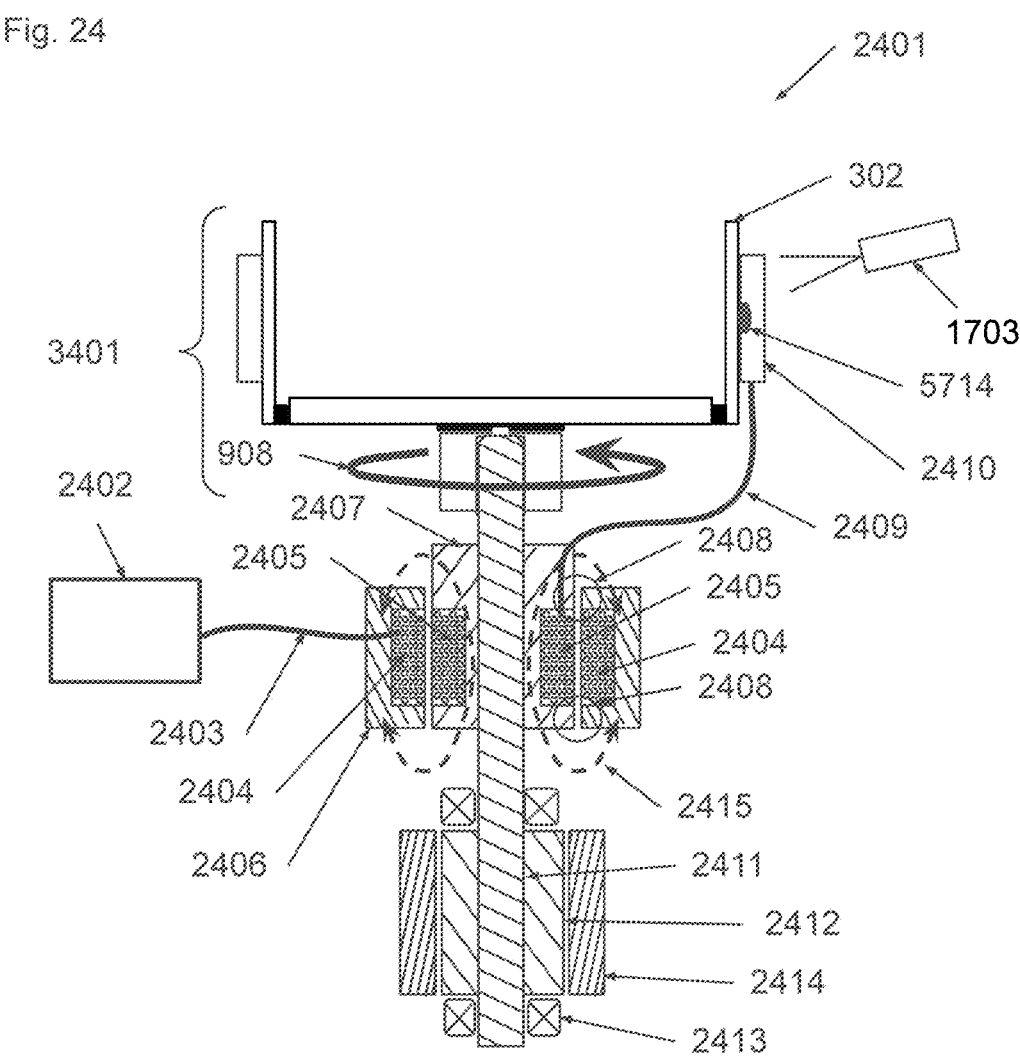
FIG. 24 illustrates a rotary transformer mechanism for transmitting electrical power to rotor heaters using a non-contact rotary transformer, in an embodiment.

FIG. 24 illustrates a rotary transformer mechanism 2401 for transmitting electrical power to rotor heaters using a non-contact rotary transformer. Slip rings, such as assembly 1102 consisting of rotating part 1002 and non-rotating part 1003 (see FIG. 10) pass power through direct sliding contact between two conductors. While serving the power transfer role well, slip rings are known to undergo wear and reliability problems when used for extended periods at high speeds. Rotary transformer mechanism 2401 is configured to provide increased reliability over a long service life.

In operation, a power source 2402 delivers high frequency alternating current power across wires 2403 to a non-rotating coil 2404 which is concentrically embedded in a non-rotating rotary transformer core 2406. The alternating current is driven through a concentric coil 2404 which induces alternating magnetic flux lines 2515 that pass through the concentric non-rotating magnetic core and across air gaps 2408, and through a rotating transformer core 2407. An alternating magnetic flux 2415 results, which inducts a corresponding alternating current in a concentric coil 2405 wound around rotating transformer core 2407 that then passes through wires 2409 to power heating elements 2410. In embodiments, power heating elements 2410 may comprise one element or a multitude or elements made up of electrically resistive or positive temperature coefficient (PTC) heater elements or Peltier-effect heating and cooling elements.

Power source 2402 operates under the control of a system as shown in FIG. 12 to control the temperature of rotor wall 302 where rotor wall 302 temperature is measured with wireless temperature sensor 5714 or non-contact IR temperature sensor 1703. Because the magnetic fields may cross an air gap 2408 between rotating 2407 and non-rotating 2406 magnetic cores, the rotor 3401 is free to rotate in direction 908 driven by a motor stator 2414 surrounding a motor rotor 2412 that drives a rotor 3401 through a shaft 2411 supported by a bearing set 2413 which accurately controls the spacing of air gap 2408. While design values vary for rotary transformer systems, typical parameters for one skilled in the art to apply would be to use alternating current of synthesized sine wave generated from Class D style electronic drive circuits, where the current emanates from power source 2402 at an approximate frequency 25,000-Hz, and where the rotary transformer uses magnetic cores 2407 and 2406 made from magnetic ferrite with low magnetic hysteresis losses and featuring an air gap 2408 of approximately 0.4 mm.

Figure 25:
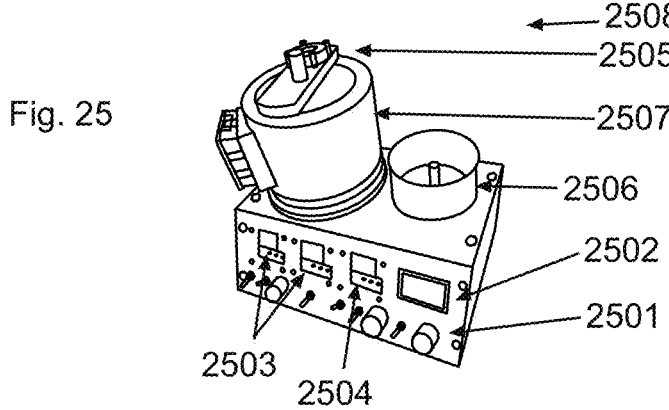
FIG. 25 shows an artificial gravity heating device, in an embodiment.

FIG. 25 shows an artificial gravity heating device 2508, in an embodiment. Included are a processing core assembly 2505 for browning and ventilating the inside of a cake 501. Cooling shroud 2507 helps with several functions including rotor cooling, capturing rotor loading splatter, suctioning crumbs during unloading, and rotor insulating during the cooking process. The processing core holding cup 2506 is a place to put a hot processing core after removal from the rotor. Motor speed readout 2502 gives an indication of the artificial gravity G-level. Motor speed adjustment 2501 sets the gravity level. Rotor thermostats 2503 set the temperature of the rotor with a selection of two preset points according to the principles shown in FIG. 12. Core thermostat 2504 controls the core temperature.

FIG. 26 shows the artificial gravity heating device 2508 with the shroud 2507 removed. In the FIG. 26 embodiment, rotor wall 302 made from a 2-mm thick 80-mm diameter aluminum cylinder. PTC heater modules 1402 are used to heat rotor wall 302. The silicone rotor dam 2603 is shown installed on the rotor wall 302. Rotor temperature sensors 1201 feed the rotor thermostats 2503. Slip ring 1102 is viewable. Shroud fan controls 2604 control rate of rotor cooling. Core fan controls 2605 control rate of core ventilation.

Figure 27:
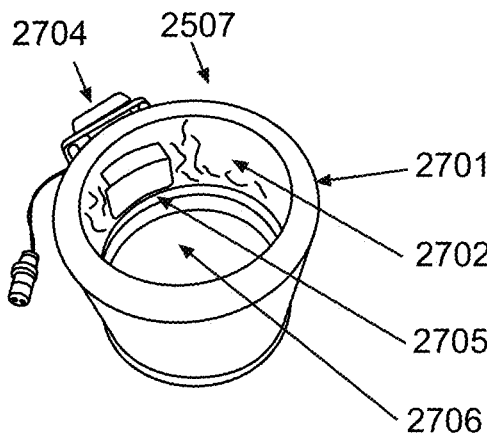
FIG. 27 shows components of a cooling shroud, in an embodiment.

FIG. 27 shows the components of cooling shroud 2507, in an embodiment. An exhaust fan 2704 pulls air in through the top of the shroud suction port 2706 between the shroud shell 2701 and the rotor wall 302. An exhaust flapper valve 2703 (see FIGS. 28 and 29) on the outer side of exhaust fan 2704 prevents air from moving into or out of the shroud unless the fan is operating. Shroud shell 2701 prevents rotor splatter from escaping and controls air flow. Heat insulation 2702 on the inside of shroud 2507 helps decrease heat loss from rotor wall 302 when exhaust fan 2704 is off. Exhaust filter 2705 filters material from being sucked into the exhaust fan 2704.

Figures 28, 29:
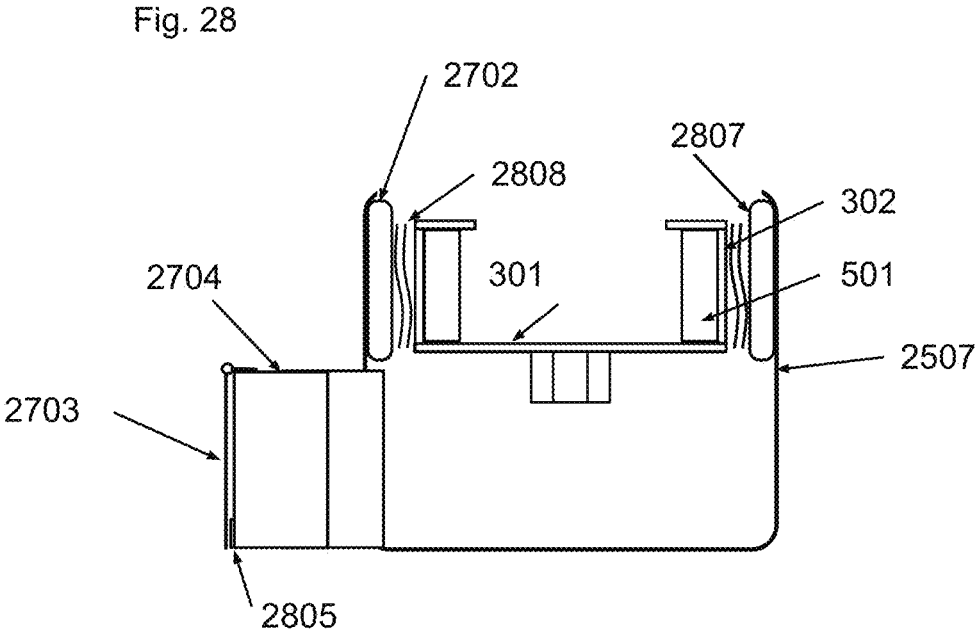
FIG. 28 is a cross-sectional side view of a cooling shroud in a thermal insulating mode, in an embodiment.
FIG. 29 is a cross-sectional side view of a cooling shroud in a rotor cooling and filtering mode, in an embodiment.

FIG. 28 is a cross-sectional side view of cooling shroud 2507 in a thermal insulating mode with the fan 2704 in an off mode. Rotor 301 spins inside an insulated tube section of shroud 2507. When exhaust fan 2704 is off, flapper valve 2703 is held closed by a weak flapper magnet 2805. As rotor 301 spins, a gas film 2808 stagnates in the space between the spinning rotor 301 and the shroud insulation 2702. The insulation surface 2807 adopts a similar temperature to the spinning rotor wall 302 thus reducing the conductive heat losses or gains with the rotor wall 302. The food cake 501 is shown inside rotor 301.

FIG. 29 is a cross-sectional side view of cooling shroud 2507 in a rotor cooling and filtering mode. While rotor 301 is spinning exhaust fan 2704 turns on, which opens flapper valve 2703 and draws cool ambient air 2905 in through the space between the spinning rotor wall 302 and the insulation surface 2807 and out through the exhaust filter 2705 and flapper valve 2703, producing exhaust heat 2906. Particulates 2907 near the mouth of the shroud 2507 may be drawn in by turning on exhaust fan 2704. The particulates may be drawn through the shroud 2507 as shown in FIG. 29 and deposited on the inner surface of exhaust filter 2705.

Figures 30A, 30B, 30C:
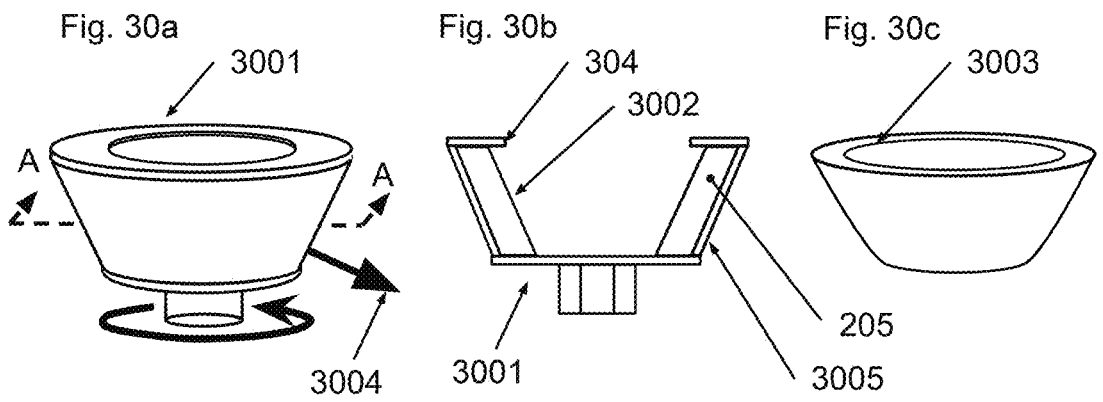
Figures 31A, 31B, 31C:
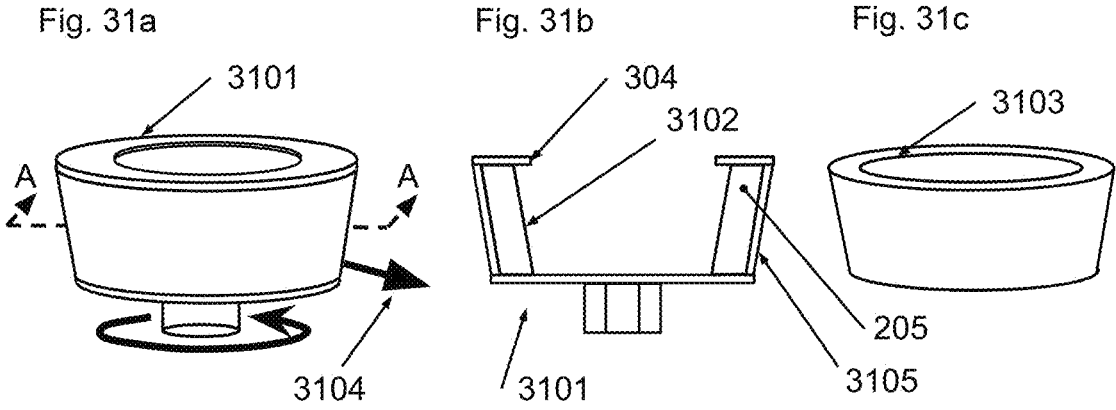
Figures 32A, 32B, 32C:
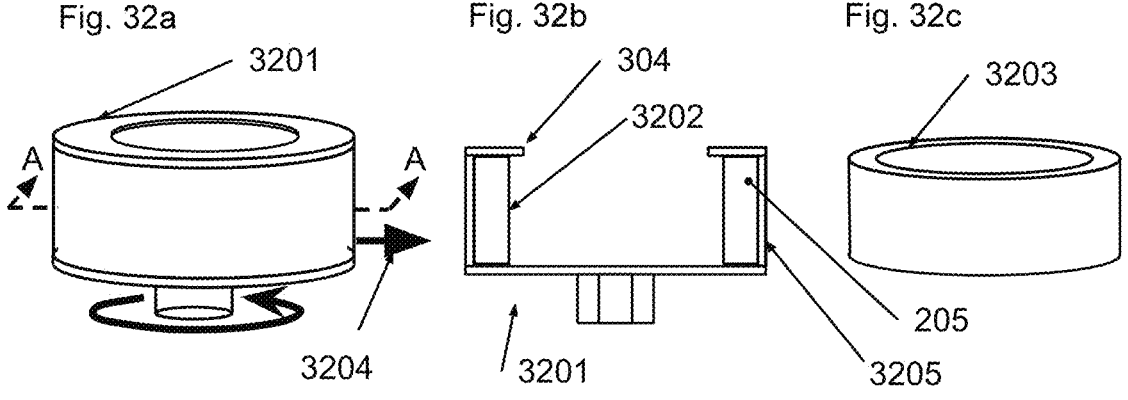

FIGS. 30*a-b*, 31*a-b*, and 32*a-b* show optional tapering modifications of a rotor wall design that may provide a more uniform thickness for food cakes made in different gravity environments. An angle of the rotor wall is based on a gravity level of the environment in which the rotor is intended to be operated, and the artificial gravity level at which the rotor is expected to be operated. For example, rotor 3001 shown in FIGS. 30*a* and 30*b* is configured for use in a 1-G environment on Earth, and an angle of the inner wall of the hollow cylinder with respect to the axis of rotation is greater than ninety degrees. For example, in some embodiments, the angle of the inner wall ranges from approximately zero degrees up to about thirty degrees compared to the rotational axis when used in non-microgravity environments for a rotation rate that provides 10-G's artificial gravity. Rotor 3101 shown in FIGS. 31*a* and 31*b* is configured for use in a low gravity environment, for example on the Moon or Mars, and the angle of the inner wall of the hollow cylinder with respect to the bottom base is greater than ninety degrees but less than that for the 1-G environment. Rotor 3201 shown in FIGS. 32*a* and 32*b* is configured for use in a microgravity or Zero-G environment, and the angle of the inner wall of the hollow cylinder with respect to the bottom base is about ninety degrees such that the rotor wall is substantially vertical.

In operation under Earth and low gravity, rotor 3001 and rotor 3101 do not have to rotate as fast due to their tapered designs compared with a straight-sided rotor 3201 to keep a constant thickness profile of food cake. Having tapered rotors like 3001 and 3101 allows using advantageous lower rotation speeds that are less likely to over compress the cake. Although the straight sided rotor 3201 has been experimentally shown to work in Earth's gravity, a high rotation speed is used to generate artificial gravity levels of approximately 10-G's that may occasionally be higher than desired for a certain recipe. For example, in making a fluffy omelet, one whisks to entrain air bubbles in the beaten egg then injects it into the heated rotor for cooking. High rotation speeds may cause these desirable entrained bubbles to rise out of the egg mixture before being immobilized by cooking hardness, thus creating a less fluffy egg. Using a tapered rotor like rotor 3001 allows slower rotation speeds, with lower G-levels and therefore a fluffier finished omelet. On Earth, egg fluffiness may be a concern for a commercial device made for Earth kitchens, for example. In microgravity, achieving fluffiness would not be an issue as long as gas bubbles may be entrained before cooking. In microgravity, the straight sided rotor 3201 may be rotated at slow speeds (<1-G) and the egg will still sufficiently rest against the rotor wall 3205. In microgravity, the speed of rotor 3201 may be increased until a desired contact pressure is reached between the rotor wall 3205 and egg, represented by food cake 3203.

FIG. 30*b* is a cross-sectional view showing rotor 301 traveling at a set G-level speed in an earth gravity environment having a tapered rotor wall 3005 that approximately matches the inside food cake profile 3002 that would naturally be created when held in by rotor dam 304 at the set G-level speed. The resultant gravity 3004 at that speed creates a relatively constant cake thickness of captured materials. As shown in FIG. 30c, the resultant cooked cake 3003, after it is removed from rotor 3001, keeps the same shape as the rotor 3001.

FIGS. 31a and 31b show rotor 3101 with a less steep taper that is adapted to create constant thickness cakes at moderate artificial gravities like the ⅙th G ambient gravity environment of the Moon. As shown in FIG. 31c, the resultant cooked cake 3103 removed from the rotor keeps the tapered shape.

FIGS. 32a and 32b show a rotor 3201 and rotor wall 3205 design for microgravity or Zero-G use. Regardless of rotor 3201 speed and artificial gravity level, the profile thickness of cake 3202 remains the same across its height. The only effect of increasing or decreasing the G-level will be to variably compress the cake. As shown in FIG. 32c, the resultant cooked cake 3203 removed from the rotor has substantially vertical sides.

FIGS. 33a and 33b shows a removable prefilled rotor liner cooking shell. Similar to instant soup in a disposable cup, a prefilled cooking shell 3304 comprises either stews or cake crust ingredients in dehydrated form. In use, water is added to the dried ingredients through a port 3302. In embodiments, a user shakes the prefilled cooking shell 3304 to mix the contents, inserts it into a slightly tapered rotor similar to rotor 3101, attaches a rotor dam to hold the liner in place, then spins and heats the rotor to cook the food. The slight taper of tapered rotor 3101 allows easy removal of the shell 3304 from rotor 3101. The user would then remove the lid 3303 to eat directly from the cooking shell 3304. FIG. 33b shows the slightly tapered shape of spin cake 503 removed from the disposable liner 3301 of cooking shell 3304. In embodiments, cooking shell 3304 comprises a disposable liner 3301 containing dehydrated stew made for space and may be consumed without removing from the disposable liner 3301. The stew may be made to gel while cooking to avoid drops of stew from floating around in microgravity. Optionally, the stew may be cooked until an outer rim is toasted where spin cake 503 is pressed directly against the inside of disposable liner 3301, which itself is pressed tightly against the inner wall of the cooking rotor 3101.

FIG. 34a is a cross-sectional side view of a heating rotor 3401 in an embodiment. Heating rotor 3401 includes additional features that increase performance and reliability compared with rotor 301 shown in FIG. 11.

A silicone rotor dam 2603 snaps onto a PTC temperature-controlled rotor wall with a radial rotor dam seal 3402 over a lip in the edge of the rotor. In embodiments, radial rotor dam seal 3402 comprises a water and oil proof silicone. PTC heater module 1402 is epoxy bonded while clamped onto machined flats on rotor wall 302. Rotor wall 302 is bonded to rotor base 307 with a DAP brand silicone rubber forming a radial seal 3403 that bridges a 1.5-mm radial gap between the base and rotor wall. The silicone rubber gap created by radial seal 3403 allows the rotor wall 302 to thermally expand and contract without breaking free from rotor base 307 due to differing coefficients of expansion and differences in temperature between the base and the heated rotor wall 302 during heating cycles.

Rotation coupling 901 is bonded to rotor base 307 with DAP brand silicone adhesive across a 0.4 mm thick bond line that absorbs differences in thermal expansion between coupling 901 and base 307 without weakening the bond. An alignment pin 3404 helps guide and center a hot air cap 4001 (see FIG. 40a). Temperature sensor 1201 works with the control circuit shown in FIG. 12 to drive PTC heater module 1402 on and off to achieve a constant temperature commanded via temperature interface 1204.

In embodiments, release coating 3405 comprises a 0.5 mm thick coating of DAPR 100% silicone aquarium safe adhesive on the inside surfaces of heating rotor 3401. Release coating 3405 enables cooked food to readily release and be removed from rotor 3401 without the need to use cooking spray. Additionally, the soft nature of the heated silicone surface of release coating 3405 enables improved thermal contact between commonly granular and uneven food surfaces with the hard heated aluminum surface of the temperature-controlled rotor wall 302. While the thermal resistance through the thickness of the silicone rubber coating 3405 may increase total thermal path resistance from rotor wall 302 to the food, better thermal contact with the food cake's surface afforded by the soft silicone rubber of release coating 3405 compensates.

Figure 34B:
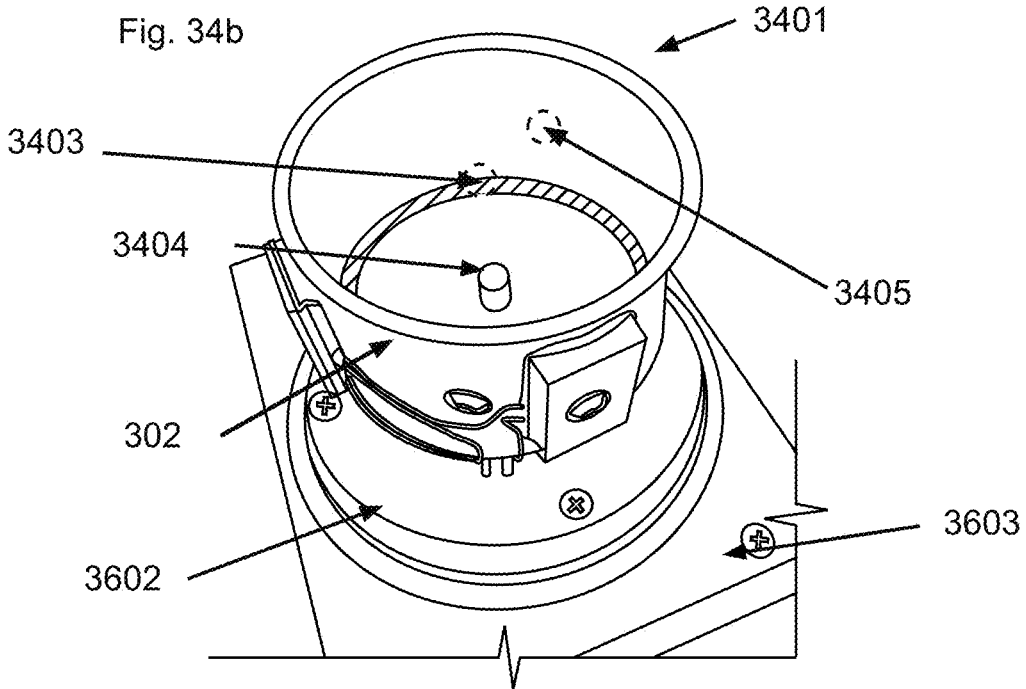

FIG. 34b is a top perspective view of the heating rotor 3401 showing the silicone radial seal 3403 and the silicone release coating 3405 spread on the inside of the temperature-controlled rotor wall 302. Also shown is a thermal insulation disk 3602 separating the rotor 3401 from the body of the slip ring assembly 1102.

Figure 34C:
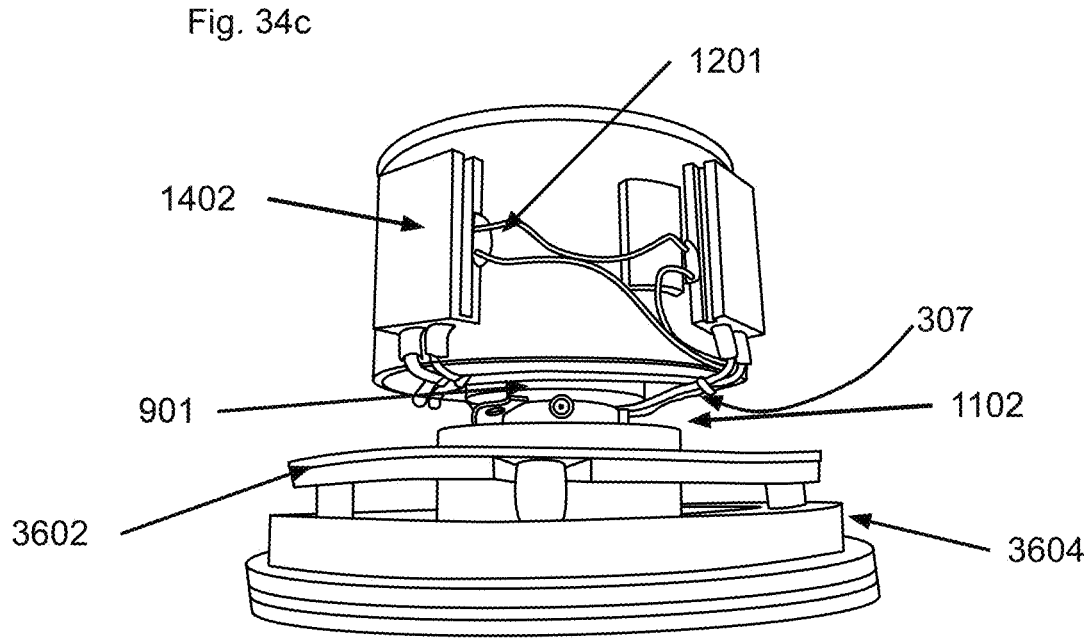

FIG. 34c is a side perspective view of the heating rotor 3401 showing PTC heater module(s) 1402 mounted with high temperature epoxy adhesive on the outer side of rotor wall 302 and the attachment of temperature sensor(s) 1201 adjacent the PTC heater module(s) 1402. The rotation coupling 901 is shown where it is glued to the rotor base 307 and attached around the motor shaft. The mounting of thermal insulation disk 3602 retards heat from moving from the rotor to the lower body of the slip ring and the rest of the motor drive assembly 2601 below.

Figures 34D, 35A:
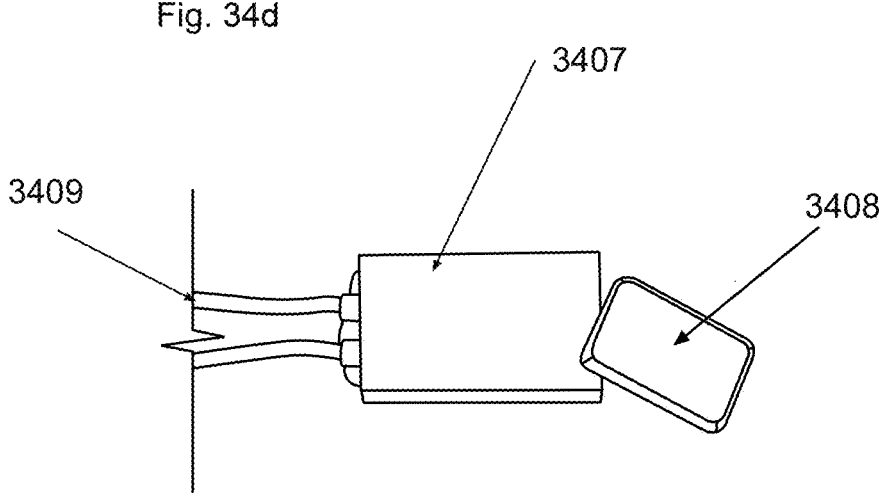
FIG. 34d shows a heater module of the artificial gravity heating device, in an embodiment.
FIG. 35a is a cross-sectional side view of a portion of a rotor shroud, in an embodiment.
Figure 35B:
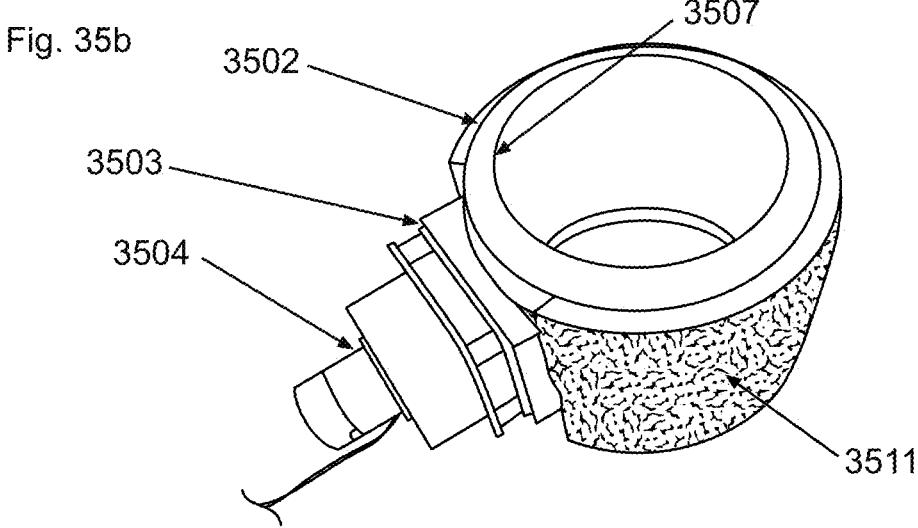
Figure 35C:
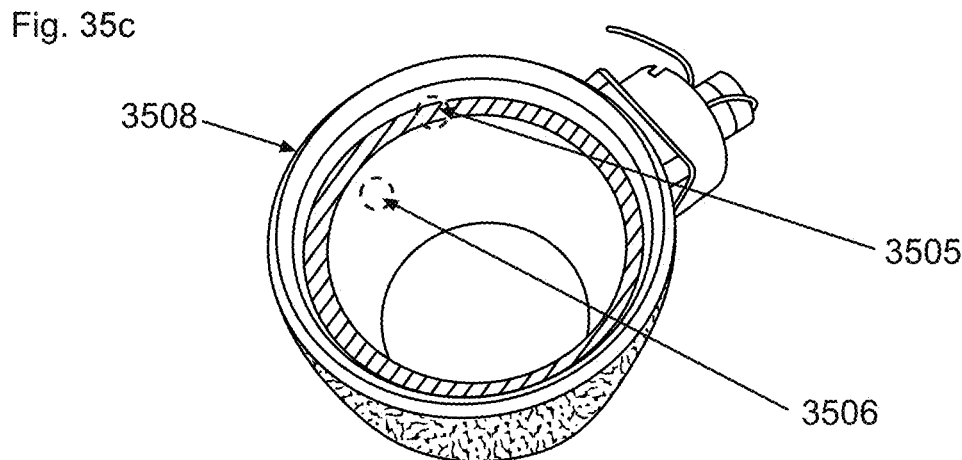
Figure 35D:
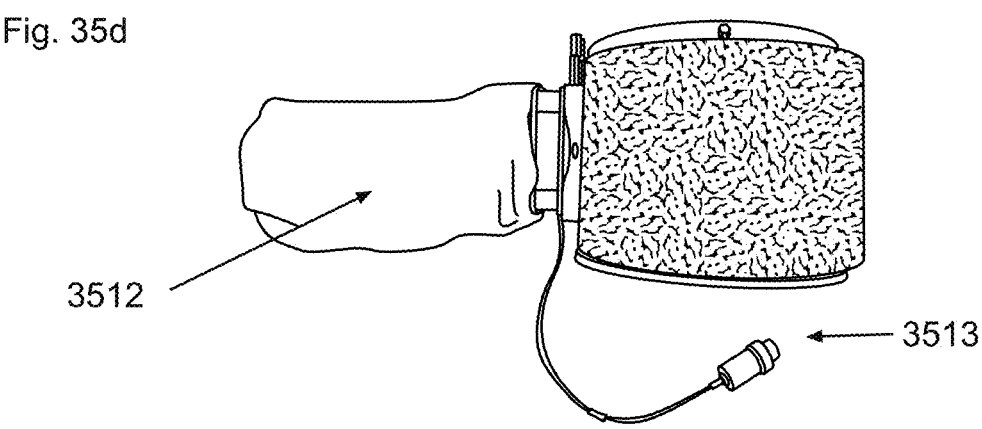
FIG. 35d is a side view of shroud with a filter sock, in an embodiment.

FIG. 34d shows an exemplary PTC heater module having a metal shell 3407 and a doped PTC ceramic resistor 3408. The doped PTC ceramic resistor 3408 is sandwiched between metal plates inside each PTC heater module that are fed by electrical power leads 3409. The doped PTC ceramic resistor 3408 is removed from the PTC heater module in FIG. 34d for clarity of illustration. In embodiments, four of the PTC heater modules are bonded to machined flats around the periphery of temperature-controlled rotor wall 302; however, greater or fewer than four PTC heater modules may be employed without departing from the scope hereof.

In embodiments, the ceramic resistor has a nominal resistance of about 10-ohms at room temperature, and when provided 24-volts on the electrical power leads 3409, generates approximately 50-watts of heating power per module. In embodiments, the temperature of the specific type of PTC ceramic resistor 3408 has a Curie temperature of 220° C. When the temperature reaches the Curie temperature, the resistance of PTC ceramic resistor 3408 dramatically increases to several hundred ohms, thereby dramatically decreasing the current flowing through the PTC ceramic resistor 3408 and limiting its heating power to only about 2-watts which is lost to the environment. The rapid reduction in heating power above the PTC heating module's specific Curie point makes the heater modules inherently temperature limited.

In embodiments, the PTC heater modules 3408 are used inside a control loop based on a signal received from a temperature sensor of the type described in connection with FIG. 12. The control loop uses the heating power of the PTC ceramic resistor 3408 to heat the rotor wall 302 to a precision temperature that is typically programmed to be in the range between about 100° C. and 195° C. for the purposes of cooking various foods in space.

While a normal resistive heating element would suffice just as well for achieving this function, using a PTC based heating module helps ensure that no system or programming failure results in any part of the temperature-controlled rotor wall 302 being able to be driven above the selected PTC heater's Curie temperature of 220° C.

The advantages of using a PTC based heater with roughly this Curie point are twofold. First there is the safety aspect that virtually nothing in a spacecraft or kitchen could be made to smoke or start on fire at temperatures below 205° C. The second advantage is that many plastics and adhesives may be advantageously used towards greater efficiency and performance if maximum temperatures are limited to 220° C. For example, the PTC heater module 1402 is itself bonded to the cooking rotor with common J-B Weld™ two-part epoxy cement.

FIG. 35$a$ is a cross-sectional side view of a portion of an rotor shroud 3501 configured for use with heating rotor 3401. In FIG. 35$a$, only one side of the rotor shroud 3501 is shown for clarity of illustration. An improved thermal insulation 3505 insert may be made from a variety of insulating materials such as multi-layer insulation, vacuum insulation or polyester fleece, for example. Insulation 3505 is covered by an insulation cover 3506 that is typically made of Teflon™ or another easily cleaned heat-resistant surface such as silicone or polyamide. A shroud shell 3502 is typically made from SS-304 stainless steel and is formed with a radial containment lip 3507 that helps capture any food ingredients accidentally slung out during loading of the heating rotor 3401 while spinning. The push/pull fan 3504 while in push mode, shown as direction 3509 in FIG. 35$a$, may be used with the heater module(s) 1402 turned on to implement a fast cook mode. Or push/pull fan 3504, in push mode but with heater module(s) 1402 turned off, may cool the rotor 3401. The fan 3504 in pull mode will pull air in through the top of the rotor in direction 3510 to suction up crumb debris, which are then caught in air filter 3503. Additionally with the fan 3504 in pull direction 3509, crumb debris may be suctioned from the mouth of rotor shroud 3501 and deposited in elastic mouth filter sock 3512 which may be conveniently removed to empty its contents. Alternatively, with an airflow cap 3901 (see FIG. 39), the fan 3504 in pull mode is used to cool the inside of a food cake. Shroud base flange 3508 snugly fits over shroud base mount 3604 (see FIG. 36) such that the shroud 3501 remains secured (e.g., in microgravity) but may be easily removed for cleaning or to facilitate food cake removal.

FIG. 35$b$ is a top perspective view showing the rotor shroud 3501 with the shell 3502, the radial containment lip 3507, the air filter 3503 and the push/pull fan 3504. An external polyester thermal insulation blanket 3511 additionally helps the shell minimize rotor heat loss and prevents the operator's hands from being burned.

FIG. 35$c$ is a bottom perspective view showing the rotor shroud 3501. FIG. 35$c$ provides another view of the thermal insulation 3505, insulation cover 3506, and the base flange 3508.

FIG. 35$d$ is a side view of shroud 3501 in which an elastic mouth filter sock 3512 is seen slipped over the air exit of push/pull fan 3504. When fan 3504 is in pull mode pulling air from inside of shroud 3501 as shown in FIG. 29, filter sock 3512 traps particulates 2907 that may be generated in the vicinity of the mouth of shroud 3501 during food ingredient introduction as shown in FIG. 47$d$ or in cake removal as shown in FIG. 48$a$.

Figure 36:
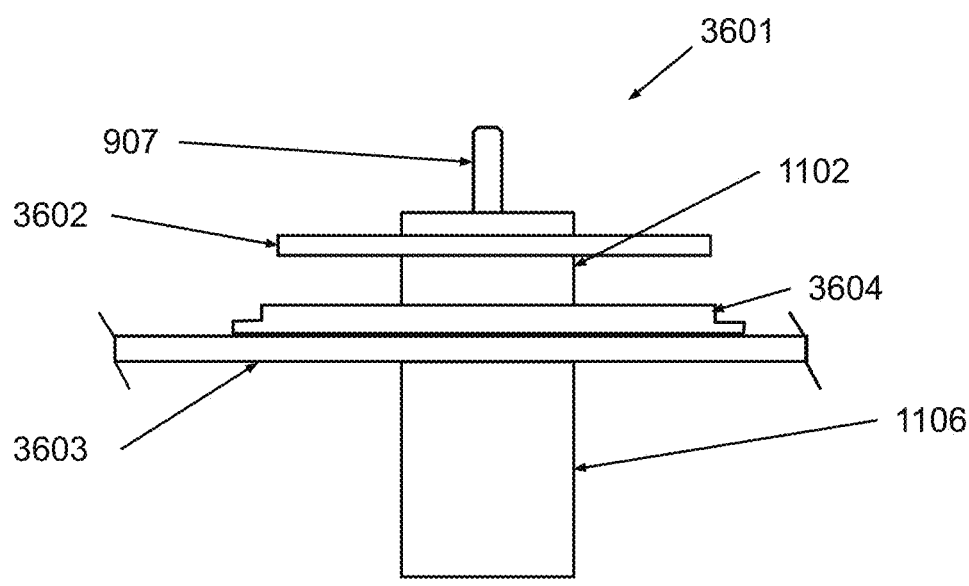
FIG. 36 is a cross-sectional side view of a motor drive assembly, in an embodiment.

FIG. 36 is a cross-sectional side view of an exemplary motor drive assembly 3601. Motor drive assembly 3601 includes thermal insulation disk 3602 positioned on the slip ring assembly 1102 to prevent excess heat loss from the rotor and overheating of the slip ring assembly 1102. Motor shaft 907 passes through slip ring assembly 1102 and supports the heating rotor 3401 such that the rotor may freely spin as the motor is operated. Motor stator 1106 supports the bearing set that motor shaft 907 turns on. Motor stator 1106 is attached to the artificial gravity heating device 2508 through mounting plate section 3603. Shroud base mount 3604 holds the shroud 2507 in alignment around the rotor 3401 such that a uniform thin radial air gap exists between its insulation cover 3506 and the spinning rotor 3401.

Figures 37, 38, 39, 40A:
FIG. 37 is a cross-sectional side view of the heating rotor in a cool-down mode, in an embodiment.
FIG. 38 is a cross-sectional side view showing a cooking cap for use with the heating rotor, in an embodiment.
FIG. 39 is a cross-sectional side view showing an exemplary airflow cap having an airflow port, in an embodiment.
FIG. 40a is a cross-sectional side view showing a hot air cap, in an embodiment.

FIG. 37 is a cross-sectional side view of heating rotor 3401 in a cool-down mode 3701. FIG. 37 shows how with the push/pull fan in push mode, cool air 3702 is blown up between the rotor shroud 3501 and the heating rotor 3401 carrying away the heat in exhaust air 3704. For example, the push mode is used to cool the rotor 3401 when the PTC heater modules 1402 are turned off and after the food cake 3705 has completed cooking. Cooling after cooking the food cake 3705 enables the food cake to be removed by hand without the operator burning their hands on the rotor components, and the food cake has more structural stability so it does not fall apart. Motor drive assembly 3601 is shown attached for reference.

FIG. 38 is a cross-sectional side view showing a cooking cap 3801, which is placed over the rotor shroud 3501. A seating lip 3802 provides a seal and helps to locate the lid during cooking. Cooking cap 3801 holds in heat around the heating rotor 3401 by limiting the flow of air in the gap between the rotor and cooking shroud, and by preventing cold air from circulating around the top area of the rotor. An insulated grip 3803 allows the operator to place and remove the lid without burning themselves.

FIG. 39 is a cross-sectional side view showing an exemplary airflow cap 3901 having an airflow port 3903. Airflow cap 3901 sits on top of the rotor shroud 3501 using seating lip 3902 to center it and using insulated grip 3803 to place and remove it by hand. When the cooking appliance 2508 is in cooking mode, and the push/pull fan 3504 is in push mode, air flows up around the temperature-controlled rotor wall 302 and down into the core of the food cake 3705, which provides additional heat for cooking the inside of food cake. Waste heated air exits upwards out the airflow port 3903. Similarly, when the push/pull fan is in pull mode, cool air is pulled in through the airflow port 3903 to cool the inside of the food cake 3705 after cooking has completed and cooling is desired. See also the description associated with FIGS. 43 and 44.

FIG. 40$a$ is a cross-sectional side view showing a hot air cap 4001, which may be used to toast the inside of the food cake 3705. A fan motor 4003, a fan blade 4004, a fan housing 4005, and a fan shroud 4006 are operatively coupled and mounted on the hot air cap 4001. The fan pulls heated air from inside the rotor shroud 3501 through airflow return holes 4008 and blows it through PTC heated air heating module 4007 through aluminum airflow tube 4011 and out through air-blade port 4009 where it impinges with the inner core of food cake 3705 toasting it and getting it hot enough to undergo Maillard browning.

High velocity heated air is provided through air-blade port 4009, which is used to cut through stagnant low temperature surface steam on the inside radius of the food cake. Experimentation has shown that this stagnant low temperature zone is constantly replenished by low temperature steam emanating from the interior of the food cake and must be forcibly blown away and replenished with hot air (e.g., about 190° C.) to raise the temperature of the inner radius of the food cake to the level needed for Maillard browning of the interior to take place.

Temperature sensor 1201, in conjunction with a control system similar to control system 1205 of FIG. 12 regulates the temperature of hot air flow through airflow tube 4011. Seating lip 4002 positions the hot air cap 4001 on top of the rotor shroud 3501 and prevents air from leaking out. Alignment hole 4010 helps center the hot air cap 4001 with the heating rotor 3401 by sliding over alignment pin 3404. A bearing plate made out of Teflon™ prevents any sticking or friction between the spinning food cake 3705 and the hot air cap 4001.

Figure 40B:
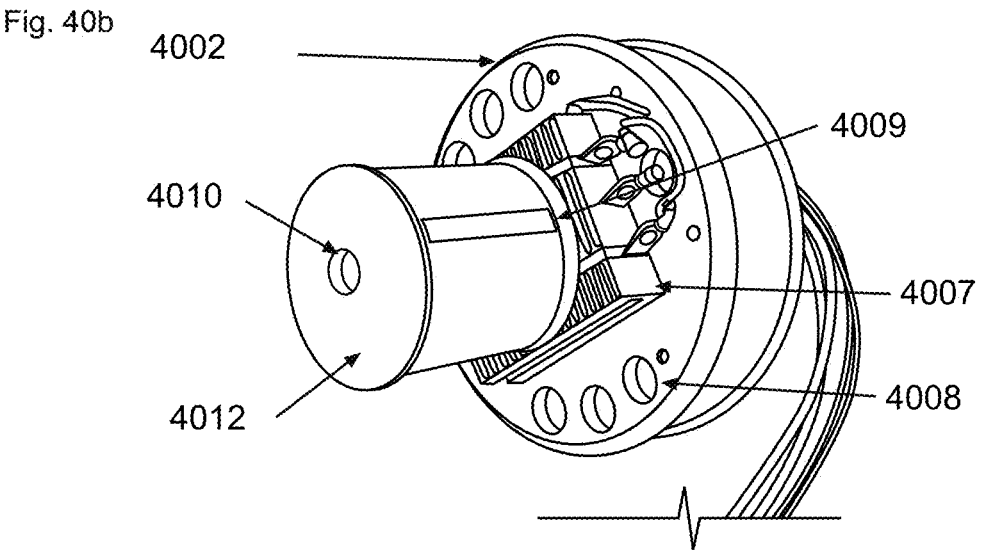

FIG. 40b is a bottom perspective view of hot air cap 4001, showing the seating lip 4002, the alignment hole 4010, the Teflon™ bearing plate 4012, the airflow return holes 4008, the air heating module 4007 and the air-blade port 4009.

Figure 40C:
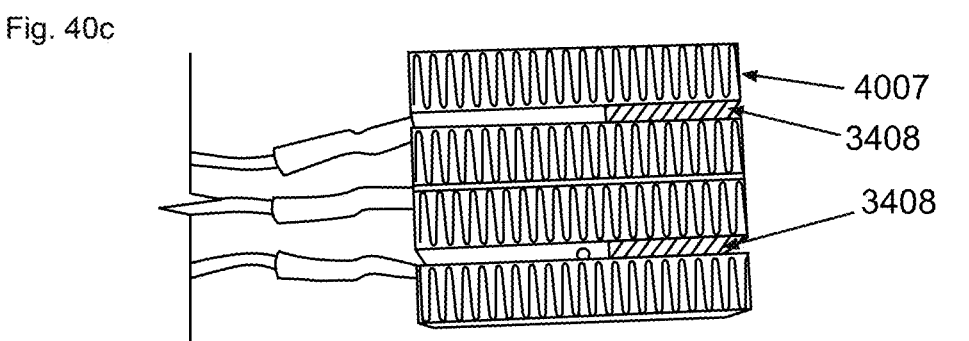
FIG. 40c is a cross-sectional side view of a heating module, in an embodiment.

FIG. 40c is a cross-sectional side view showing the heating module 4007 with PTC ceramic resistors 3408 incorporated. The PTC ceramic resistors 3408 are thermally bonded to a radiative fin structure such that air passing through the fin structure is heated by the PTC ceramic resistors 3408 to no higher than the Curie temperature of the PTC ceramic resistors 3408 (e.g., 220° C. in embodiments). Electrical power is provided to the air heating module 4007 by current input connections (e.g., electrical wires, as shown in FIG. 40c).

Figure 40D:
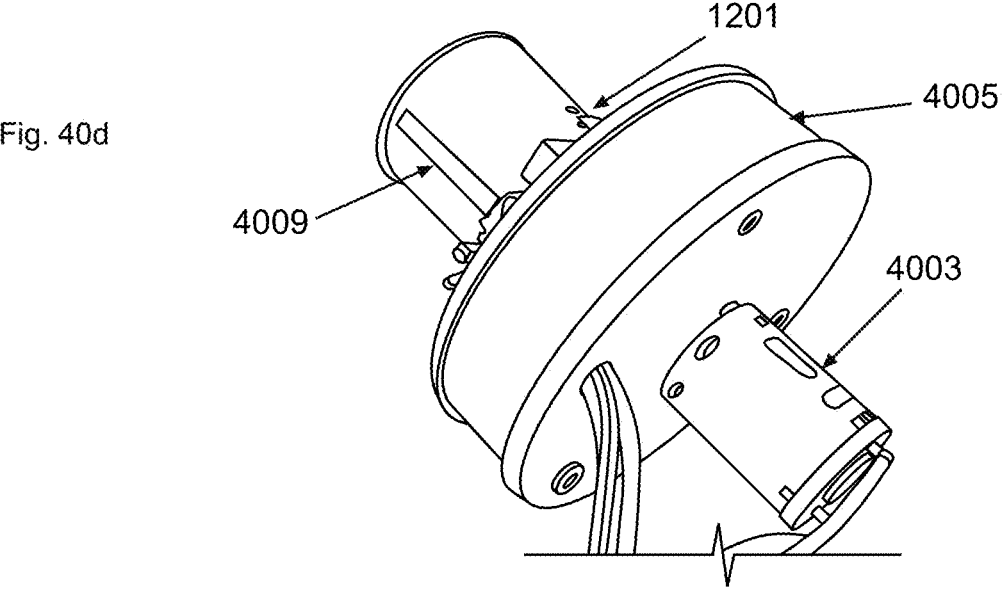

FIG. 40d is a side perspective view of hot air cap 4001, showing the fan motor 4003, fan housing 4005, temperature sensor 1201 where it enters the airflow tube 4011, and the air-blade port 4009.

Figure 41:
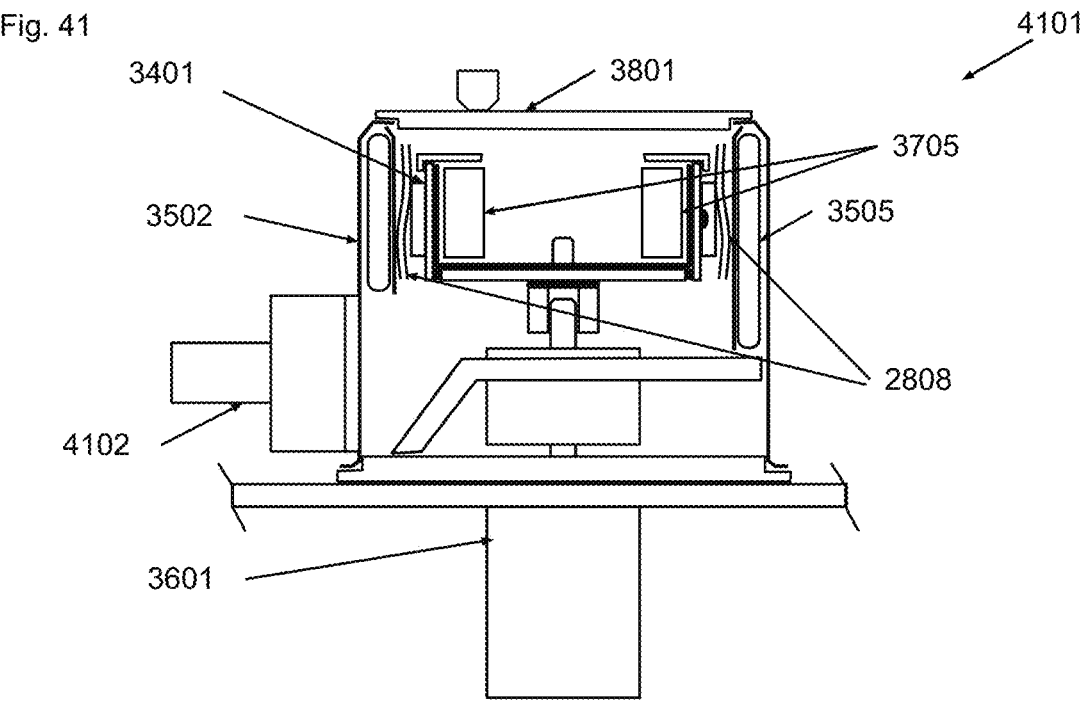
FIG. 41 is a cross-sectional side view of an assembly for basic cooking, in an embodiment.

FIG. 41 is a cross-sectional side view of an exemplary assembly for basic cooking 4101, which shows the relationship of cooking cap 3801 on top of rotor shroud 3501 surrounding heating rotor 3401 that contains a food cake 3705. Push/pull fan 3504 is shown in off mode 4102 during the basic cooking mode that helps create a stagnant radial air film 2808 that helps prevent excess heat from the heating rotor 3401 leaking through the rotor shroud thermal insulation 3505 and lost to the environment through the shroud shell 3502. In this assembly configuration, cooking of the food cake 3705 may proceed with maximum speed as heat from heating rotor 3401 is largely prevented from leaving the system.

Figure 42:
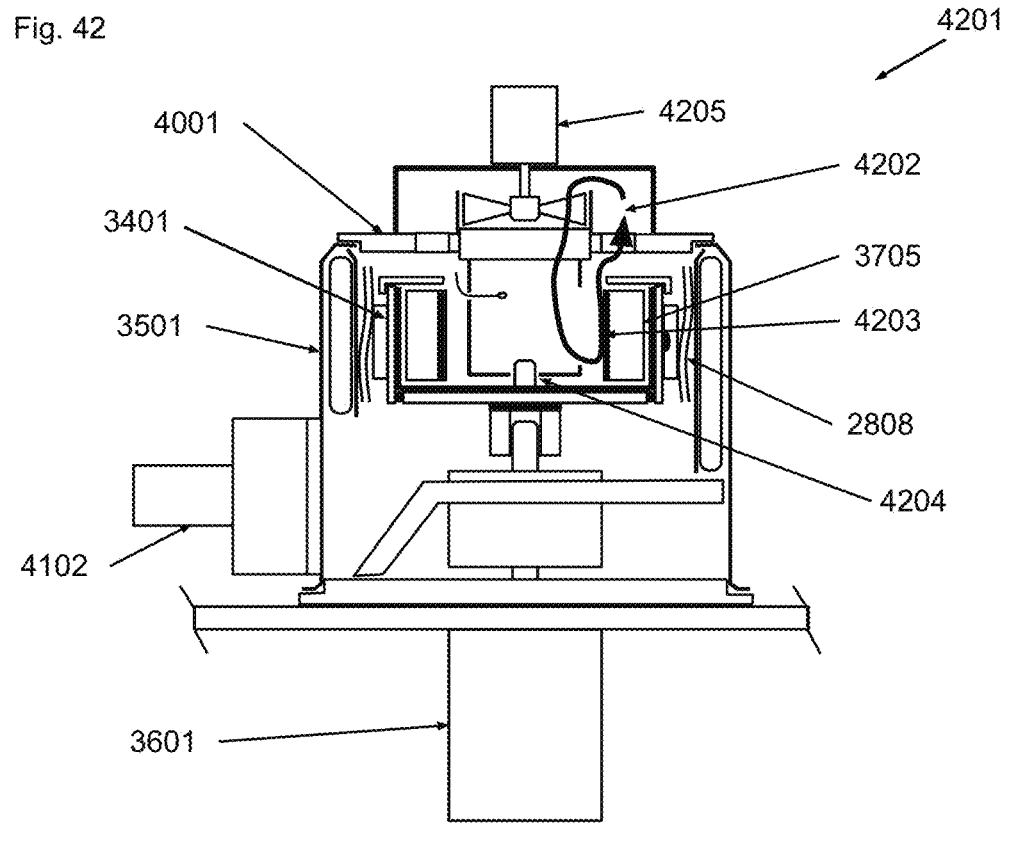
FIG. 42 is a cross-sectional side view of an assembly for hot air cooking, in an embodiment.

FIG. 42 is a cross-sectional side view of an exemplary assembly for hot air cooking 4201, the food cake inner layer 4203 of food cake 3705 is heated by the hot air flow 4202 caused by fan motor 4003 being set to high speed 4205. Stagnant air film 2808 is held in place by the auxiliary shroud cavity sealing function of hot air cap 4001, sealing air from travelling through the system, which additionally helps heating rotor 3401 from losing heat to rotor shroud 3501. The hot air flow 4202 is typically heated to approximately 195° C. to cause the food cake inner layer to cook and brown from engaging the Maillard browning reaction.

Figure 43:
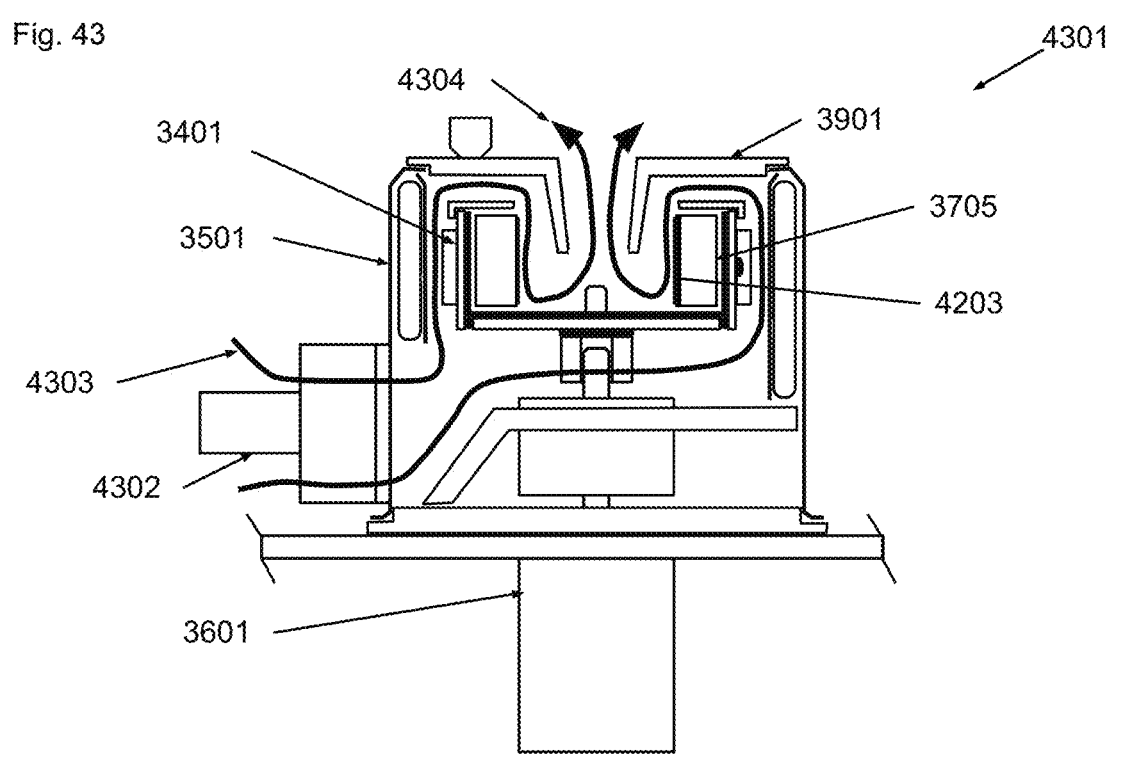
FIG. 43 is a cross-sectional side view of an assembly for a fast cook mode, in an embodiment.

FIG. 43 is a cross-sectional side view of an exemplary assembly for a fast cook mode 4301, which shows how airflow cap 3901 and fan in slow push mode 4302 is used to channel air through the annulus between cooking rotor 3401 and the inside of cooking shroud 3501. This heats the air and channels the air through the inside of food cake 3705, heating the cake from the food cake inner layer 4203. At the same time, the heating rotor 3501 is heating the food cake 3705 from its outside surface. After heating the inner layer of the food cake, the hot waste air 4304 is passed out of the assembly. This use of the airflow cap 3901 to additionally heat the food cake inner layer 4203 serves to speed up the cooking of the food cake while ventilating and drying the cake surface.

Figure 44:
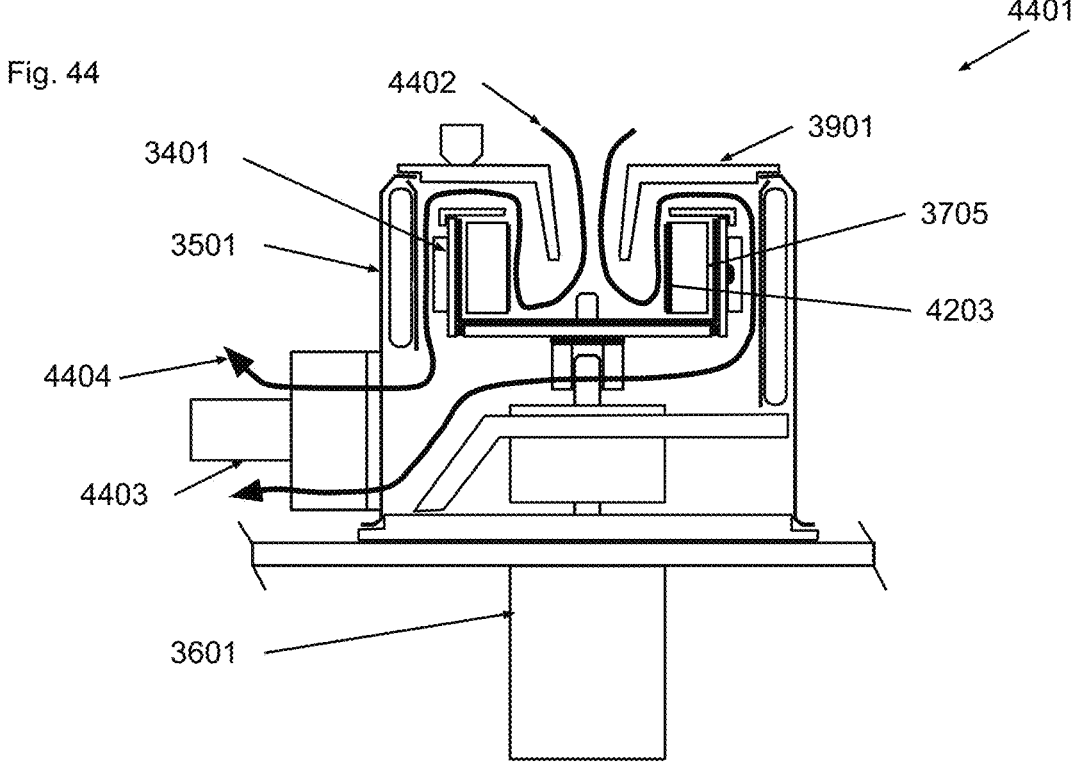
FIG. 44 is a cross-sectional side view of an assembly for an inside cool mode, in an embodiment.

FIG. 44 is a cross-sectional side view of an exemplary assembly for an inside cool mode 4401, which shows the airflow cap 3901 being used in conjunction with the fan in fast pull mode 4403 to direct a cool air path 4402 across the food cake inner layer 4203 in order to preferentially cool the food cake 3705 from the inside out. Secondarily, the cool air path passes between the rotor shroud 3501 and the heating rotor to cool the rotor after cooking is complete. This mode is used, for example, in doing the post cooking cool down of the pizza example shown in FIG. 47f to provide a topping priority cooldown that ensures that a molten topping will not slide off the cake during food cake removal from the rotor.

Figure 45:
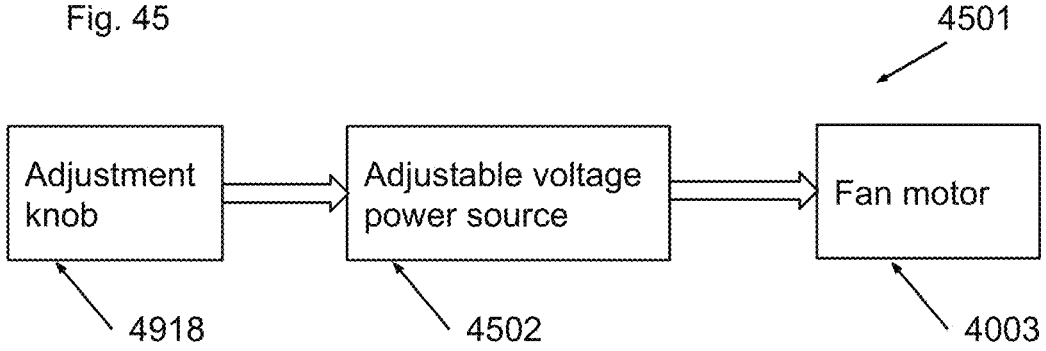
FIG. 45 is a block diagram showing hot air cap fan control, in an embodiment.

FIG. 45 is a block diagram showing hot air cap fan control 4501, which has an adjustment knob 4918 (see FIG. 49) for changing the voltage of power source 4502 that feeds hot air cap fan motor 4003. The purpose is to adjust the speed of hot air flow 4202 to maximum benefit in the cooking process.

Figure 46:
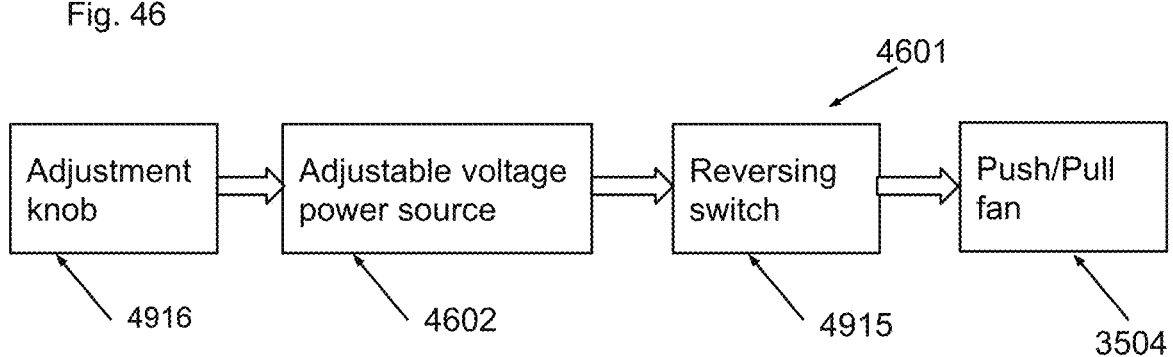
FIG. 46 is a block diagram showing shroud fan control, in an embodiment.

FIG. 46 is a block diagram showing shroud fan control 4601, which shows how adjustment knob 4916 (see FIG. 49) is used to adjust power source voltage 4602 feeding push/pull fan 3504 where reversing switch 4915 is used to switch from air push to pull modes. Being able to adjust the air flow rate to high maximizes the cooling rate when used to cool the food cake inner layer 4203. Being able to adjust the fan to low maximizes the temperature of the air flow during assembly fast cook mode 4301.

Figure 47A:
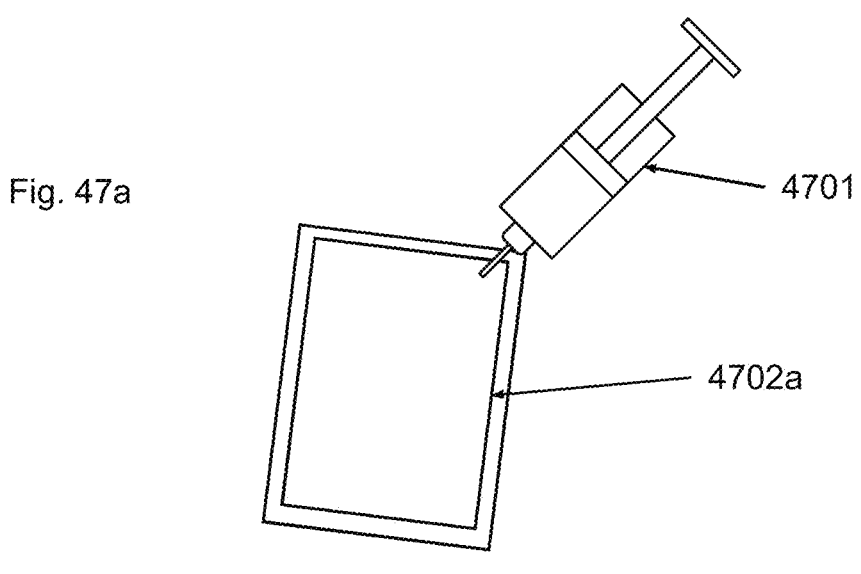
FIG. 47a shows a step for food preparation, in an embodiment.

FIG. 47a shows a step for food (e.g., pepperoni pizza dough) preparation using the artificial gravity heating appliance 2508 to prepare pepperoni pizza food cake in a weightless or normal gravity environment. Since mixing powders like flour in space would cause dust to enter the weightless atmosphere, pouch 4702a of dry pizza dough mix is used to contain the materials. In the preparation process, a measured quantity of water specified by a recipe is injected into the pouch by a water injection device 4701 which already exists in several forms of the current International Space Station. The pouch 4702a is then kneaded by hand to mix the dough inside and establish gluten strands.

Figure 47B:
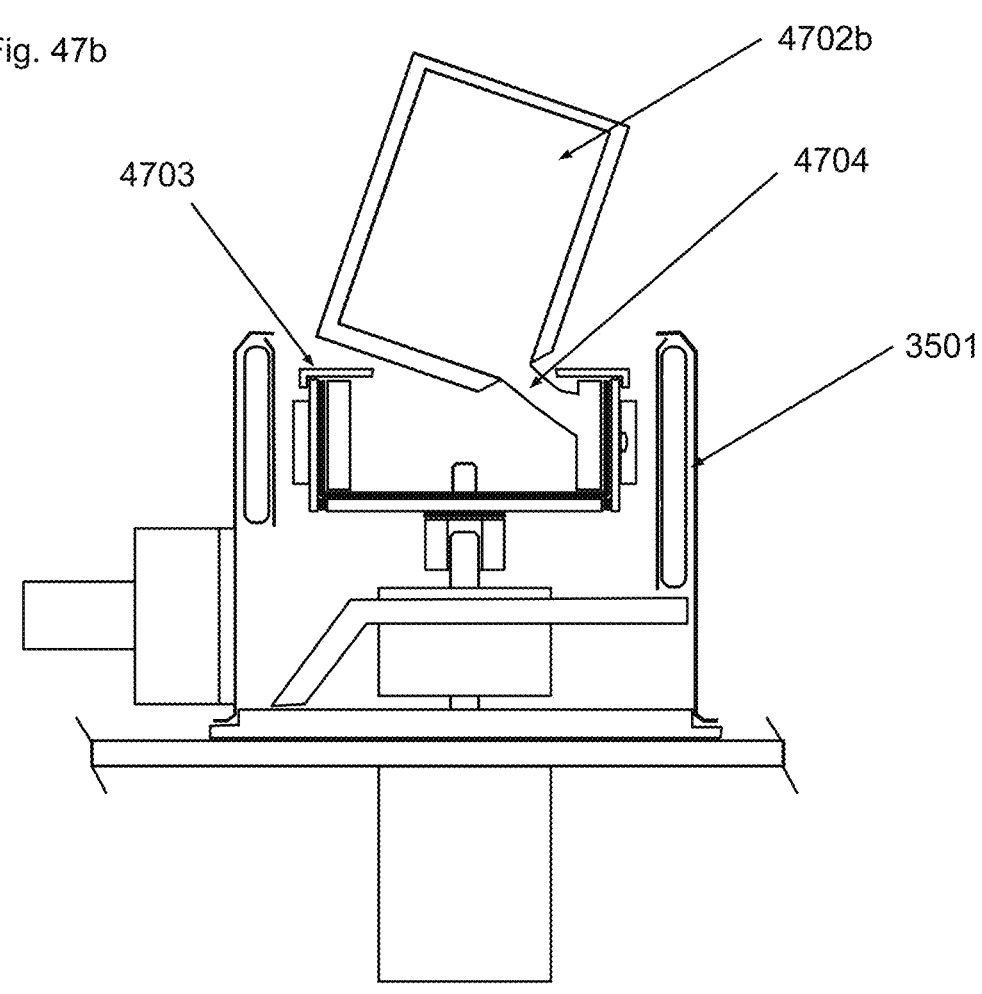
FIG. 47b is a cross-sectional side view showing a step for food injection, in an embodiment.

FIG. 47b shows a step for food (e.g., pepperoni pizza dough) injection. First, the heating rotor 3401 is adjusted by G-level adjust knob 4921 (see FIG. 49) to spin at a rate that generates about 10-G's as shown on G-level readout display 4919. Then the wall heat switch 4913 is switched on and the temperature set to 185° C. using program buttons 4905 with A/B temp control switch 4914 set to A.

As shown in 4702b, the corner of pouch 4702a is then snipped to allow the mixed dough to be manually squeezed out toward the spinning rotor wall 4704. Packets of food ingredients will be typically squeezed by the astronaut chef to propel the ingredients toward the inside spinning surface so that they touch the wall as directly and neatly as possible. When the dough touches the spinning rotor, with a rotor dam in place, the dough is accelerated up to the rotational velocity of the rotor and is immediately pressed against the inside of the heated rotor as shown via the principle disclosed in FIG. 2.

The annular confinement between the rotor wall 302, the rotor dam 304 and the rotor base 307 causes the radially compressed dough, if it is thin enough, to flow to radially fill the space and create the characteristic hollow cylinder food cake 501 shape. If the dough is too thick, a hand spatula 4709 (see FIG. 47d) may be inserted into the spinning rotor dam opening 305 to spread the dough as it spins past. Any dough that fails to enter the rotor dam opening and is spun away, or is somehow ejected by using the hand spatula, is captured by the rotor shroud's radial containment lip 3507.

Figures 47C, 47D:
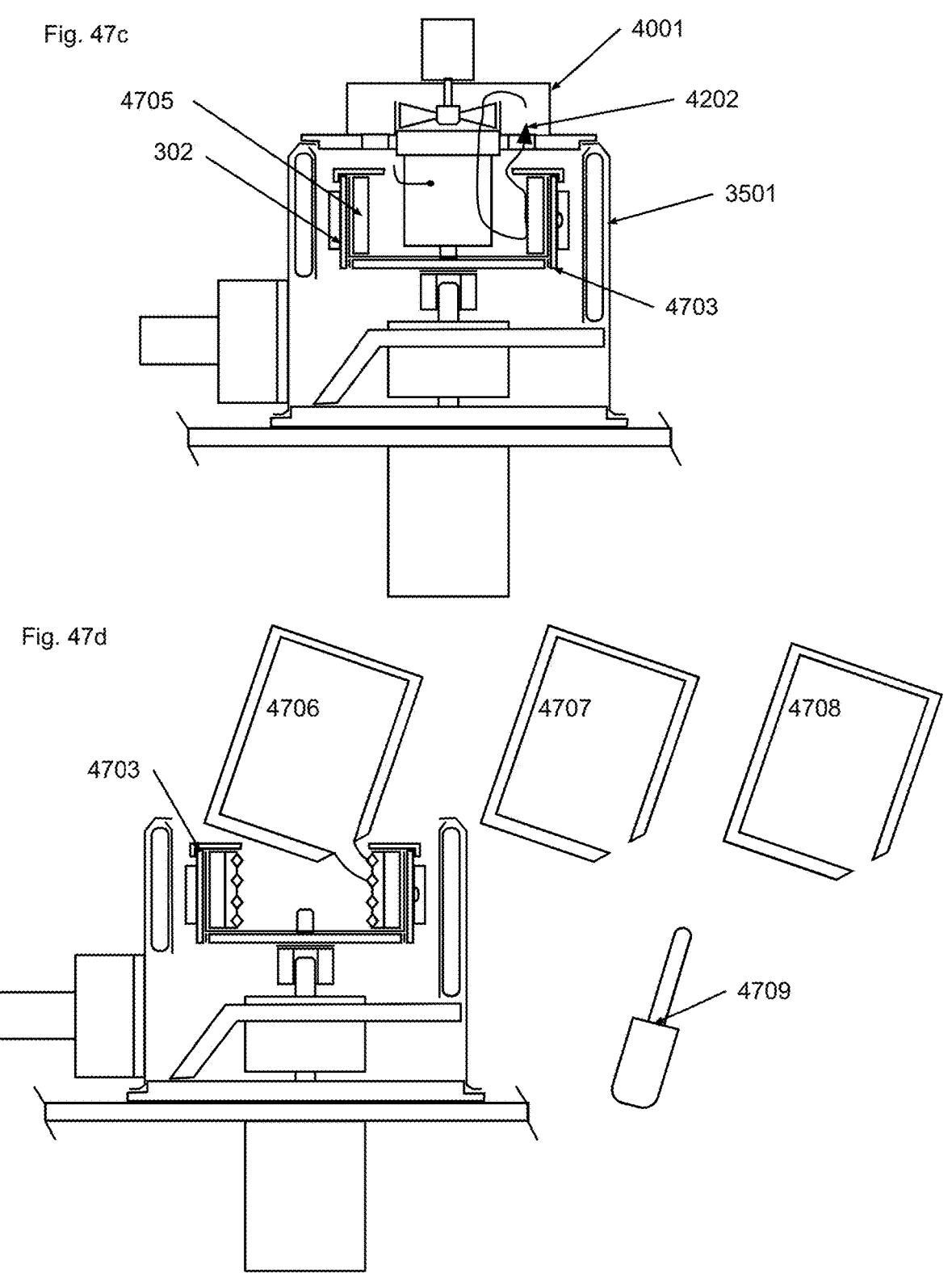
FIG. 47c is a cross-sectional side view showing exemplary cooking steps, in an embodiment.
FIG. 47d is a cross-sectional side view showing additional steps of food injection, in an embodiment.

FIG. 47*c* shows how the pizza crust is cooked both by the temperature-controlled rotor wall 302 from the outside of the food cake and at the same time being cooked from the inside by hot air flow 4202 created by the hot air cap 4001. By cooking from both the outside and inside at a temperature of 185° C. for about 5 minutes, a solid crisped crust is formed to structurally support adding toppings without them mixing into the unhardened dough.

The hot air cap 4001 is turned on with switch 4917 (see FIG. 49) and set to 185° C. using program buttons 4912 with hot air fan speed set to medium with knob 4918. Then after a predetermined time (e.g., 5 minutes) of cooking the hot air cap is temporarily removed and sat upon hot air cap storage pin 4902.

FIG. 47*d* is a cross-sectional side view showing pizza toppings injection, which illustrates how additional pizza ingredients are sequentially added to the spinning rotor with rotor dam in place 4705. Any ingredients that don't make it all the way into the rotor dam opening 305 and are accidentally spun away are captured by the rotor shroud's radial containment lip 3507. First, pizza sauce 4706 is injected onto the inside of the pizza crust food cake so that it touches the spinning surface. Once accelerated to the speed of the spinning rotor it immediately spreads out due to the centripetal acceleration inside the spinning rotor. Then a cheese spread 4707 or cheese chunks are injected so that they contact the spinning rotor and they too spread out, but perhaps less smoothly because of the clumping of cheese chunks. The packet of pepperoni chunks 4708 is then injected into the rotor so that they touch the inner surface now coated by pizza sauce and cheese and are also forced against the inner surface. Finally, a small hand spatula 4709 is stuck into the spinning opening of the rotor dam and used to distribute and smooth the layers of sauce, cheese and pepperoni chunks.

Figure 47E:
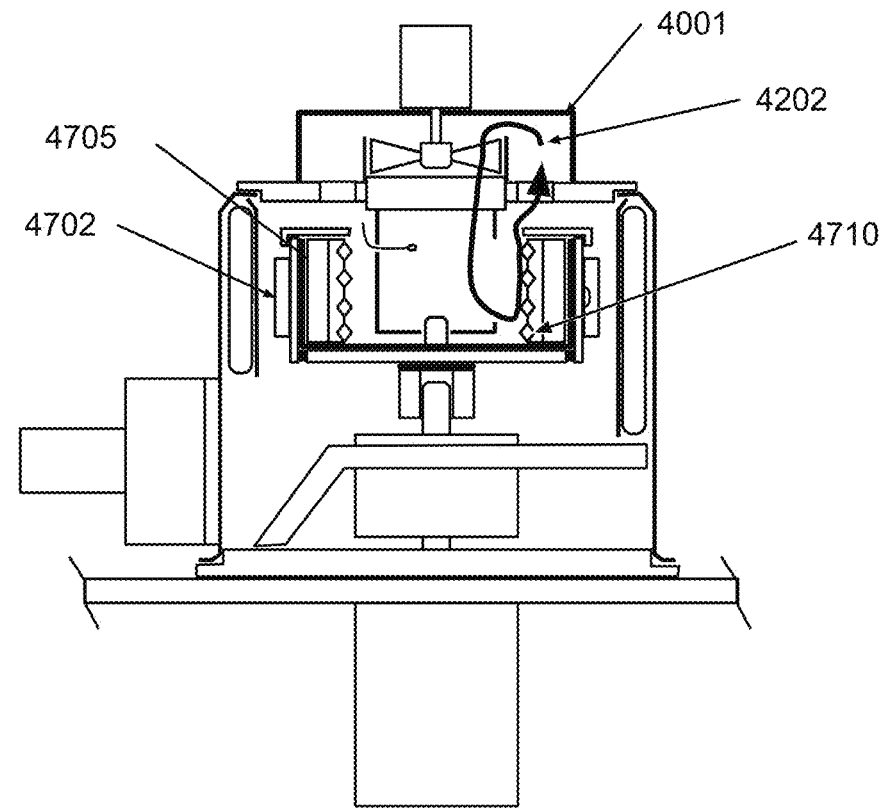
FIG. 47e is a cross-sectional side view showing browning of food, in an embodiment.

FIG. 47*e* is a cross-sectional side view showing browning of pizza toppings, which illustrates the hot air cap 4001 again placed on the rotor shroud and with hot air fan speed set to high via knob 4918 (see FIG. 49) and program buttons 4912 set to a temperature of 197° C. such that hot air flow 4202 fully melts and browns the combination of pizza toppings 4710. The rotor 4702 spinning with rotor dam in place continues to run and the temperature of the heated rotor wall is set to 185° C. for another five minutes to finish cooking the toppings. Then the wall heat switch 4913 is set to off and then the hot air knob 4918 is set to off.

Figure 47F:
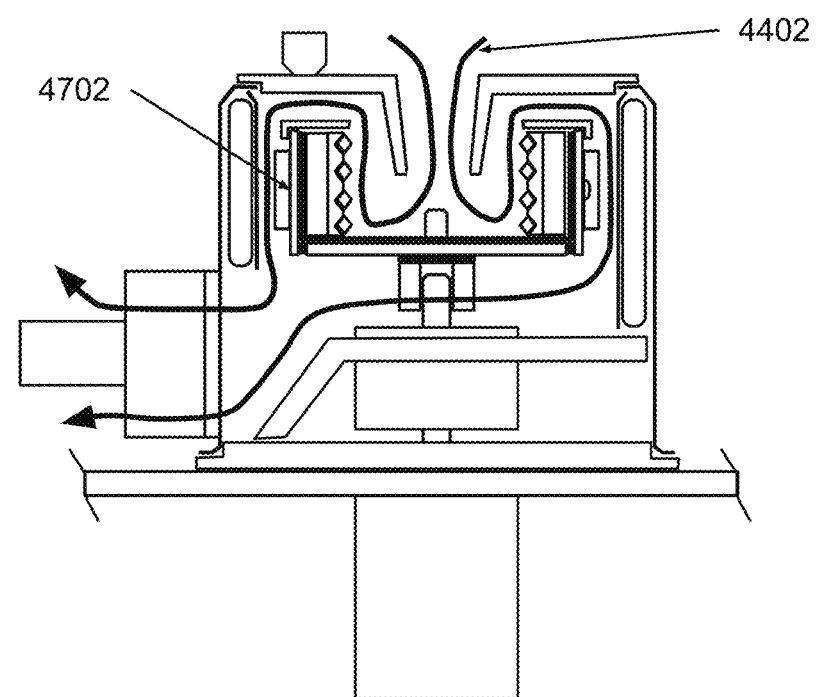
FIG. 47*f* is a cross-sectional side view showing a topping priority cooldown step, in an embodiment.

FIG. 47*f* is a cross-sectional side view showing a topping priority cooldown step. Cooling down the topping first begins with both the hot air cap and rotor heating circuits being turned off so that the assemblies and food cake begin to cool. The hot air cap 4001 is quickly removed and stored on the hot air storage pin 4902 to cool with its fan still running. Then the airflow cap 3901 is installed and the shroud fan 3504 is set to fast pull mode 4403 to quickly cool down the pizza toppings and crust while the rotor 4702 is still spinning. When rotor wall temp readout 4904 falls to 65° C. then turn off the shroud fan with switch 4915, turn off the hot air fan with switch 4719 and turn off the rotor rotation with switch 4920.

Figure 48A:
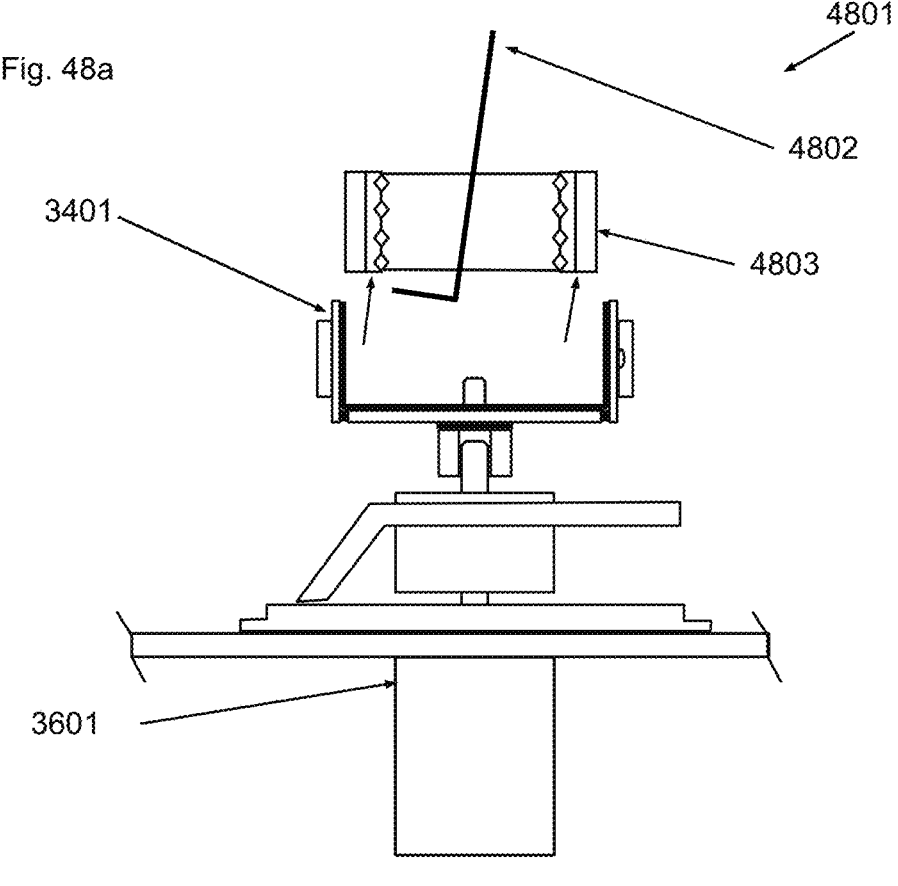
FIG. 48*a* is a cross-sectional side view showing food product (e.g., pepperoni pizza) removal, in an embodiment.
Figure 50:
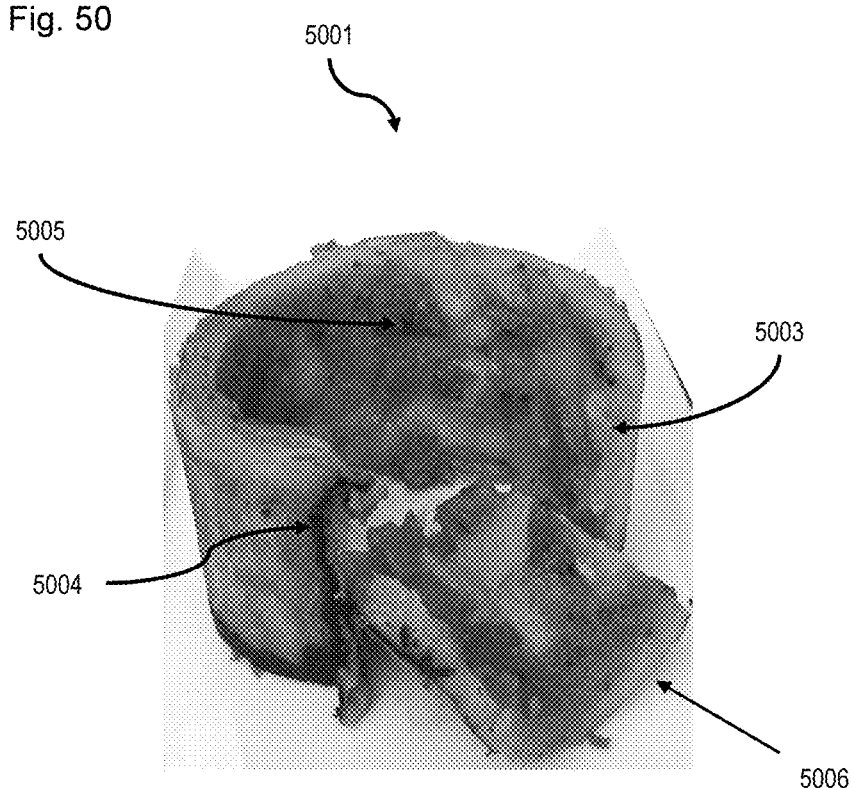
FIG. 50 shows an exemplary food cake cooked in the artificial gravity heating device of FIG. 49.

FIG. 48*a* is a cross-sectional side view showing food product (e.g., pepperoni pizza) removal 4801. Food product removal 4801 begins when it is safe to touch the rotor. After removing the rotor shroud 3501 and rotor dam 304, a hand spatula 4802 is used to loosen and slide out the removed pepperoni pizza food cake 4803. The completed pizza product as shown in FIG. 50 is then hot and ready to cut with kitchen scissors and eat in space.

Figure 48B:
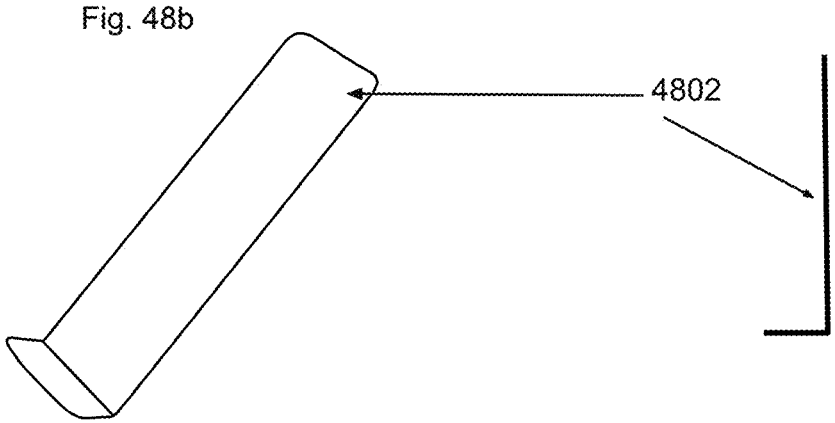
FIG. 48*b* shows a front perspective view and a side view of a hand spatula, in an embodiment.

FIG. 48*b* shows a front perspective view and a side view of an exemplary hand spatula 4802 configured for food product removal from heating rotor 3401.

Figure 49:
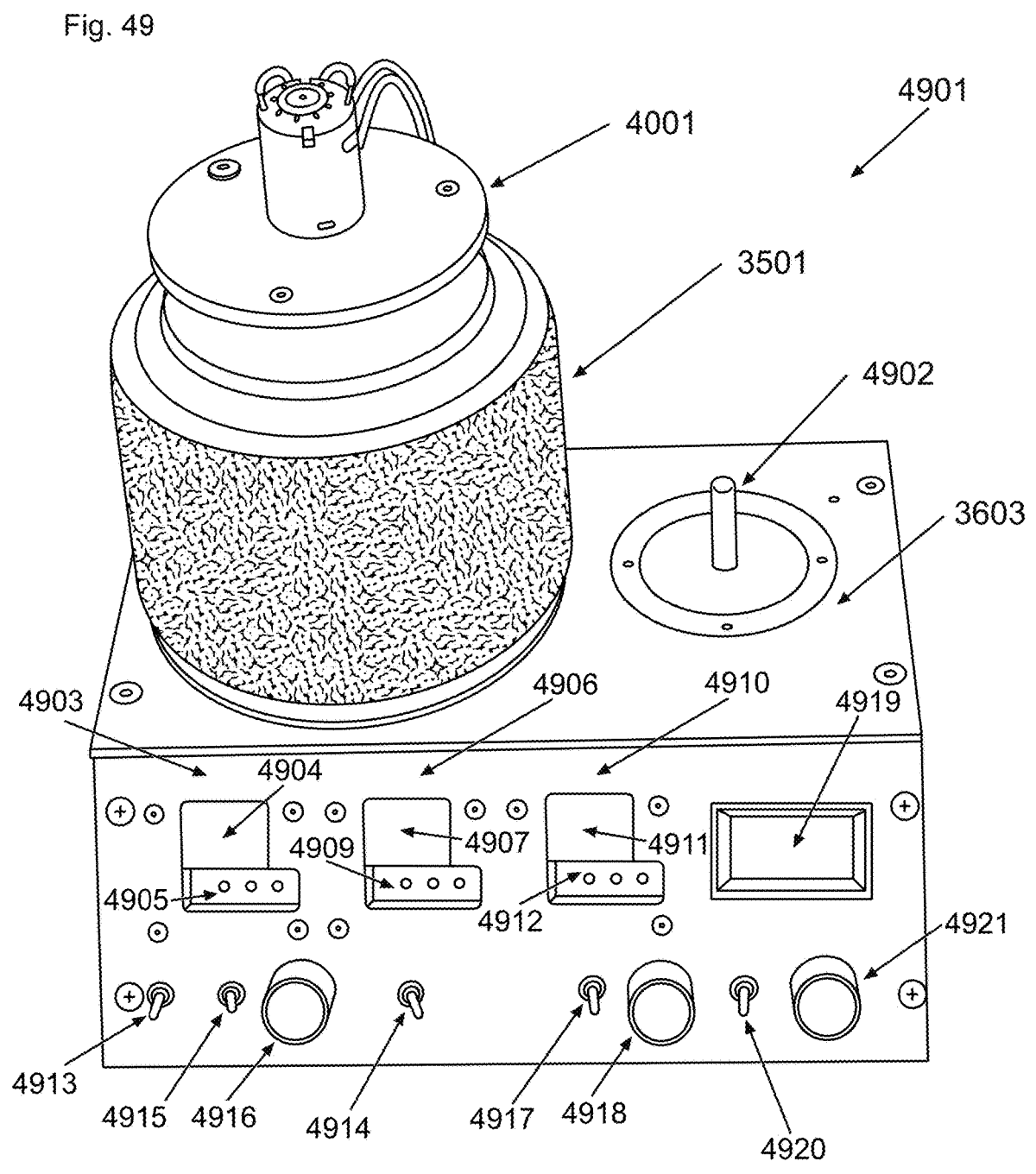

FIG. 49 is a perspective view of an exemplary artificial gravity heating device with user controls 4901, which shows the adjustments and main components of the artificial gravity heating device 2508 with improved hot air cap 4001 installed onto the rotor shroud 3501. Also shown are the hot air cap storage pin 4902 used during cap cooldown and the mounting plate section 3603 that connects all the cooking components to the housing. The controls and readouts are described below.

A rotor wall temperature controller 4903 comprises a rotor wall temperature readout 4904 and setpoint temperature buttons 4905. This control uses the principles described in FIG. 12 to control the temperature of the rotor wall by switching the PTC heaters 1402 on and off in response to input from the thermistor temperature sensor 1201 and the user set temperature programmed with program buttons 4905.

To allow a second rotor wall temperature to be quickly engaged without the need to reprogram the primary controller A's program buttons, a second controller B is able to be switched to using an A/B temp controller switch 4914. The second wall temp controller 4906 has the same components as controller A, namely temperature readout 4807 and temperature program buttons 4909.

A hot air temperature controller 4910 uses inputs from temperature sensor 1201 inserted into airflow tube 4011 to instruct air heating module 4007 on and off through a temperature control system modeled after that in FIG. 12 according to a set temperature, programmed by buttons 4912 and having a temperature readout 4911. The rotor wall heaters may be turned on to heat, or off to cool down, with switch 4913. The hot air insert heaters may be switched on to cook, or off to cool, with switch 4917. The shroud push/pull fan 3504 speed may be set with shroud fan speed knob 4916 and set for pushing air in or pulling air out of the shroud with switch 4915. The hot air cap fan is turned on or off with switch 4917 and its speed is set with hot air fan speed knob 4918.

Rotation on/off switch 4920 triggers the rotation of heating rotor 3401 and G-level adjust knob 4921 controls the rotor's rotational speed. G-level readout display 4919 shows the G-levels being experienced by the ingredients inside the rotor.

In embodiments, user controls 4901 are used to provide a cooking appliance; therefore, the use and operation of the many controls is generally left to the discretion of the chef, either according to a fixed recipe or what seems right for a certain food type and by making cooking decisions based on reading out the temperature of the rotor wall or hot air flow and the speed of the rotor and elapsed time.

FIG. 50 shows a pizza food cake 5001, which is an example of a product cooked in the artificial gravity heating device shown in FIG. 49. FIG. 50 illustrates important characteristics of a finished product that make pizza a desirable food to cook using the artificial gravity heating device while in space and low-gravity environments. For example, a bread crust layer 5003 is appropriately leavened and has a uniform thickness. Maillard browning and low temperature pyrolytic caramelization 5004 of the cake surface facing the rotor wall shows that a delicious taste spectrum and crisp texture of fresh browned pizza crust may be achieved. The cheese, sauce and pepperoni layers are uniformly melted and evenly distributed using the spatula smoothing and distribution method. Maillard browning and caramelization 5005 of the cake's inner surface is provided by the hot air blade from the hot air cap 4001. A pizza slice 5006 from the food cake 5001 may be cut using kitchen scissors, which shows that an individual food bite may be formed without creating excess food crumbs even though the final food retains a crisp base and soft toasted top as any great tasting pizza should.

Figure 51A:
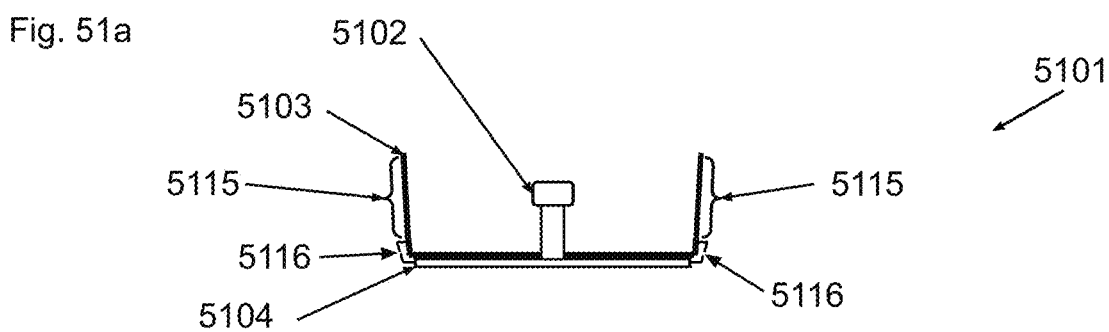
FIG. 51*a* is a cross-sectional side view of a food cake ejecting rotor, in an embodiment.

FIG. 51*a* is a cross-sectional side view of a food cake ejecting rotor, which shows an improved and alternative embodiment of ejecting the food cake from the rotor that may be better than the spatula method shown in FIG. 48*a* for certain types of food. The method uses an ejection disk and compressive silicon liner 5101. A pull release knob 5102 is attached to the ejection disk 5104 which is positioned under a silicone rotor liner 5103. In FIG. 51*a*, the silicone liner and ejection disk are shown nestled into the rotor with the silicon liner bonded to a bonded portion 5115 of the aluminum rotor. The bottom lip 5116 of the liner and under the ejection disk is not glued to the rotor.

Figure 51B:
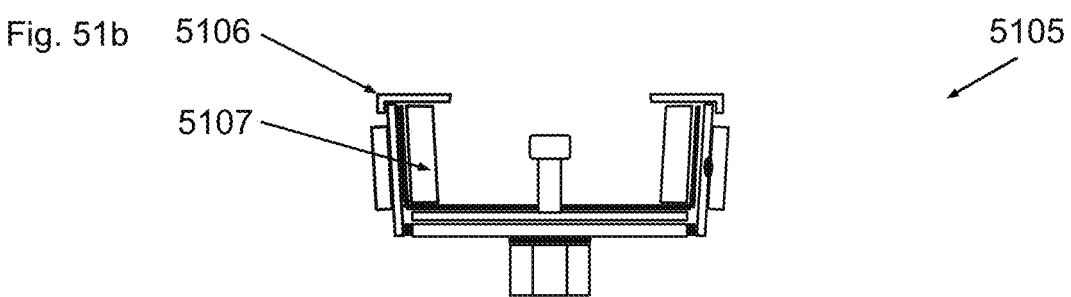
FIG. 51*b* is a cross-sectional side view of a rotor with a slight taper, in an embodiment.

FIG. 51*b* is a cross-sectional side view of a rotor with a slight taper 5105 for use in space or on Earth, showing the cake before ejection 5107. As shown in FIG. 51*b*, a silicone rotor dam 5106 is installed as usual during when the rotor is loaded, cooking and cooling down.

Figure 51C:
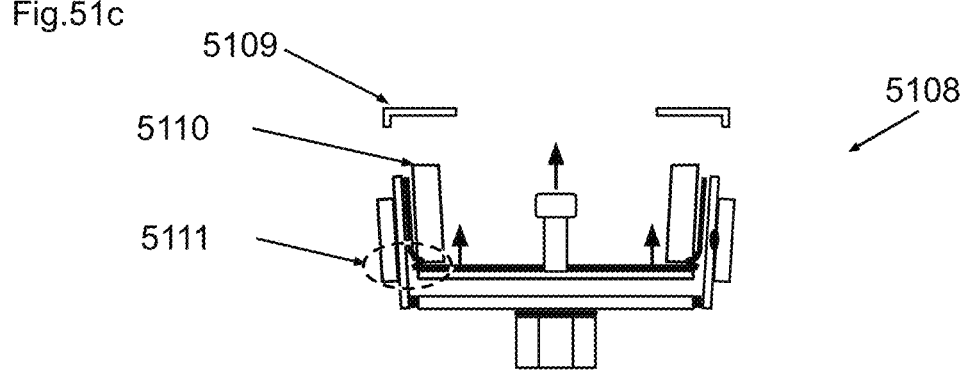
FIG. 51*c* is a cross-sectional side view with a rotor dam removed for food cake removal, in an embodiment.

FIG. 51*c* is a cross-sectional side view with rotor dam 5109 removed for food cake removal 5108. When cooking and cooldown is complete, the rotor is stopped, the rotor dam 5109 is removed and the pull knob 5102 is used to manually pull the ejection disk 5104 up resulting in the soft silicone liner compressing in the bottom area 5111, and the lift of the ejection disk as it is pulled up 5108 ejects a slightly tapered food cake 5110 up and out.

Figure 51D:
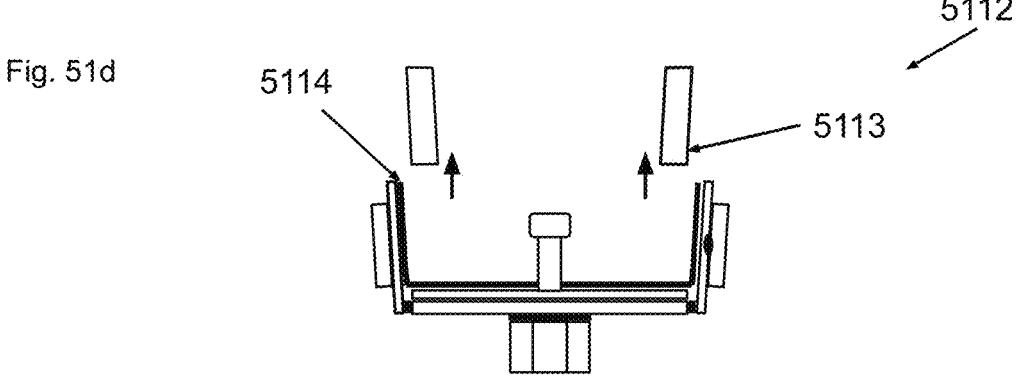
FIG. 51*d* is a cross-sectional side view with a food cake removed, in an embodiment.

FIG. 51*d* is a cross-sectional side view with food cake removed 5112. When the knob is released 5112, the ejected food cake 5113 slides out and the silicone liner and ejection disk 5114 relax back into the tapered rotor ready for the next cooking cycle once the rotor dam is reattached.

The advantage of this system shown in FIGS. 51*a*-51*d* is that food cakes may be cooked and quickly removed without cooling the cooking rotor. This results in faster sequential food cake production since heat up and cool down times do not need to be integrated into the process. Use of the food cake ejecting rotor means that the rotor shroud assembly does not have to be removed to make access to the cooking rotor so it may be stabilized for the spatula removal method. A further advantage is that the food cake will not suffer any crushing by the spatula during removal. For example, better shaped and crumb-free food cakes may be made faster.

FIG. 52*a* shows a top-down view an improved rotor dam 5201 with improved sealing capabilities and ability to be removed by pulling on a grasping tab 5403. Rotor dam 304 seals to rotor wall 302 with a rubber sealing method that slips over a lip on the edge of rotor wall 302. While suitable for cooking with most materials, rotor dam 304 may leak when cooking with large amounts of oil as when frying. In this case leaking oil may spray onto the inside of rotor shroud 2507 or shroud 3501. Improved rotor dam 5201 is similarly molded as one piece from food grade silicone rubber having a hardness durometer of approximately Shore 50 Type A.

FIG. 52*b* shows a side view of rotor dam 5201. A flexible pull tab 5202 enables a user to grasp rotor dam 5201 and pull straight up to remove the rotor dam 5201. A seating lip 5203 helps position the seal inside rotor 5205.

FIG. 52*c* is a close-up view of rotor dam 5201 at the end with flexible pull tab 5202. A sealing rib 5204 is shown on a side of the lower surface of seating lip 5203.

FIG. 52*d* is a cross sectional side view of rotor 5205 with a groove 5206, which is a semi-circular sealing groove around the rotor's inner perimeter.

In operation, rotor dam 5201 is pressed into the rotor 5205 having a semi-circular sealing groove 5206 (depicted in FIG. 52*d*). The rotor 5205 may still employ a non-stick release coating 3405 requiring that the groove profile depicted in FIG. 52*d* is also impressed in the release coating 3405.

FIG. 52*e* shows sealing rotor dam 5201 installed into rotor 5205. A close-up inset shows how the sealing rib 5204 fits into groove 5206 thereby sealing the passage of liquids with a pressure sealing principle similar to that employed by conventional O-ring seals.

A second advantage of improved rotor dam 5201 is that it may be removed from rotor 6205 by merely grasping flexible pull tab 5202 and pulling straight up. This important advantage allows rotor dam 5201 to be freely removed without removing cooling shroud 2507 or cooling shroud 3501. This in turn allows the removal of food cake 501 without removing either design of cooking shroud and thereby allowing the removal of cake 501 without first cooling the cooking rotor to manual handling temperature. Along with allowing the improved rotor dam to be replaced into the cooking rotor, also without removing the cooking shroud, allows the rapid cooking of successive cakes without going through an intermediate rotor cooling cycle. This allows one artificial gravity heating device to be able to cook successive cakes at a higher speed allowing for a crew of users to be served food at closer to the same time.

It is to be understood by one skilled in the art that the food cake ejection disk and compressive silicone liner 5101 may also be manufactured with sealing groove 5206 allowing this cake ejection system to also use the easily removed improved rotor dam 5201.

FIG. 53*a* shows a vacuum conformal cooking pouch 5301 in perspective. While rotor release coating 3405 performs well in enabling the easy removal of food cake 501 from the various cooking rotor designs, it is also desired to have a release lining that is itself removable to allow for its cleaning or replacement. Conformal cooking pouch 5301 provides an example. Conformal cooking pouch 5301 is molded from silicone rubber of approximate durometer Shore 40 type A having a thickness in the liner portion 5303 of approximately 0.6-mm.

FIG. 53*b* is a cross-sectional side view of the vacuum conformal cooking pouch 5301. A two-surface sealing ring 5302 is shown along the upper perimeter of pouch 5301. In embodiments, two-surface sealing ring 5302 is co-molded with the pouch 5301.

FIG. 53*c* is a close-up view of the two-surface sealing ring 5302 showing details of two-surface sealing 5302, notably its semicircular peripheral sealing groove 5304 which interfaces with sealing lids in the design of 5201. The vacuum rotor interface sealing lip 5305 seals under vacuum against the top edge of the cylinder wall of the vacuum rotor 5601 design.

FIG. 53*d* shows vacuum conformal pouch 5301 pulled down into a vacuum rotor 5601 when air is sucked out in direction 5605 from the space between the rotor and conformal pouch 5303. The conformal pouch 5301 is thus seen conforming to the inside profile 5606 of rotor 5601. To remove conformal pouch 5301, first the vacuum suction provided to the bottom of conformal pouch 5301 is turned off. Then, conformal pouch 5301 is removed (e.g., by hand).

Separate from the vacuum conformal aspect of 5301, FIG. 53*d* also shows improved rotor dam 5201 installed into the seating lip 5203 of conformal pouch 5301. The sealing lip 5305 is manufactured through die molding and the conformal pouch is formed via add through dip molding.

FIG. 54*a* shows a vacuum conformal pre-filled cooking pouch 5401 with peel-off vent seal 5404 and peel-off lid 5402 having grasping tab 5403. There is a need for pre-filled convenience cooking packaging that 5401 provides. Seals 5406 and lid 5402 keep the contents dry and bacteria-free during long storage in a larder. In operation, the pouch 5303 is prefilled with a food that needs rehydrating, and then cooking is performed, which may involve simmering, frying or baking. Example foods might be dry rice, beans or vegetables.

FIG. 54*b* shows a vacuum conformal pre-filled cooking pouch 5401 with peel-off vent seal 5404 removed. The peel-off vent seal 5404 is held on with tacky adhesive band 5406, making it easily removable. Once the peel-off vent seal 5404 is removed, as shown in FIG. 54*b*, a measured amount of a liquid such as water is introduced through fill and vent hole 5405. The packaging may be shaken by hand to mix the contents. Next the package is inserted into a vacuum rotor 5601 and the vacuum turned on to pull the pouch liner 5303 into place where one-surface sealing ring 5411 seals in the vacuum against the top edge of 5601. By pulling the pouch in with vacuum, the pouch walls 5303 are held in firm thermal contact with temperature-controlled rotor wall 302 allowing the cooking of the pouch's contents. After spinning up the rotor 5601 to the desired G-level, the heaters 1401 are energized and the temperature being sensed by temperature sensor 1201 and power controlled by control system 1205 are set such that the contents of 5401 may be simmered and cooked for a desired amount of time. After cooking the contents, the peel-off lid 5402 may be removed from tacky ring 5409 and additional sauces, oils, meats or cheese may be added through food access hole 5408 and perhaps mixed in with rotor 5601 while rotating at slow speed but fast enough to contain all food ingredients in a weightlessness environment. During this time the remaining portion of the base packaging 5407 has a rotor dam 5410 that keeps the contents in place during artificial gravity rotation. Finally, the heaters 1401 may be turned off, the contents cooled if desired by the cooking shroud 3501, the rotor 5601 rotation may be stopped, the vacuum 5605 released and the pouch 5401 removed from rotor 5601. The cooking pouch 5401 may then be held in hand and the food contents removed and eaten using a eating utensil through food access hole 5408.

FIG. 55*a* is a perspective view showing a conformal liquid cooking pouch 5501 that is useful for preparing, simmering and consuming food ingredients comprising liquid soups or stews. FIG. 55*b* a cross-sectional side view of conformal liquid cooking pouch 5501.

Conformal liquid cooking pouch 5501 comprises the conformal pouch 5303, the one-surface sealing ring 5411, an integral rotor dam 5502 that is necked down to a squeeze seal mouth ring 5503. In operation, liquid cooking pouch 5501 is inserted into vacuum rotor 5601, vacuum applied 5605 pulling the pouch 5303 into thermal contact with temperature-controlled rotor wall 302 and the rotor spun up to the desired artificial gravity speed.

FIG. 55*c* is a close-up view of one-surface sealing ring 5411, which shows how one surface sealing ring 5411 seals a vacuum in by sealing against the top of rotor wall 302. The use of the liquid cooking pouch is described in connection with FIG. 58.

FIG. 56*a* is a cross-sectional side view of a vacuum-seal rotor 5601 comprising a temperature-controlled rotor wall 302 heated by PTC heaters 1402, sensed by temperature sensor 1201, attached to a rotor base 5602 by silicone radial seal 3403 and able to be rotated by rotation coupling 901 bonded to rotor base 5602 with flexible insulating rotation coupling adhesive 3406. Rotor base 5602 is a version of rotor base 307 that features vacuum access port 5603 and radial vacuum channels 5604. Vacuum port 5603 and channels 5604 allow exhausted air creating a vacuum 5605 to pull also through the vacuum channels 5604 and pull the whole silicone pouch 5303 into place without sealing off the exhausted air movement 5605.

FIG. 56*b* is a top-down view of vacuum-seal rotor 5601 showing the placement of the vacuum channels 5604 and radial seal 3403 and heaters 1402 in the vacuum rotor 5601.

FIG. 56*c* is a cross-sectional side view of a vacuum-seal rotor 5601 in which the exhausted air 5605 creating a vacuum draws the normally flaccid conformal pouch 5303 being pulled against the inside profile 5606 of temperature-controlled rotor wall 302 and rotor base 5602.

FIG. 57 is a cross-sectional side view of a vacuum seal rotor system 5701 comprising vacuum rotor 5601 and the following support components. Temperature sensing of temperature-controlled rotor wall 302 on rotor 5601 may be accomplished using sensor 5714, which may be either wired or of a wireless design based on electromagnetic transmission of data or may be a standoff infrared temperature sensor 1703. Regardless, the temperature of thermally controlled wall 302 is controlled using one of these temperature signals to thermal control system 1205. Vacuum rotor 5601 is rotated by hollow motor shaft 5702 containing vacuum passage 5703 and supported by bearings 5704. Non-rotating connections 5705 connect to the non-rotating electrical transfer portion 5715 and may carry power for the heater elements 2410 and signals from temperature sensor 5714. A vacuum rotary joint housing 5708 includes electrical connections that supply power to heater elements 2410 and may return signals from the temperature sensor 5714. Non-rotating electrical transfer portion 5715 may be constructed as a slip ring non-rotating part 1003 or as a non-rotating rotary transformer core 1906. Rotating electrical transfer portion 5716 may be constructed as a slip ring rotating part 1002 or a rotating rotary transformer core 1907. Hollow shaft 5702 is rotated by motor rotor 1105 inside motor stator 1106 which together comprise a motor that may be of either brushed or brushless design. Vacuum manifold 5707 is connected to the vacuum rotary joint housing 5708 containing lubricated O-ring seal 5709, which are together able to pull a vacuum through vacuum passage 5703 when hollow shaft 5702 is turning due to the sealing provided by lubricated O-ring seal 5709, which may be a traditional lubricated rubber O-ring or lip seal, for example. Vacuum pump 5710 is able to pull a vacuum on the vacuum manifold 5707 by exhausting air through vacuum pump exhaust 5711. Vacuum bleed valve 5712 is able to break the vacuum by admitting air through the vacuum bleed port 5713.

FIGS. 58*a-d* are cross-sectional side views showing the vacuum seal rotor system 5701 during different stages of operation.

Figures 58A, 58B:
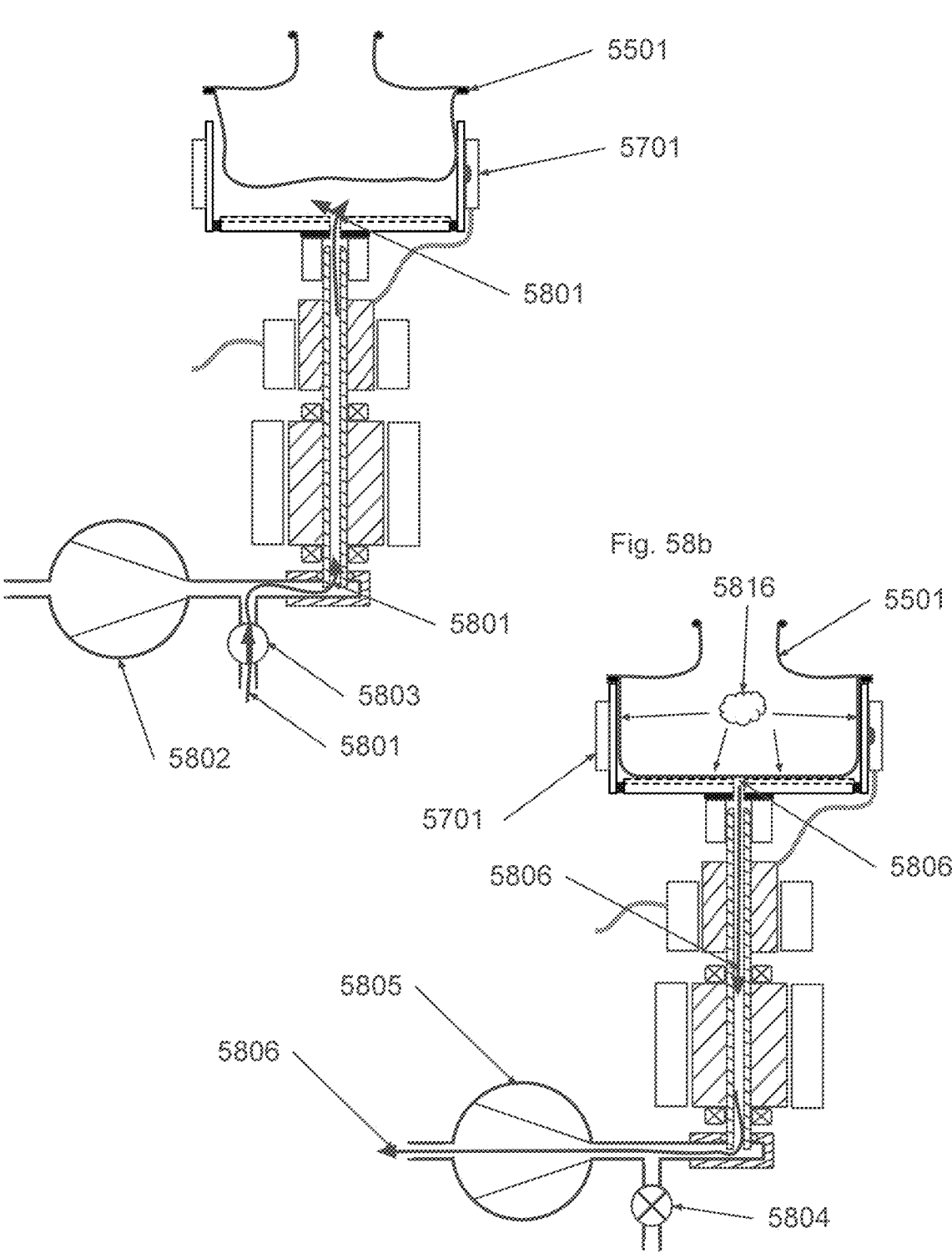
FIG. 58*a* shows a vacuum seal rotor system in operation, in an embodiment.
FIG. 58*b* shows a conformal liquid cooking pouch in operation, in an embodiment.

FIG. 58*a* shows the vacuum seal rotor system 5701 as the conformal liquid cooking pouch 5501 is inserted. Vacuum bleed valve is in the open state 5803 allowing ambient air 5801 to freely fill vacuum rotor 5601 such that no suction or blocking air force is possible. Vacuum pump 5802 is in the off state.

In FIG. 58b, conformal liquid cooking pouch 5501 is drawn down into vacuum rotor 5601 of system 5701 by the pressure difference between ambient air pressure 5816 and the vacuum caused by evacuated air 5806. Evacuated air 5806 is drawn out by vacuum pump in on state 5805 and bleed valve in off state 5804.

Figures 58C, 58D:
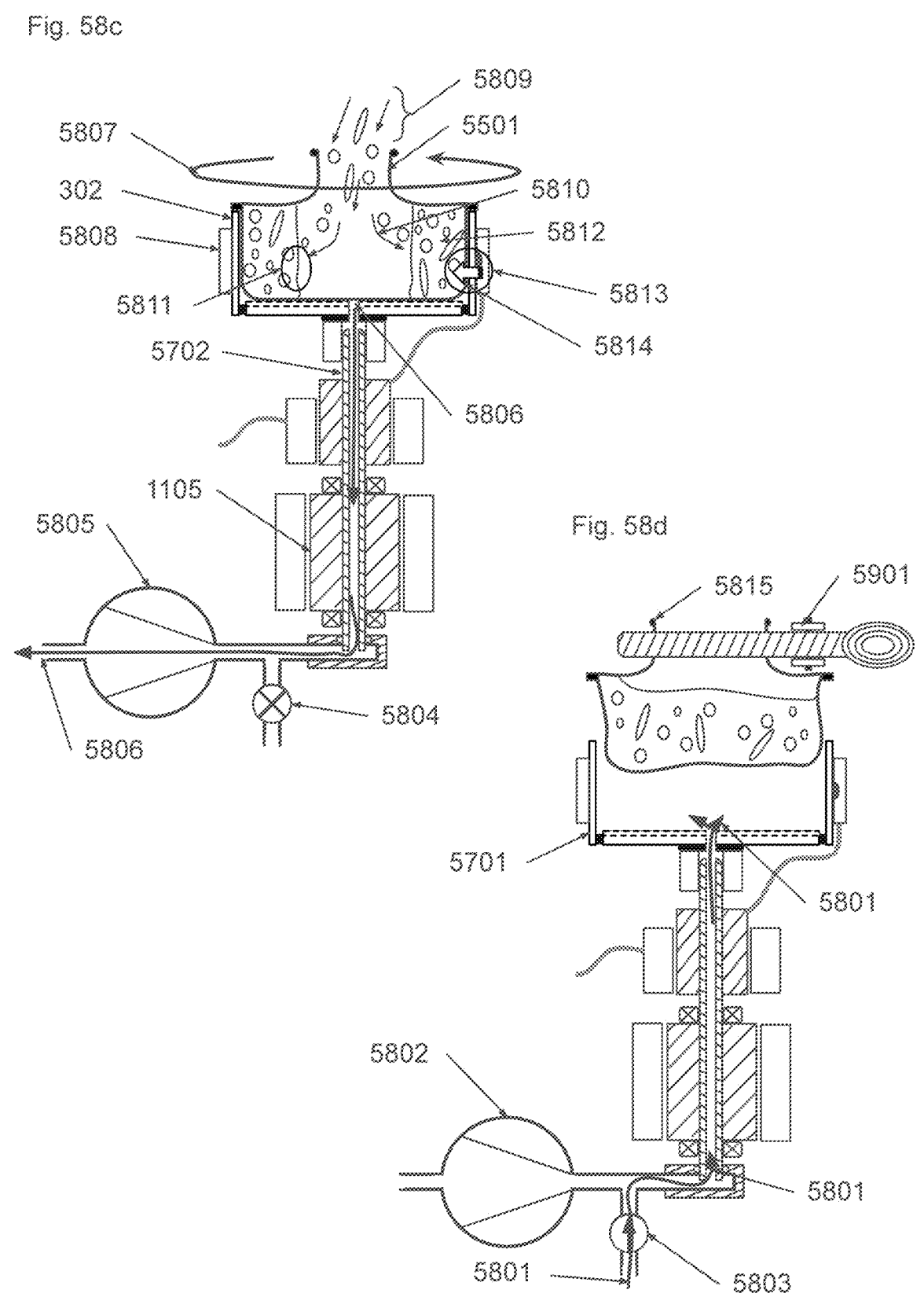

FIG. 58c shows ingredient loading of vacuum conformal liquid cooking pouch 5501. In FIG. 58c, motor rotor 1105 is spinning hollow shaft 5702 that is causing active rotation of vacuum rotor 5807. The vacuum rotor wall temperature control is energized at the proper simmering temperature 5808. The vacuum pump is in on state 5805 and with vacuum bleed valve closed 5804 has drawn evacuated air 5806 out of hollow shaft 5702 thereby sucking the conformal liquid cooking pouch 5501 into the vacuum rotor 5601. Solid and liquid food ingredients are injected 5809 into the conformal liquid cooking pouch 5501 where ingredients 5810, influenced by initial velocity and co-rotating internal air currents eventually contact the rotating food ingredient surface 5811 and are trapped into joining the mass of rotating food ingredients 5812. Heat energy flows 5814 from temperature-controlled rotor wall 302 across thermal interface 5813 through the conformal pouch material of 5501 to the mass of rotating food ingredients 5812 causing them to warm, simmer or boil depending on the temperature settings of thermally controlled wall 302.

FIG. 58d shows removal of the vacuum conformal liquid cooking pouch 5501. After the desired amount of cooking time has elapsed, rotor 5701 rotation may be stopped, vacuum pump 5802 may be turned off and vacuum bleed valve opened 5803 allowing ambient air pressure 5801 to release the filled pouch 5501 of cooked food ingredients so that it may be removed by hand. The neck of 5815 is pinched off with conformal liquid pouch closure clip 5901 to prevent spillage into the weightless environment.

Figure 59:
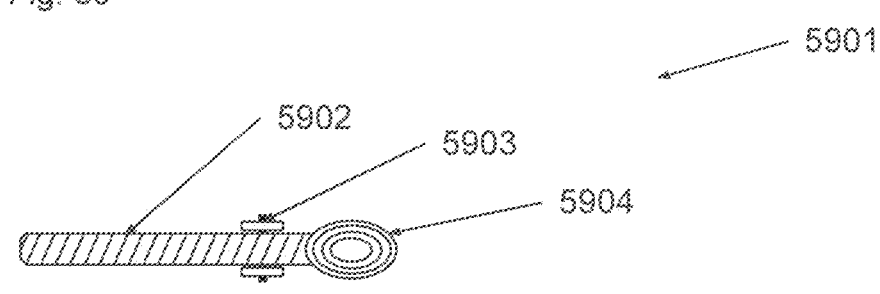
FIG. 59 shows a conformal liquid pouch closure clip, in an embodiment.

FIG. 59 shows the conformal liquid pouch closure clip 5901 consisting of finger squeeze pads 5904, jaw pivot 5903 and jaws 5902 for clamping the neck of the conformal liquid food pouch 5501 closed to prevent contents from escaping in the weightlessness of the space environment.

Figure 60:
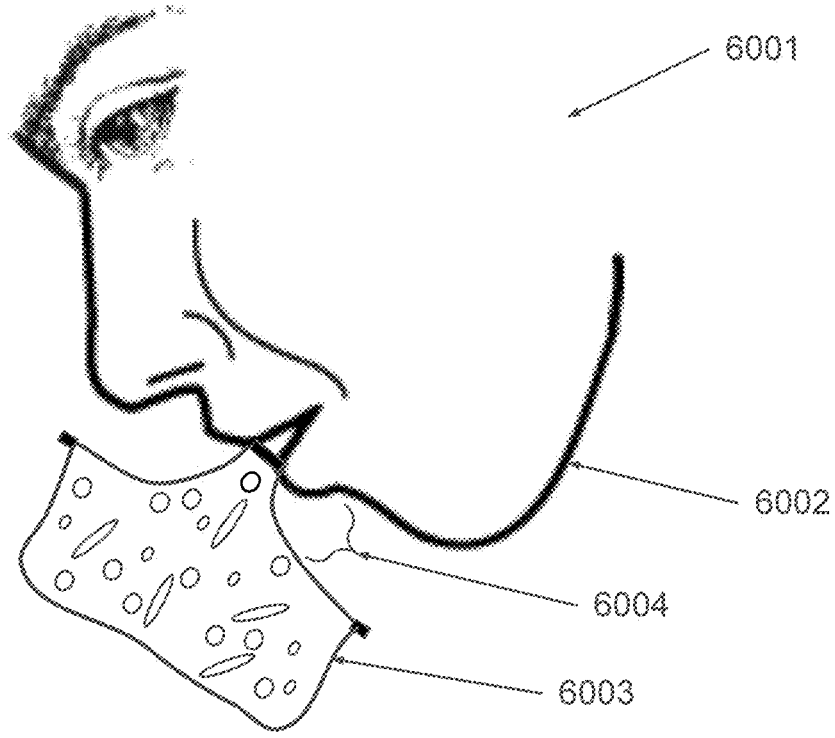
FIG. 60 shows exemplary consumption of a liquid food in weightlessness.

FIG. 60 shows the consumption of a liquid food in weightlessness 6001 by a user 6002 who has partially compressed the mouth ring of cooked conformal pouch 6003 with their lips 6004 and is sucking the contents. The pouch 6003 being consumed would normally be held in the astronaut's hand in order to control it better in weightlessness and to be able to conveniently pinch off the neck in between sips.

Figure 61A:
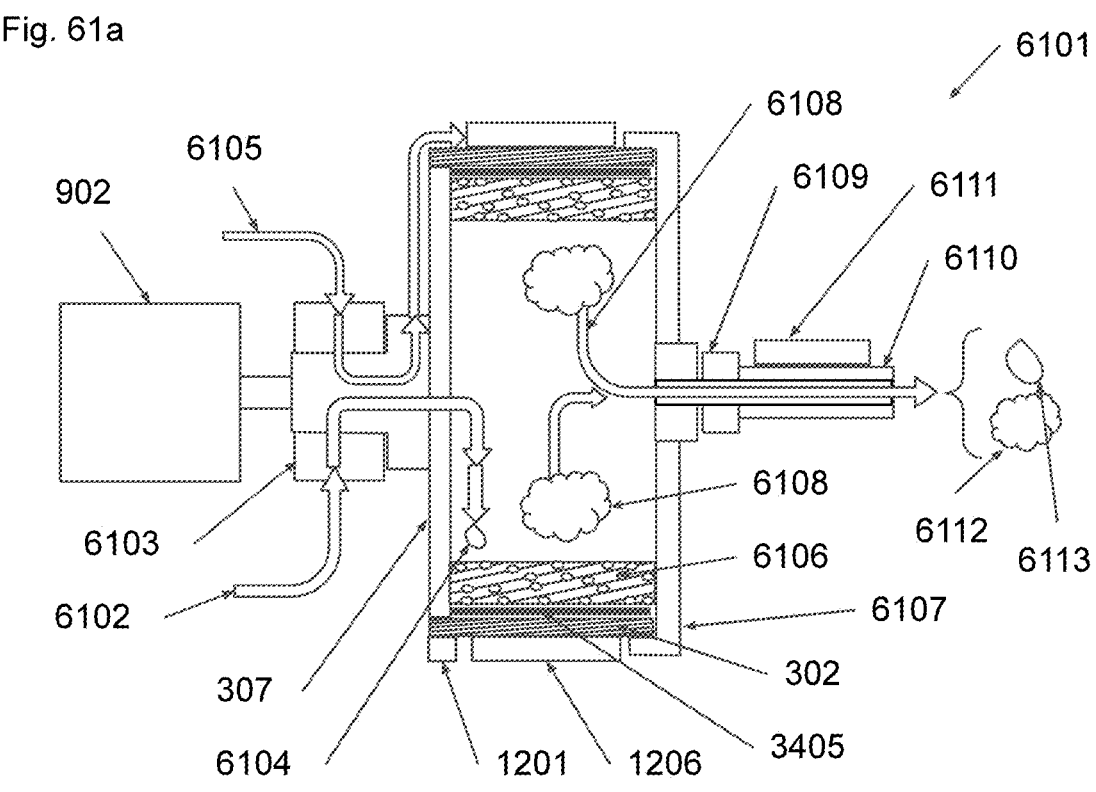
FIG. 61*a* shows a vapor generator dehydrator, in an embodiment.

FIG. 61a shows an exemplary vapor generator dehydrator 6101. There is a need in weightlessness to generate vapor such as steam and distillates from liquids and slurries. There further is a need to dehydrate slurries when the dried product is of value, such as in food slurry dehydration, or when the dehydrant is considered waste as when removing solids when purifying wastewater or urine aboard a spacecraft.

In one example, water heated to vapor or steam is routinely used for evenly heating materials by bathing the materials in the steam and letting the steam condense on the materials thereby giving up its latent heat of vaporization and causing the materials to rise towards the temperature of the vaporous phase of water or steam. Likewise, steam is used for heating living spaces such as when piping steam to heat emitting radiators where the steam condenses back into water giving up its latent heat of vaporization. However, the generation of steam by normal methods in weightlessness is complicated by the absence of gravity driven liquid-vapor state separation forces that typically causes steam bubbles to rise through the liquid from the heated to boiling surfaces found in conventional steam boilers. The artificial gravity heating device described herein replaces the forces of normal gravity with centrifugal force within a heated rotor when separating vapor bubbles from the boiling liquid and keeping the liquid firmly pressed against the heated surface. Further, the generation of "dry" steam containing no liquid water droplets is also problematic in low and zero gravity. An artificial gravity boiler employs the Coriolis effect to return water droplets that might emanate from a boiling surface back to the rotating liquid mass.

In another example, the apparatus of 6101 may be used for distillation wherein the liquid or slurry 6106 is heated to a precise temperature by the temperature-controlled rotor wall 302 using the heating source 1206 and temperature sensor 1201 using control system 1205. In distillation, the vapors produced 6108 and the vapor 6112 that are produced by the system may represent a lower boiling point fraction of the liquid or slurry 6106. In a common terrestrial example, the liquid or slurry 6106 might be a spirit manufacturer's fermenter's mash and the vapor 6108 might be vaporous alcohol.

Figure 61B:
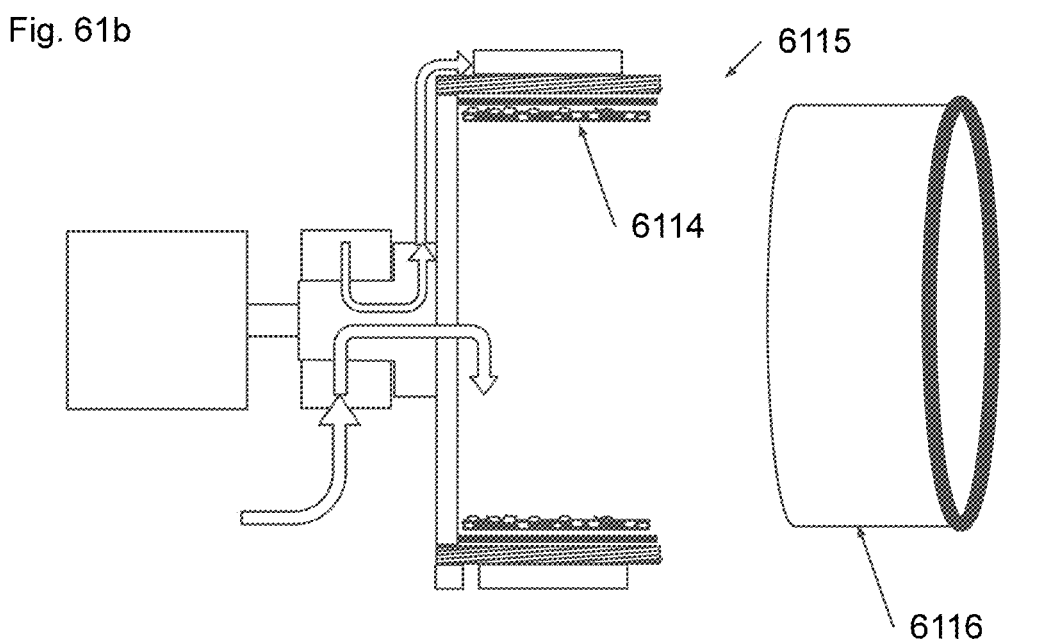
FIG. 61*b* shows dehydration of a slurry, in an embodiment.

FIG. 61b shows an example of the apparatus of 6101 being used for dehydration of a slurry 6106 by boiling off or evaporating the liquid content of 6106 as vapor 6108 leaving dried cake 6114. In state 6115 after rotor cover 6107 is removed, the dried cake 6114 may be removed 6116 for use or disposal. For example the dried cake 6114 could represent a dehydrated food product wherein the slurry 6106 was macerated vegetables. Or in another example the liquid or slurry 6106 could be a brine or concentrated urine mixture and the cake 6114 the concentrated solids for disposal or further gasification using the apparatus of FIG. 62.

In operation, returning to FIG. 61a, a temperature-controlled rotor wall 302 is heated by heating source 1206 under control of thermal control system 1205 informed by temperature sensor 1201. Thermally controlled wall 302 is rotated by rotor base 307 driven by motor 902. Liquids and slurries 6102 are delivered to the inside of the apparatus 6101 through tubing in rotary coupling 6103, and through centrifugal force, droplets 6104 are delivered to the rotating liquid or slurry mass 6106. Likewise electrical power 6105 is delivered to heating source 1206 through rotary coupling 6103. Thermally controlled rotor wall 302, which is covered with release coating 3405, boils the liquid or slurry 6106 producing vapors 6108 that escape the rotor through rotary coupling 6109 into thermal superheating or condensation tubing 6110. Heating or cooling source 6111 also controlled by a thermal control system 1205, heats or cools the tubing 6110 thereby heating or cooling the vapor 6108 passing through it. In the case of tubing 6110 heating vapor 6108, vapor 6108 emerges as superheated vapor 6112 which may be useful in preventing superheated vapor 6112 from prematurely condensing during its being piped to external applications of the vapor 6112. In the case that heating or cooling source 6111 is in cooling mode then the tubing 6110 is cooled, and cools the vapors 6108 passing through it potentially resulting in liquid condensate 6113, which for example could be pure water recovered from a waste stream.

In FIG. 61b the vapor generator dehydrator 6101 is shown with rotor cover 6107 removed for access to a dehydrated cake 6114. With the rotor cover 6107 removed the release coating 3405 may facilitate the removal of the cake mass 6116 for disposal or further gasification in an apparatus such as that shown in FIG. 62.

Figure 62A:
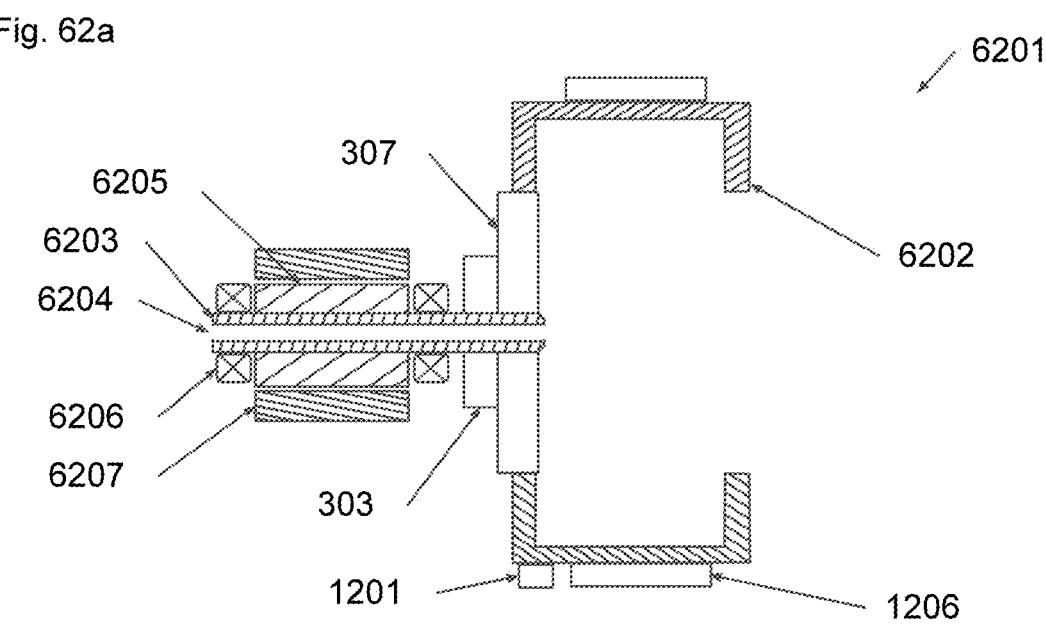
FIG. 62*a* shows an artificial gravity thermal gas generator rotor, in an embodiment.

FIG. 62a shows an artificial gravity thermal gas generator rotor 6201 consisting of temperature-controlled rotor wall 6202 heated by heating source 1206 under control of thermal control system 1205 with rotor wall 6262 temperature sensed by temperature sensor 1201. Temperature controlled rotor wall 6202 is spun by rotor base 307 connected to rotation coupling 303 to hollow shaft 6203 having port 6204. Hollow shaft 6203 is rotated by motor rotor 6205 supported by bearings 6206 and driven by motor stator 6207.

A need exists for a thermal gas generator 6201 that may operate in a weightless or low gravity environment to vaporize a large range of materials from trash to industrial materials to lunar or Mars mining ores to even vapors for spacecraft propulsion using ionized plasma thrusters. In the case of vaporizing trash, the resulting vapors 6239 could be used in a chemical reforming process to make industrial materials like plastics, methane, ammonia, carbon monoxide, hydrogen and other useful gasses and chemicals. In the case of vaporizing industrial materials, applications include vapor deposition of chemical coatings. In the case of propulsion, solid waste materials aboard a spacecraft could be gasified, ionized at high temperature and ejected at high speed from a thruster nozzle using strong electric fields. Thrusters like these are known to have a high specific impulse also known as rocket engine efficiency because of the ion thruster's efficient use of propellent mass, which in this case could be sourced from vaporizing anything unwanted aboard a spacecraft. The annular U-shape of rotor wall 6202 is configured to vaporize melt charge 6236 on both the cylinder sidewalls containing the melt charge 6236, as well as on the outer wall.

Figure 62B:
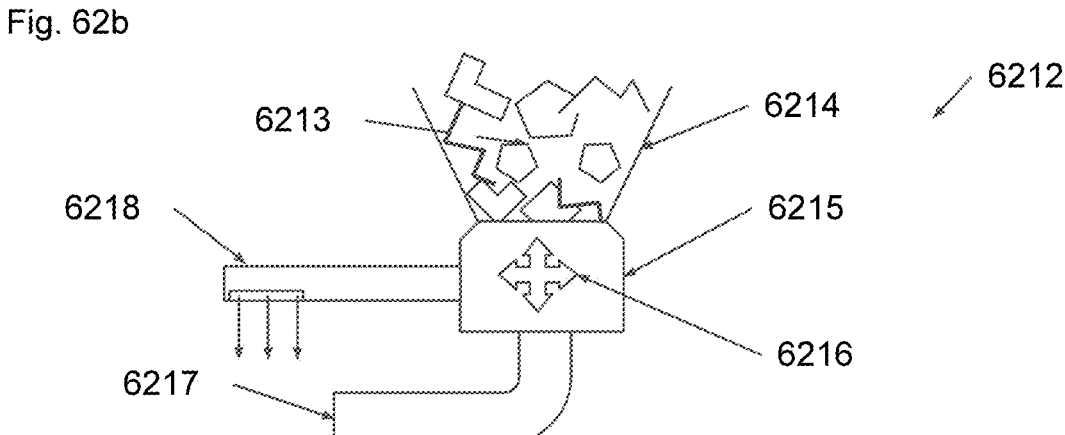
FIG. 62*b* shows an input material subdivider, in an embodiment.

FIG. 62b shows an input material 6213 subdivider 6215 which may eject subdivided material from its ejection spout 6217. In operation, the subdividing and injecting apparatus of 6212 takes input material 6213 which may be trash or industrial feedstock that is fed using feed hopper 6214, of a mechanical pressure based feed mechanism design, to add input material 6213 into subdivider 6215 which may comprise a shredder or grinder whose purpose is to make aggregate form of input material 6231 that flow and self-level inside gas generator rotor 6201. A machine controller for the vaporization components depicted in FIG. 62 is able to position components using a motor driven translation stage 6216 of standard design for one skilled in the art. An injection air blade mechanism 6218 based on the principles and methods outlined in FIG. 4a is used to direct subdivided materials 6321 into spinning gasification rotor 6201.

Figure 62C:
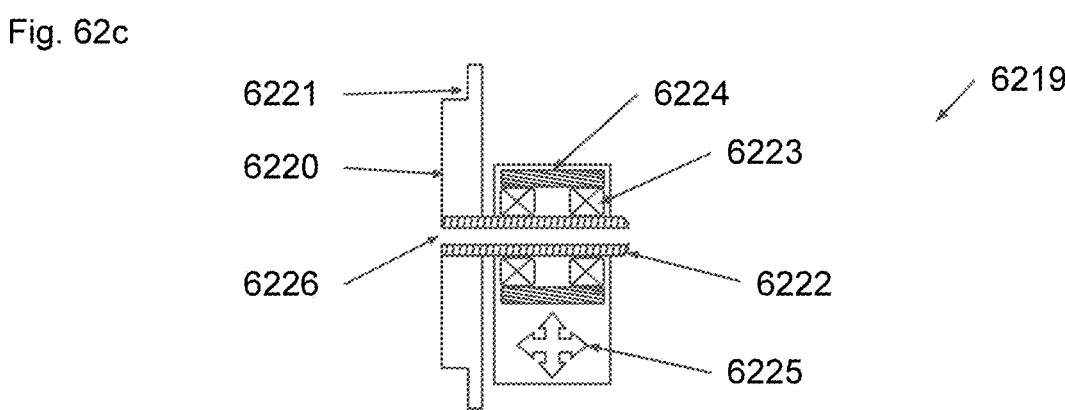
FIG. 62*c* shows rotor spinning collection cap, in an embodiment.

FIG. 62c shows rotor spinning collection cap 6219 comprising cap 6220 made of heat resistant material with sealing lip 6221, configured to lock into the opening of temperature-controlled rotor wall 6202 such that no vaporization gasses 6237 escape during the gasification process phase employing the gasification rotor 6201, materials in the process of being vaporized 6236 and the spinning collection cap 6219. Cap 6220 is spun on hollow shaft 6222 supported by bearings 6223 by its connection when engaged with spinning gas generator rotor 6201. The cap is positioned on, and removed from, gas generator rotor 6201 by a machine-controller controlled translation stage 6225. Gasification product port 6226 provides the path for gasification vapors 6237 to move through 6238 such that the resulting vapors 6239 may be transported to an application area.

Figure 62D:
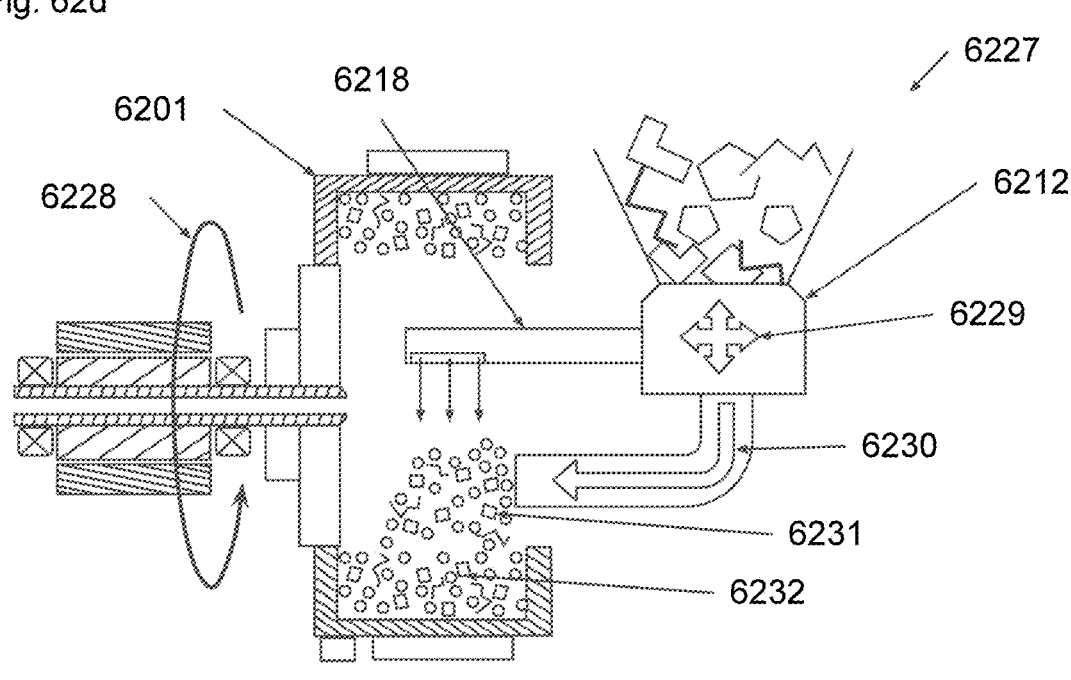
FIG. 62*d* shows loading of a gasification rotor, in an embodiment.

FIG. 62d shows the loading 6227 of gasification rotor 6201 with subdivided material 6231 passed from the subdividing and injecting apparatus of 6212 through its spout 6230 into the area where injection air blade 6218 may deposit the subdivided material on the inside of spinning 6228 gasification rotor 6201 even when operating in a weightless environment. Translation stage 6229 positions the subdividing mechanism 6212 so as to lay down a smooth layer of subdivided material into gasification rotor 6201.

Figure 62E:
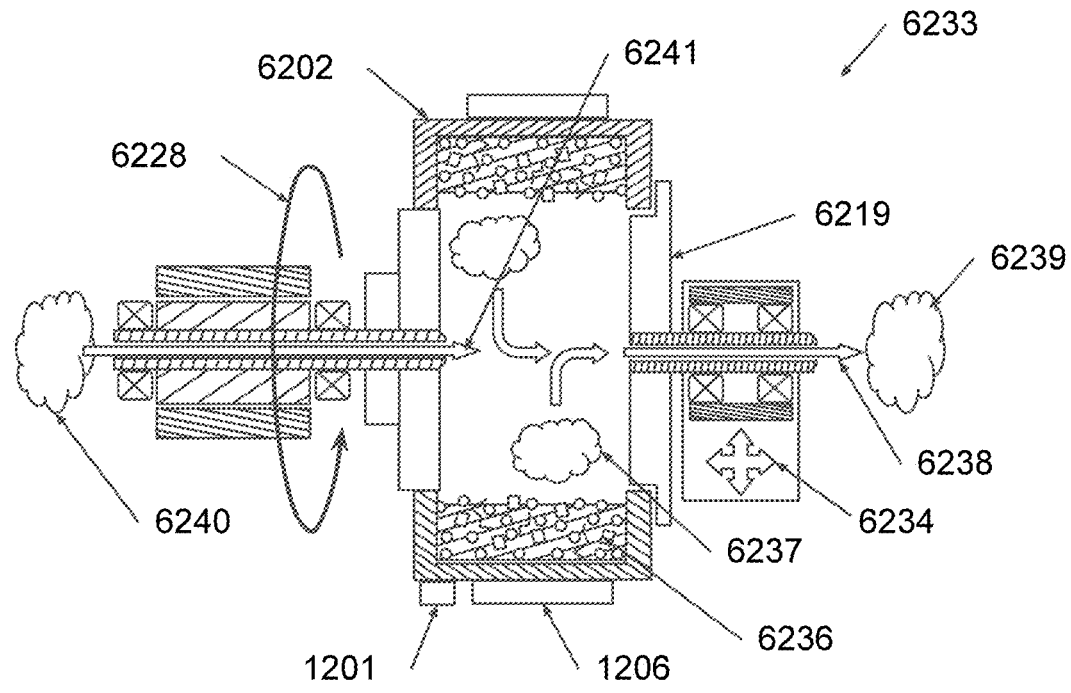
FIG. 62*e* shows a combined apparatus in a vaporization mode, in an embodiment.

FIG. 62e shows the combined apparatus in a vaporization mode 6233. In operation temperature-controlled rotor wall 6202 is heated by heating source 1206 controlled by thermal control system 1205 and sensed by temperature sensor 1201 to a temperature capable of vaporizing the component of the melt charge 6236 desired. In some cases the temperature of temperature-controlled rotor wall 6202 might be relatively low on the order of 300° C. to gasify paper and plastics or extremely high on the order of nearly 3000° C. to gasify iron. One of normal skill in the art may easily make a 300° C. artificial gravity thermal gas generator using the techniques and materials employed by heating rotor 3401 and its associated components such as making sealing lip 6221 from silicone rubber and temperature-controlled rotor wall 6202 from aluminum. However, as thermal gas generator rotor 6201 and spinning collection cap 6219 operating temperatures rise, more exotic skill in the art is required but not beyond the capabilities of a competent aerospace research and development organization. For example, a thermally controlled gasification rotor 6201 operating at temperatures of 3000° C. could be 3-D printed through laser sintering of high temperature ceramic known to experts in the field of ceramics and internally embedded with a 3-D co-printed tungsten heating coil. Tungsten is well known for its high temperature application in incandescent light bulbs performing reliability at an operating temperature of 3000° C. There are, of course, exotic problems that occur at very high temperatures such as chemical corrosion at hot surface interfaces. However, even there, one skilled in the ceramic arts could employ highly corrosion-resistant high-temperature materials such as yttrium trioxide as liner coatings for the inner surfaces of temperature-controlled rotor wall 6202 and spinning lid 6220. As disclosed herein, a modest 300° C. operating temperature artificial gravity thermal gas generator rotor 6201 and system may be made using the same methods and materials disclosed herein that were applied for the purpose of cooking food, combined with what is shown in FIG. 62.

FIG. 62e furthermore shows the optional injection of catalyst or chemical composing gas 6240 into the gasification chamber 6241. Gasses of various types may be used for a variety of chemical processes that occur in the high temperature gasification environment. Common gasses added to gasification processes include oxygen, hydrogen, water vapor, nitrogen, carbon dioxide, argon and others.

Figure 62F:
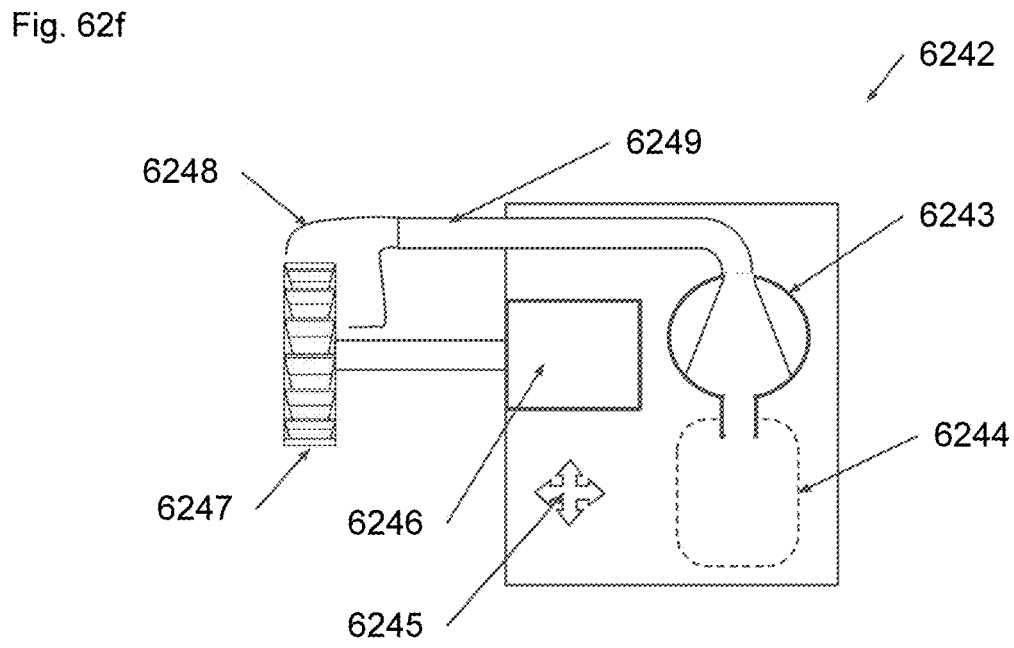
FIG. 62*f* shows thermal gas generator slag cleanout and harvesting apparatus, in an embodiment.
Figure 62G:
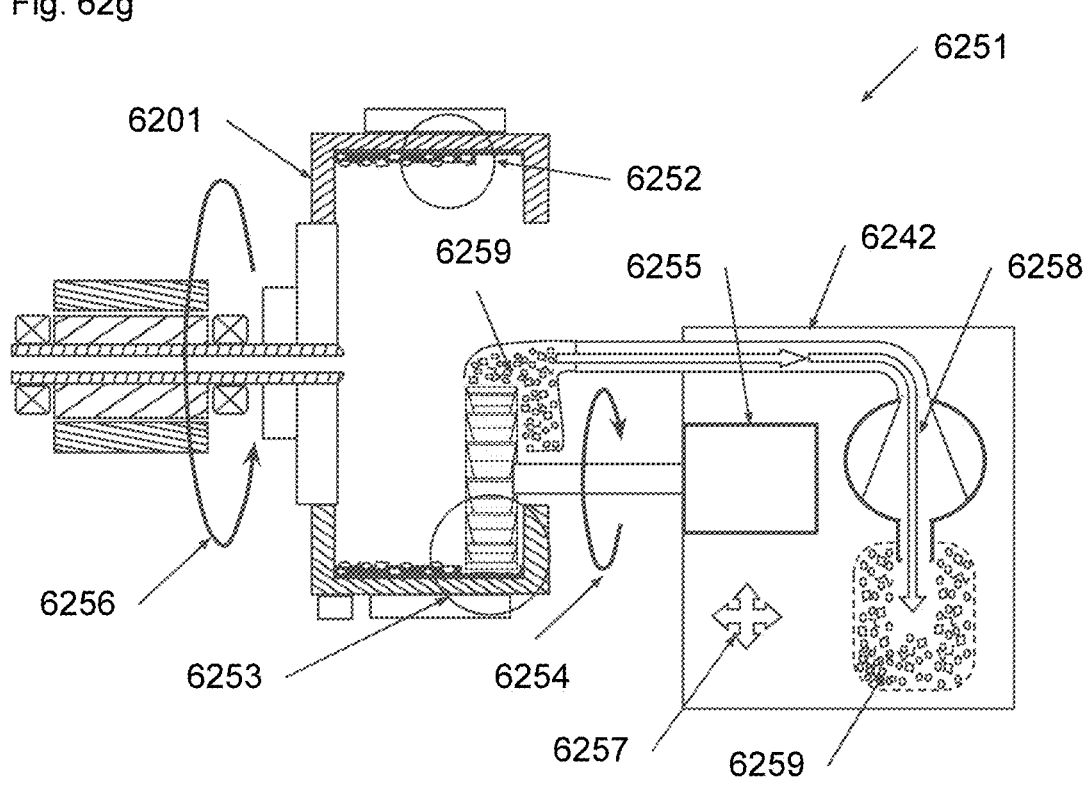
FIG. 62*g* shows a thermal gas generator rotor in a cleanout process, in an embodiment.

FIG. 62f shows thermal gas generator slag cleanout and harvesting apparatus 6242. In operation a translation platform 6245 under machine controller control positions the cleanout and harvesting apparatus 6242 with respect to the thermal gas generator rotor 6201 during rotor 6202 cleanout. Any gas generator apparatus processing a wide variety of materials whether trash or mining ore will be designed to only operate at a temperature high enough to achieve its desired industrial objective of gasifying certain materials of process value. Once these are gasified there often, or usually, remains material that will not gasify at the temperatures utilized and is commonly referred to as slag or ash. Any practical gas generator system will require a slag or ash cleanout mechanism and that is what is illustrated in FIG. 62f and FIG. 62g. FIG. 62f shows motor 6246 connected to rotary cutter 6427 which is partially surrounded by dust collection shroud 6248 attached by vacuum channel 6249 to vacuum blower 6243 that feeds collection filter sock 6244.

FIG. 62g shows thermal gas generator rotor 6201 with a deposition of slag 6252 in the process of being cleaned out. In this process, thermal gas generation from the material charge 6232 is complete, the rotor has cooled and the spinning cap assembly 6219 has been removed. In operation, spinning motor 6255 spins 6254 rotary cutter 6247. Translation platform 6257 scans the harvesting apparatus 6242 and the cutting face 6253 of rotary cutter 6247 across the interior of temperature-controlled rotor wall 6202 while the rotor 6201 is slowly rotated to put more slag in the path of cutting face 6253. As slag 6252 is cut away, the dust 6259 generated from rotary cutter 6247 and its cutting face 6253 is vacuumed by operating vacuum blower 6258 through dust collection shroud 6248 and through vacuum blower 6258 into dust collection filter sock 6244. The resulting collected slag dust 6259 may be used or disposed of, depending on its value. It should be noted that the dehydrator illustrated in FIG. 61 may use a similar harvesting method using equipment similar to that illustrated in FIG. 6242 rather that sliding the dehydrated material out in mass as is shown in FIG. 61b.

Features described above as well as those claimed below may be combined in various ways without departing from the scope hereof. The following examples illustrate some possible, non-limiting combinations:

(A1) An artificial gravity heating system includes: a cylindrical compartment including a hollow cylinder having a bottom base and an open top end; an electric motor operatively coupled with the cylindrical compartment for rotating the cylindrical compartment to provide centripetal motion of materials introduced into the cylindrical compartment via the open top end, such that the materials move towards an inner wall of the cylindrical compartment; a heating element conductively coupled along an outer wall of the cylindrical compartment for heating the materials against the inner wall via conduction; a temperature sensor operatively coupled to the cylindrical compartment for monitoring a temperature of the cylindrical compartment; and a controller configured to control operation of the heating element based on the temperature monitored via the temperature sensor.

(A2) For the artificial gravity heating system denoted as (A1), a cooling element may be conductively coupled along an outer wall of the cylindrical compartment for cooling the materials against the inner wall via conduction, and the controller is configured to control operation of the cooling element based on the temperature monitored via the temperature sensor.

(A3) For the artificial gravity heating system denoted as (A1) or (A2), an insulating shroud may be disposed outside the hollow cylinder such that a cavity is formed between the insulating shroud and the hollow cylinder, and a fan may be configured to push or pull air through the cavity for cooling the cylindrical compartment.

(A4) For the artificial gravity heating system denoted as any of (A1) through (A3), a lid may be configured to removably seal the open top end of the cylindrical compartment, and the lid includes a central hole for introducing materials or a tool into the cylindrical compartment.

(A5) For the artificial gravity heating system denoted as any of (A1) through (A4), the inner wall of the cylindrical compartment may include an angle with respect to a rotational axis of the cylindrical compartment, the angle being based on a gravity level, such that the angle is about zero degrees for a microgravity level, and the angle is greater than zero degrees to form a tapered wall for a 1-G level.

(A6) For the artificial gravity heating system denoted as any of (A1) through (A5), an ejection liner may be disposed internally along the inner wall and the bottom base of the cylindrical compartment, where the ejection liner includes a rubber-like liner along the inner wall and a stiff portion along the bottom base. A pull release knob may be attached to the stiff portion inside the cylindrical compartment, where the pull release knob is configured to be pulled by a user to compress the ejection liner and retrieve any contents of the ejection liner from the cylindrical compartment.

(A7) The artificial gravity heating system denoted as any of (A1) through (A6) may include a rotary transformer mechanism for transmitting electrical power to the heating element using a non-contact rotary transformer.

(A8) For the artificial gravity heating system denoted as any of (A1) through (A7), the heating element may include a positive-temperature-coefficient (PTC) material configured to limit the upper operating temperature of the heating element to 220-degrees Celsius.

(A9) For the artificial gravity heating system denoted as any of (A1) through (A8), a Peltier device may be configured to operate as the heating element and the cooling element depending on a direction of electrical current applied to the Peltier device under control of the controller.

(A10) For the artificial gravity heating system denoted as any of (A1) through (A9), an airflow cap may be configured to cover the insulating shroud above the open top end of the cylindrical compartment, the airflow cap being configured to direct air from the fan through the cavity and into a central portion of the cylindrical compartment.

(B1) An artificial gravity heating method includes: spinning a rotor with an electric motor, the rotor including a hollow cylindrical compartment having a cylinder wall, a bottom base, and an open top end; injecting a material to be processed into the rotor through the open top end while the rotor is spinning; heating the cylinder wall to a set temperature for a desired duration to process the material; stopping rotation of the rotor; and removing a processed material from the rotor.

(B2) The artificial gravity heating method denoted as (B1) may include attaching a rotor dam to the rotor prior to spinning the rotor, where the rotor dam once attached covers the open top end, and the rotor dam includes a central opening such that injecting material to be processed occurs through the central opening.

(B3) The artificial gravity heating method denoted as (B1) or (B2) may include providing a pouch containing dry material, adding water to the pouch, and mixing the water with the dry material prior to injecting material into the rotor.

(B4) The artificial gravity heating method denoted as any of (B1) through (B3) may include turning on a fan, where the fan is fluidly coupled to a gap between the outside of the cylinder wall and a shroud disposed around the outside of the cylinder wall, such that air is moved through the gap via the fan to cool the cylinder wall.

(B5) For the artificial gravity heating method denoted as any of (B1) through (B4), heating the cylinder wall may include providing electrical current to at least one heating element conductively coupled to an outside of the cylinder wall.

(B6) The artificial gravity heating method denoted as any of (B1) through (B5) may include turning off the heating element after the desired duration, and cooling the rotor wall with at least one cooling element conductively coupled to the outside of the cylinder wall by providing electrical current to the at least one cooling element.

(B7) For the artificial gravity heating method denoted as any of (B1) through (B6), removing the processed material from the rotor may include removing the rotor dam and removing a spin cake of processed material from the rotor.

(B8) For the artificial gravity heating method denoted as any of (B1) through (B7), prior to the step of spinning the rotor, the method may include installing a conformal insert, and turning on a vacuum source fluidly coupled to the rotor through perforations in the bottom base, where the vacuum source provides a negative pressure beneath the conformal insert such that the conformal insert conforms to an internal shape of the rotor.

(B9) For the artificial gravity heating method denoted as any of (B1) through (B8), after the step of stopping rotation of the rotor, the method may include turning off the vacuum source and removing the conformal insert from the rotor.

(B10) For the artificial gravity heating method denoted as any of (B1) through (B9), the hollow cylindrical compartment may include a food-grade liner and the material to be processed may include food ingredients, such that the processed material includes a ring-shaped cake of cooked food.

(C1) An artificial gravity vapor generator dehydrator system includes: a cylindrical compartment including a hollow cylinder having a bottom base and a top cover; an electric motor operatively coupled with the cylindrical compartment via a rotary coupling, wherein the rotary coupling includes an entry path for providing liquids and slurries to the cylindrical compartment, and rotating the cylindrical compartment via the electric motor provides centripetal motion to move the liquids and slurries toward an inner wall of the cylindrical compartment; a heating element conductively coupled along an outer wall of the cylindrical compartment for heating the liquids and slurries against the inner wall via conduction; a temperature sensor operatively coupled to the cylindrical compartment for monitoring a temperature of the cylindrical compartment; a controller configured to control operation of the heating element based on the temperature monitored via the temperature sensor; and an escape coupling including an exit path out of the cylindrical compartment to receive vapors produced by heating the liquids and slurries.

(C2) The artificial gravity vapor generator dehydrator system denoted as (C1) may include an external heating source operatively coupled to the escape coupling outside of the cylindrical compartment, where the heating source is configured to heat the vapor to provide a superheated vapor.

(C3) The artificial gravity vapor generator dehydrator system denoted as (C1) or (C2) may include an external cooling source operatively coupled to the escape coupling outside of the cylindrical compartment, where the external cooling source is configured to cool the vapor to provide liquid condensate.

(C4) For the artificial gravity vapor generator dehydrator system denoted as any of (C1) through (C3), the top cover is removable such that access to the cylindrical compartment is provided thereby enabling removal of a dehydrated material resulting from dehydration of the liquids and slurries.

(D1) An artificial gravity thermal gas generator system includes: a hollow cylindrical compartment having a cylinder wall, a bottom base, and an open top end; a cap for covering the open top end; an electric motor operatively coupled with the hollow cylindrical compartment for rotating the hollow cylindrical compartment to provide centripetal motion to an input material introduced into the hollow cylindrical compartment via the open top end, such that the input material moves toward an inner wall of the hollow cylindrical compartment while rotating; a heating element conductively coupled along an outer wall of the hollow cylindrical compartment for heating the input material against the inner wall via conduction to gasify the input material; a temperature sensor operatively coupled to the hollow cylindrical compartment for monitoring a temperature of the hollow cylindrical compartment; a controller configured to control operation of the heating element based on the temperature monitored via the temperature sensor; and a sealable port disposed in the cap, wherein the sealable port provides a path for gasification vapors to be released from the cylindrical compartment.

(D2) The artificial gravity thermal gas generator system denoted as (D1) may include a material subdivider, including: a feed hopper configured to receive a feedstock material; a grinder for grinding the feedstock material, thereby providing the input material; and an ejection spout configured to eject the input material into the open top end of the cylindrical compartment.

(D3) The artificial gravity thermal gas generator system denoted as (D1) or (D2) may include an injection air blade, including an outlet configured to provide a stream of air adjacent an exit of the ejection spout for directing the input material towards the cylinder wall.

(D4) For the artificial gravity thermal gas generator system denoted as any of (D1) through (D3), the hollow cylindrical compartment may include a ceramic heat-resistant material such that the cylinder wall is sufficiently heated via the heating element to gasify the input material.

(D5) The artificial gravity thermal gas generator system denoted as any of (D1) through (D4) may include a rotary coupling operatively coupling the electric motor with the hollow cylindrical compartment, where the rotary coupling includes an injection path for injecting a gas catalyst to the cylindrical compartment.

(D6) The artificial gravity thermal gas generator system denoted as any of (D1) through (D5) may include a slag cleanout and harvesting mechanism, including: a rotary cutter configured to scape slag from the cylinder wall; a dust collection shroud partially surrounding the rotary cutter; a vacuum channel and a vacuum blower operatively coupled to the dust collection shroud for drawing in dust; and a collection filter fluidly coupled to the vacuum channel for containing dust.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternatives to implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An artificial gravity heating method using a rotor comprises a hollow cylindrical compartment having a cylinder wall, a bottom base, and an open top end, comprising:
    attaching a rotor dam to the open top end of the rotor, wherein the rotor dam comprises a central opening;
    spinning the rotor;
    injecting a material to be processed into the rotor through the central opening of the rotor dam while the rotor is spinning such that the material undergoes centripetal acceleration and presses against the cylinder wall of the rotor by centrifugal force exceeding ambient gravity;
    heating the cylinder wall of the rotor to conduct heat into the material; and
    processing the material while maintaining rotation and heating of the cylinder wall.

2. The method of claim 1, wherein spinning the rotor comprises operating an electric motor under control of a controller, wherein the electric motor is mechanically coupled to the rotor.

3. The method of claim 1, wherein spinning the rotor comprises spinning the rotor at a rotational rate sufficient to generate centrifugal force for pressing the material against the cylinder wall while in a low gravity environment.

4. The method of claim 1, wherein heating the rotor comprises turning on at least one heating element conductively coupled to the rotor.

5. The method of claim 4, further comprising turning off the at least one heating element after a desired duration.

6. The method of claim 1, wherein processing the material comprises cooking food ingredients.

7. The method of claim 1, further comprising cooling the rotor.

8. The method of claim 7, wherein cooling the rotor comprises operating a fan, wherein the fan is fluidly coupled to a gap between an outside of the rotor and a shroud disposed around the outside of the rotor, such that air is moved through the gap via the fan to cool the rotor.

9. The method of claim 7, wherein cooling the rotor comprises operating at least one cooling element conductively coupled to an outside of the rotor.

10. The method of claim 7, wherein cooling the rotor comprises operating a Peltier device conductively coupled to an outside of the rotor, wherein the Peltier device is configured for heating and cooling.

11. The method of claim 1, further comprising:
    prior to spinning the rotor, turning on a vacuum source fluidly coupled to the rotor through perforations in a bottom base of the rotor, wherein the vacuum source provides a negative pressure beneath a conformal insert for conforming the conformal insert to an internal shape of the rotor.

12. The method of claim 1, further comprising covering rotor with a rotating cover having a rotary entry coupling, injecting liquid and slurry materials into the rotor while the rotor is spinning via the rotary entry coupling, and heating the liquid and slurry materials to a boiling temperature to produce a vapor phase.

13. The method of claim 1, further comprising sealing the rotor with a rotating collection cap having a gasification product port connected to a hollow shaft and a sealing lip, and gasifying the material by heating the rotor to produce gasification vapors.

14. An artificial gravity heating system, comprising:
    a rotor comprising a hollow cylindrical compartment having a cylinder wall, a closed bottom base and an open top end;
    a rotor dam removably attached to the open top end of the rotor, the rotor dam comprising a central opening for injecting materials into the rotor;
    a motor operatively coupled with the rotor for rotating the rotor such that the centripetal acceleration exceeds ambient gravity thereby pressing the materials inside the rotor against the cylinder wall of the rotor due to centripetal acceleration greater than ambient gravity;
    a heater and a cooler configured to heat and cool the cylinder wall of the rotor for heating and cooling the materials; and
    a non-rotating insulating shroud disposed outside the rotor such that a cavity is formed between the non-rotating insulating shroud and the rotor.

15. The system of claim 14, wherein the heater comprises a heating element conductively coupled along the cylinder wall of the rotor for heating the materials via conduction, and the cooler comprises a cooling element conductively coupled along the cylinder wall of the rotor for cooling the materials via conduction.

16. The system of claim 15, wherein the heating element and the cooling element comprise a Peltier device configured to operate as the heating element when electrical current is applied in a first direction and to operate as the cooling element when electrical current is applied in a second opposite direction of electrical current applied to the Peltier device.

17. The system of claim 15, wherein the heating element comprises a positive-temperature-coefficient material configured to passively limit an upper operating temperature of the heating element.

18. The system of claim 14, further comprising a temperature sensor operatively coupled to the rotor for monitoring a temperature of the rotor.

19. The system of claim 14, further comprising a motor speed readout configured to display a rotational speed of the rotor.

20. The system of claim 19, wherein the motor speed readout is configured to display an indication of an artificial gravity G-level.

\* \* \* \* \*